(12) United States Patent
Metnick

(10) Patent No.: US 12,125,079 B2
(45) Date of Patent: Oct. 22, 2024

(54) VARIABLE CONTRACT FUNCTION INFORMATION FOR AN EXCHANGE ITEM

(71) Applicant: Raise Marketplace, LLC, Dover, DE (US)

(72) Inventor: Josh K. Metnick, Chicago, IL (US)

(73) Assignee: Rise Marketplace, LLC, Dover, DE (US)

( * ) Notice: Subject to any disclaimer, the term of this patent is extended or adjusted under 35 U.S.C. 154(b) by 0 days.

(21) Appl. No.: 18/051,406

(22) Filed: Oct. 31, 2022

(65) Prior Publication Data

US 2023/0078239 A1 Mar. 16, 2023

Related U.S. Application Data

(63) Continuation of application No. 17/194,526, filed on Mar. 8, 2021, now Pat. No. 11,694,243, which is a
(Continued)

(51) Int. Cl.
*G06Q 30/00* (2023.01)
*G06Q 20/02* (2012.01)
(Continued)

(52) U.S. Cl.
CPC ......... *G06Q 30/0601* (2013.01); *G06Q 20/02* (2013.01); *G06Q 20/20* (2013.01);
(Continued)

(58) Field of Classification Search
CPC .... G06Q 30/0601; G06Q 20/02; G06Q 20/20; G06Q 20/3274; G06Q 20/34;
(Continued)

(56) References Cited

U.S. PATENT DOCUMENTS

| 10,997,662 B1 | 5/2021 | Warfel |
| 2004/0103017 A1 | 5/2004 | Reed |

(Continued)

OTHER PUBLICATIONS

Raise Marketplace: Internet Archive Wayback Machine; Raise Marketplace www.raise.com; Jun. 29, 2014, Oct. 7, 2014; 24 pgs. (Year: 2014).*

(Continued)

*Primary Examiner* — Robert M Pond
(74) *Attorney, Agent, or Firm* — Garlick & Markison; Timothy D. Taylor

(57) ABSTRACT

A method includes receiving, by a marketplace server, an acquisition request regarding an exchange item from a computing device, where the exchange item has exchange item information that include a set of use rules that govern utilization of the exchange item. The method further includes obtaining, by the marketplace server, dynamic external factors for the request to acquire the exchange item and determining variable contract function information based on the external factors in accordance with a smart contract approach. The method further includes sending an acquisition response to the computing device that includes the variable contract function information and the exchange item information. The method further includes obtaining, by the computing device, current dynamic external factors associated with the variable contract function information and generating, by the computing device, updated exchange item information for the exchange item based on the current dynamic external factors and the variable contract function information.

20 Claims, 48 Drawing Sheets

Related U.S. Application Data continuation of application No. 16/577,807, filed on Sep. 20, 2019, now Pat. No. 10,943,275, which is a continuation of application No. 15/004,690, filed on Jan. 22, 2016, now Pat. No. 10,423,993.

(60) Provisional application No. 62/271,456, filed on Dec. 28, 2015.

(51) Int. Cl.
*G06Q 20/20* (2012.01)
*G06Q 20/32* (2012.01)
*G06Q 20/34* (2012.01)
*G06Q 20/36* (2012.01)
*G06Q 20/38* (2012.01)
*G06Q 20/40* (2012.01)
*G06Q 20/42* (2012.01)
*G06Q 30/02* (2023.01)
*G06Q 30/0601* (2023.01)

(52) U.S. Cl.
CPC ......... *G06Q 20/3274* (2013.01); *G06Q 20/34* (2013.01); *G06Q 20/36* (2013.01); *G06Q 20/382* (2013.01); *G06Q 20/3825* (2013.01); *G06Q 20/3827* (2013.01); *G06Q 20/387* (2013.01); *G06Q 20/4012* (2013.01); *G06Q 20/4014* (2013.01); *G06Q 20/4016* (2013.01); *G06Q 20/42* (2013.01); *G06Q 30/02* (2013.01)

(58) Field of Classification Search
CPC .. G06Q 20/36; G06Q 20/382; G06Q 20/3825; G06Q 20/3827; G06Q 20/387; G06Q 20/4012; G06Q 20/4014; G06Q 20/4016; G06Q 20/42; G06Q 30/02
See application file for complete search history.

(56) References Cited

U.S. PATENT DOCUMENTS

| | | |
|---|---|---|
| 2005/0222906 A1 | 10/2005 | Chen |
| 2007/0112614 A1 | 5/2007 | Maga |
| 2011/0295705 A1 | 12/2011 | Kasmei |
| 2013/0073459 A1* | 3/2013 | Zacarias ............... G06Q 30/08 705/41 |
| 2013/0254074 A1 | 9/2013 | Joa |
| 2013/0297473 A1 | 11/2013 | Wolfe |
| 2014/0229383 A1 | 8/2014 | Wolfe |
| 2014/0249986 A1 | 9/2014 | Wolfe |
| 2016/0232609 A1 | 8/2016 | Lindemulder |
| 2016/0267472 A1 | 9/2016 | Lingham |

OTHER PUBLICATIONS

Nakamoto, Satoshi. "Bitcoin: A Peer-to-Peer Electronic Cash System." Bitcoin. 2009. <https://bitcoin.org>.

* cited by examiner

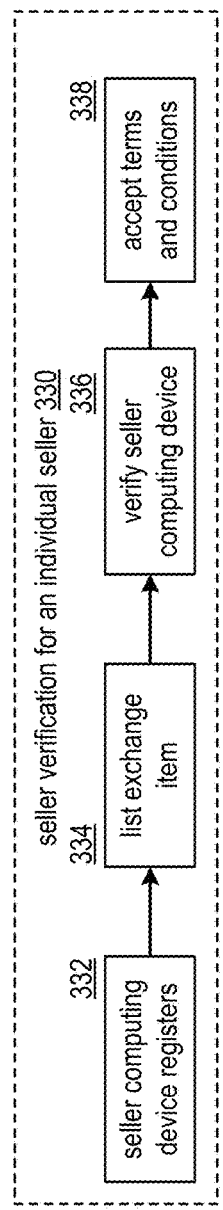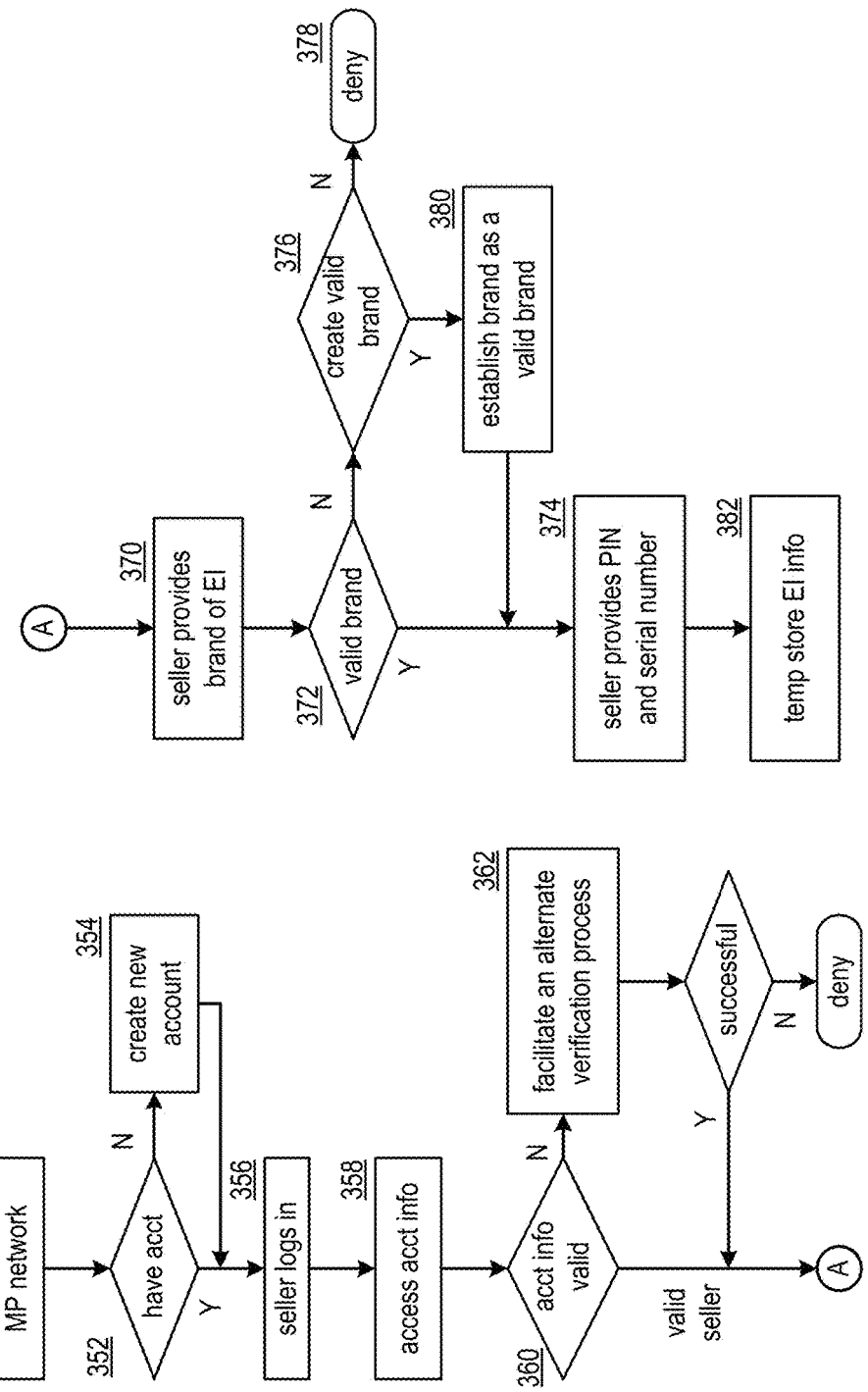

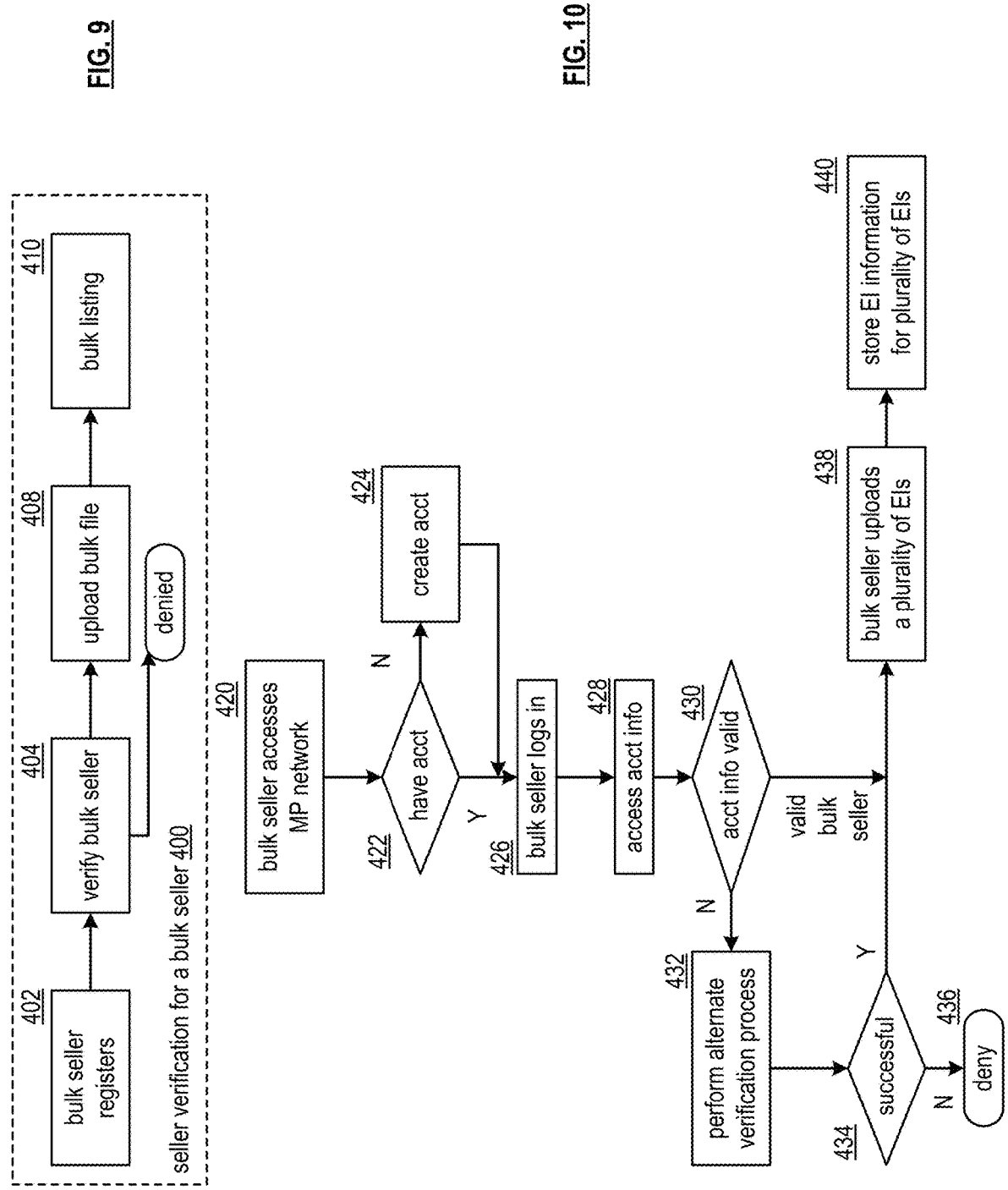

exchange item marketplace network 10A

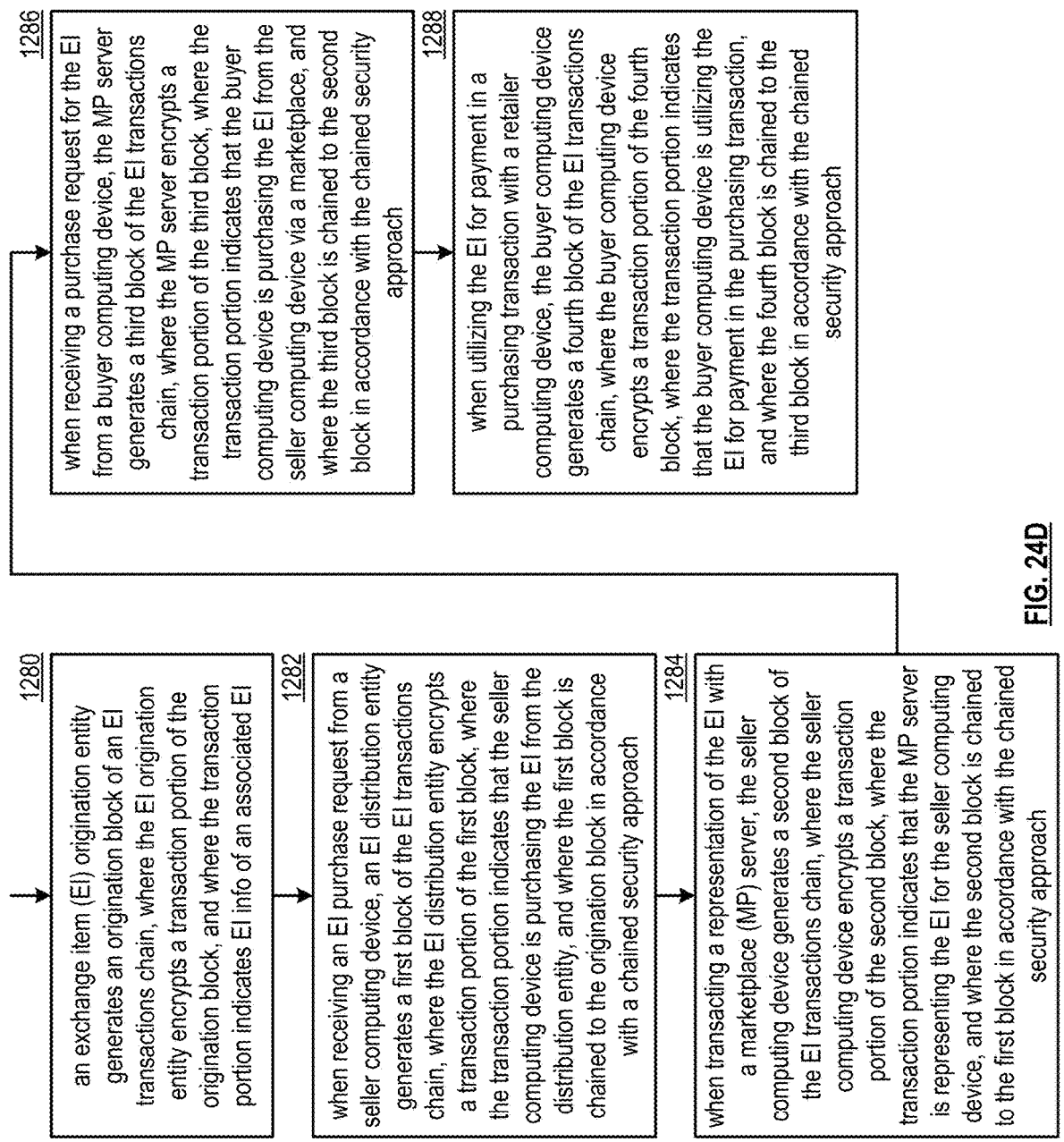

VARIABLE CONTRACT FUNCTION INFORMATION FOR AN EXCHANGE ITEM

CROSS REFERENCE TO RELATED PATENTS

The present U.S. Utility Patent Applications claims priority pursuant to 35 U.S.C. § 120 as a continuation of U.S. Utility application Ser. No. 17/194,526, entitled "INJECTING EXCHANGE ITEMS INTO AN EXCHANGE ITEM MARKETPLACE NETWORK," filed Mar. 8, 2021, which is a continuation of U.S. Utility application Ser. No. 16/577,807, entitled "AUTHENTICATING AN EXCHANGE ITEM IN AN EXCHANGE ITEM MARKETPLACE NETWORK," filed Sep. 20, 2019, issued as U.S. Pat. No. 10,943,275 on Mar. 9, 2021, which is a continuation of U.S. Utility application Ser. No. 15/004,690, entitled "AUTHENTICATING AN EXCHANGE ITEM IN AN EXCHANGE ITEM MARKETPLACE NETWORK," filed Jan. 22, 2016, issued as U.S. Pat. No. 10,423,993 on Sep. 24, 2019, which claims priority pursuant to 35 U.S.C. § 119(e) to U.S. Provisional Application No. 62/271,456, entitled "AUTHENTICATING AN EXCHANGE ITEM IN AN EXCHANGE ITEM MARKETPLACE NETWORK," filed Dec. 28, 2015, all of which are hereby incorporated herein by reference in their entirety and made part of the present U.S. Utility Patent Applications for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to an exchange item marketplace network.

Description of Related Art

The use of credit cards, debit cards, and gift cards to pay for goods and services is well known. It is further known to use services such as PayPal™ or Apple Pay™ to expand the use of credit cards and debit cards through computing devices (e.g., computers, tablets, cell phones, etc.). The use of these services is aided by the standardized numbering system and format used by credit card issuers and debit card issuers.

For a credit card and debit card transaction, the credit or debit cardholder presents the credit or debit card to a merchant (e.g., online or brick & mortar) to pay for a purchase. The merchant uses point of sale (POS) equipment to capture the information of the credit or debit card and to enter the amount of the purchase. This information is sent to an acquirer (e.g., the financial institution of the merchant). The acquirer sends the transaction information via a secure network of a credit card company to the cardholder's issuer (e.g., a financial institution that issued the credit or debit card to the cardholder).

The issuer approves or declines the transaction and sends the response back to the acquirer via the secure network of the credit card company. The acquirer sends the response (e.g., approved or declined) to the merchant to complete the transaction. Money, however, is not exchanged at the time of purchase, but is done during clearing and settlement.

Clearing and settlement begins when the merchant deposits the transaction receipt with the acquirer. The acquirer credits the merchant's account and sends the transaction receipt to the issuer via the secure network. The issuer posts the transaction to the cardholder's account. The cardholder pays the issuer in response to receiving a monthly statement.

The issuance and use of a gift card is significantly different than that of a credit card. FIG. 1 illustrates a diagram regarding the issuance and use of a gift card. A branded company (e.g., a retailer, a chain store, a restaurant, etc.) issues a request to create gift cards to a processor service. The processor service creates the gift cards, which may be issued with specific values or issued as blanks; where the value is specified at the time of purchase.

The processor service provides the gift cards to a distributor who is responsible for distributing the gift cards so that a consumer may purchase them. For example, the distributor may provide gift cards to merchants so they may sell the gift cards. At some point, a consumer purchases a gift card (e.g., a sporting goods company gift card for $50.00). The payment for the gift card is processed such that the distributor, processing service, and branded company each are paid their respective shares.

If the gift card is used, a merchant (e.g., a franchise owner of the branded company) captures information of the gift card via point of sale (POS) equipment. The information of the gift card is processed to determine if it is a valid gift card and to determine the balance remaining on the gift card. If the card is valid, the use of the gift card is authorized up to the balance remaining on the gift card. Once the use is complete, the balance is updated, processing fees are paid, and the branded company is debited.

Another difference between credit cards and gift cards is that gift cards do not have a standardized numbering system or format. As such, gift cards can have one of thousands of different numbering systems and formats, which have to be recognizable by the POS equipment.

Yet another different between credit cards and gift cards is when money is processed. For credit cards, money is not processed until a purchase occurs, while gift cards are purchased and then subsequently used. As such, money is processed at the time of purchase of the gift card and again if the gift card is used.

A still further difference between credit cards and purchased gift cards is that, if a credit card goes unused, no money is spent. In contrast, if a purchased gift card goes unused, money has been spent to acquire the card, but no goods or services are acquired. It is estimated that billions of dollars' worth of purchased gift cards go unused annually. While this may be a favorable scenario for the branded company, it is not a favorable scenario for consumers.

Raise Marketplace Inc. introduced a system that enables gift cardholders to sell their unused or unwanted gift cards. This system allows a gift card seller to post a gift card for sale in a virtual gift card marketplace. Buyers can access the virtual gift card marketplace and purchase gift cards that are offered for sale. When a gift card is purchased, the system processes the purchase to debit the buyer, credit the seller, and provide the gift card to the buyer.

The system may provide the physical gift card to the buyer, which requires obtaining the physical gift card from the seller and delivering it to the buyer. Alternatively, the system provides the information of the gift card to the user in a voucher format (e.g., a document that the buyer can print off that includes the relevant information of the gift card).

BRIEF DESCRIPTION OF THE SEVERAL VIEWS OF THE DRAWING(S)

FIG. 7 is a diagram of an embodiment of individual seller verification in an exchange item marketplace network in accordance with the present invention;

FIG. 8 is a logic diagram of an embodiment of a method of individual seller verification in an exchange item marketplace network in accordance with the present invention;

FIG. 9 is a diagram of an embodiment of bulk seller verification in an exchange item marketplace network in accordance with the present invention;

FIG. 10 is a logic diagram of an embodiment of a method of bulk seller verification in an exchange item marketplace network in accordance with the present invention;

FIG. 24D is a logic diagram of another embodiment of a method for generating a transactions block chain in accordance with the present invention;

DETAILED DESCRIPTION OF THE INVENTION

Figure 1:
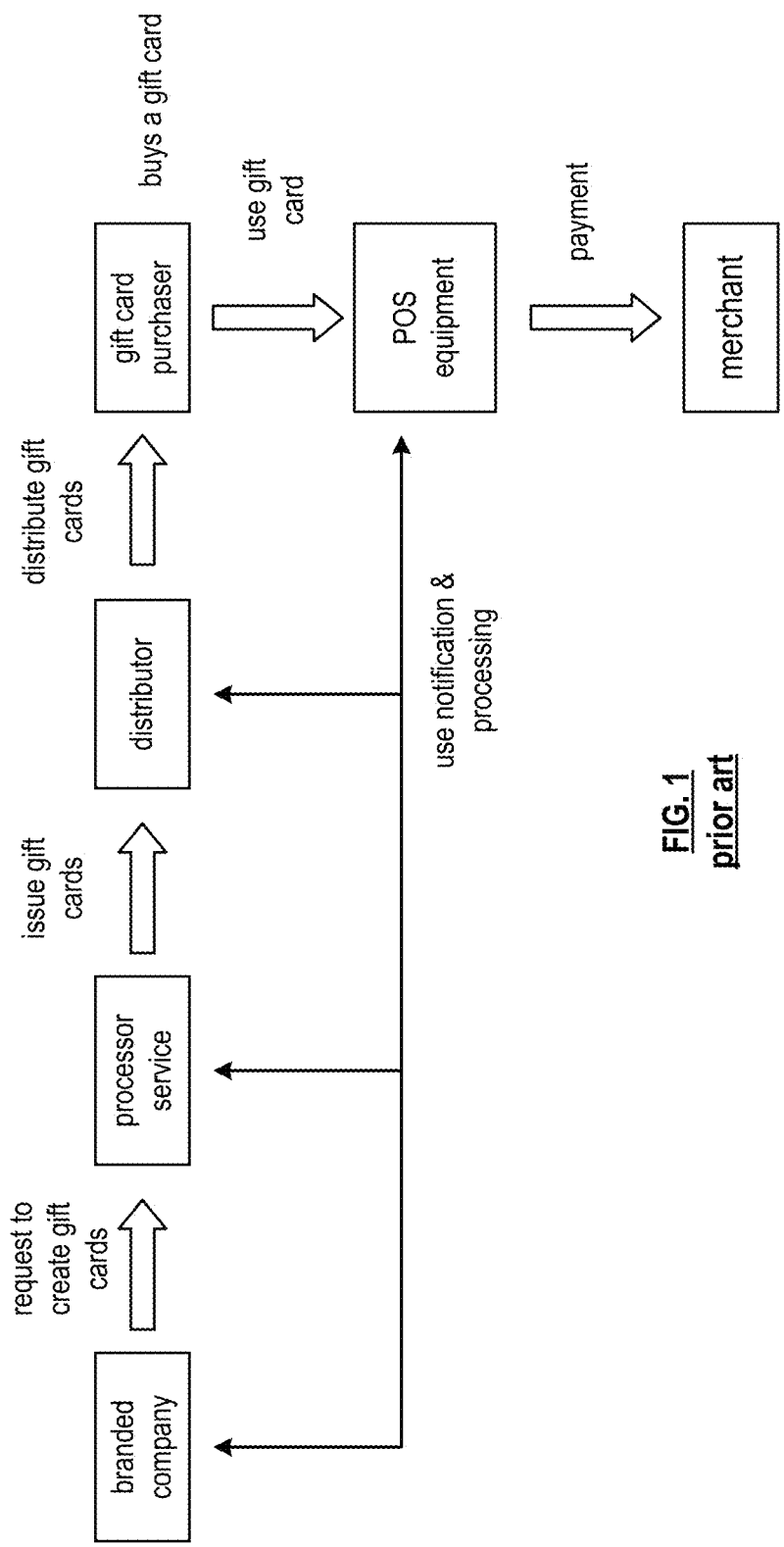
FIG. 1 is a schematic block diagram of a prior art gift card issuance and use system.
Figure 2:
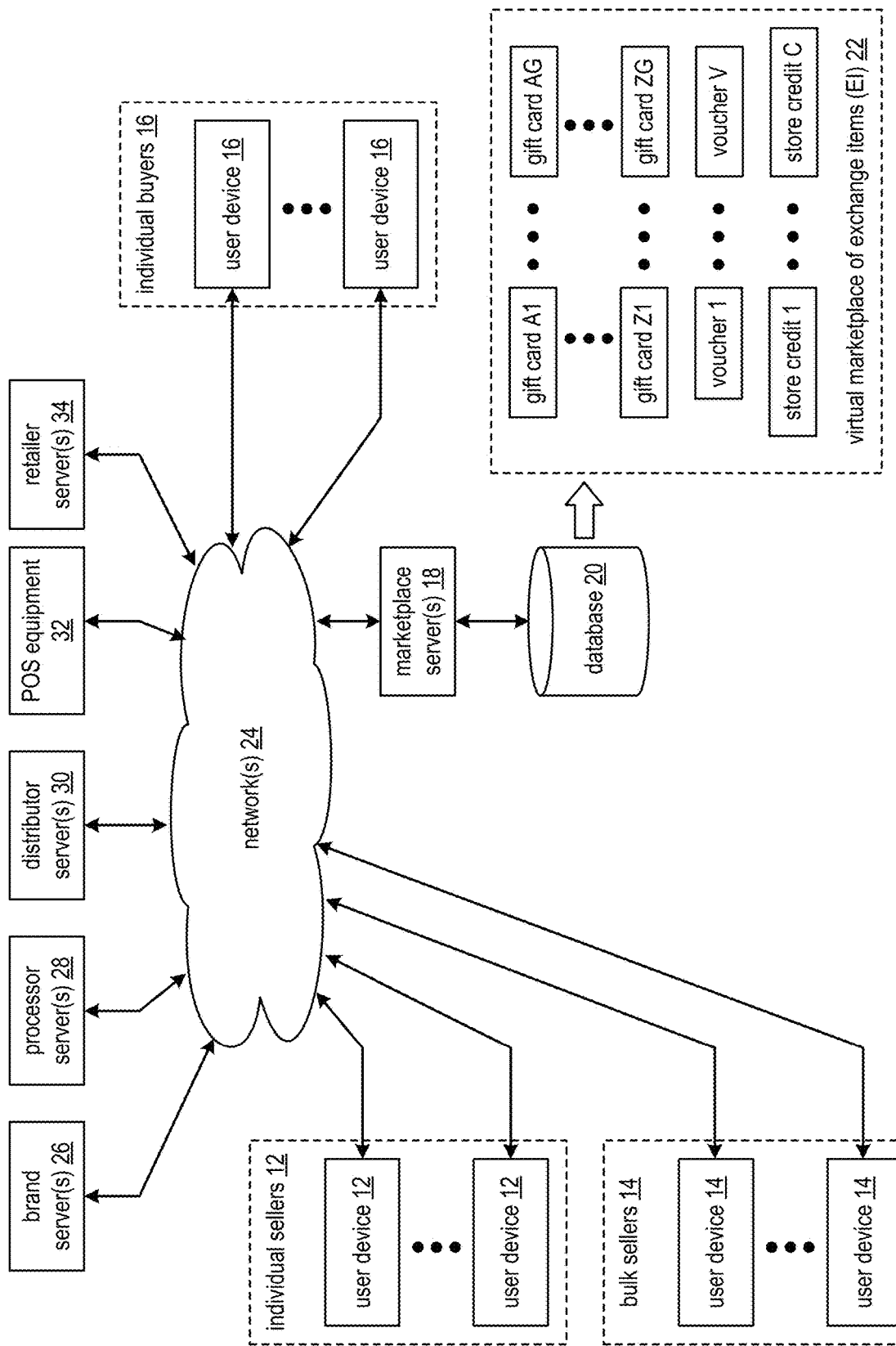
FIG. 2 is a schematic block diagram of an embodiment of an exchange item marketplace network in accordance with the present invention.
Figure 4:
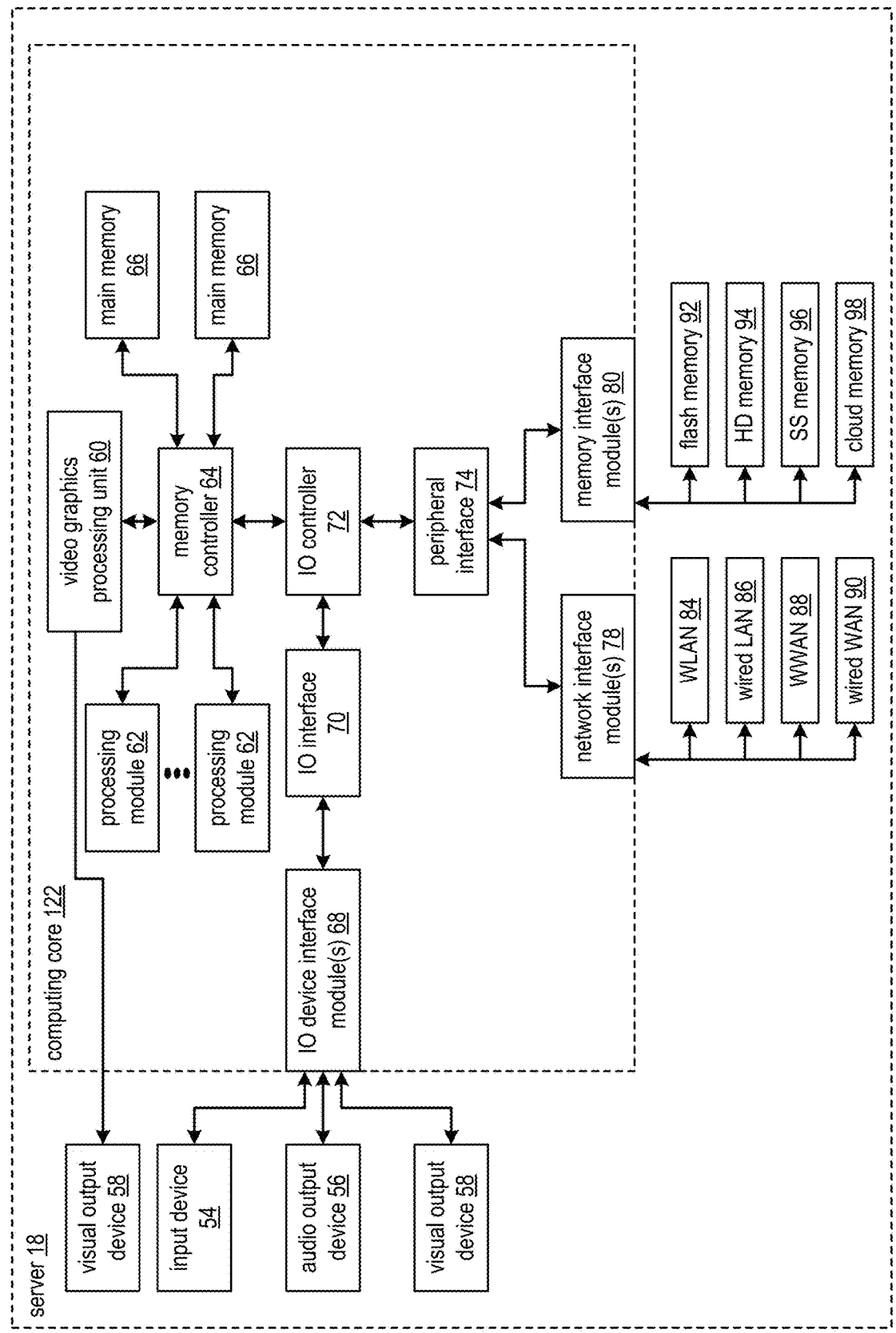
FIG. 4 is a schematic block diagram of an embodiment of a marketplace server of exchange item marketplace network in accordance with the present invention.

FIG. 2 is a schematic block diagram of an embodiment of an exchange item marketplace network 10 that includes user devices 12 of individual sellers, user devices 14 of bulk sellers, user devices 16 of individual buyers, one or more marketplace servers 18 (an example embodiment is shown in FIG. 4), one or more databases 20, one or more networks 24, one or more brand servers 26, one or more processor servers 28, one or more distributor servers 30, point of sale (POS) equipment 32, and one or more retailer servers 34. The one or more marketplace servers 18 process, and the one or more databases 20 store a virtual marketplace of exchange items 22.

Each of the user devices 12, 14, and 16 is a computing device that includes a computing core. In general, a computing device is any electronic device that can communicate data, process data, and/or store data. A further generality of a computing device is that it includes a central processing unit (CPU), a memory system, user input/output interfaces, peripheral device interfaces, and an interconnecting bus structure.

As specific examples, each of the user devices 12-16 may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment that includes a computing core. An embodiment of a computing device 12-16 is further described below with reference to FIG. 3.

The exchange item marketplace network 10 supports the selling and purchasing of exchange items. An exchange item is a closed loop financial instrument and/or other digital goods. For example, a closed loop financial instrument is a gift card, a voucher, a store credit, and/or other brand company (or merchant) sponsored form of credit for a specific use (e.g., in a specific store, in a specific chain of stores, for a particular type of goods, etc.). A closed loop financial instrument is distinguished from an open loop financial instrument, such as a credit card.

A digital good is digital item that can legally be sold or resold by an individual. For example, the digital item may be an original digital book, an original digital photograph, an original video clip, a purchased video game, a purchased software application, a purchase video, a purchased music file, a purchased digital book, a purchased audio book, etc.

In support of selling an exchange item, the marketplace server 18 communicates with a user device of a seller (e.g., individual or bulk) to verify the user device (and the seller) and to ascertain information regarding the exchange item being offered for sale. For example, the marketplace server 18 verifies user information (e.g., the seller's name, account, personal identification number (PIN), a user identification number (ID), payment account information (e.g., a credit card number, checking or savings account information), seller's mailing address, etc.) and device information (e.g., an IP address, device serial number, a marketplace application ID, etc.) of the seller's computing device. Verification of the seller and corresponding computing device is discussed in greater detail with reference to one or more of FIGS. 6A-6D, 7-10, 18A, and 18B.

Upon receiving the information regarding the exchange item, which includes a brand name (e.g., a coffee franchise, a sporting good franchise, an electronics store, etc.), a serial number, a selling price, a remaining balance, restrictions of use, a bar code, and/or other pertinent information, the marketplace server 18 verifies it. When the seller and the information regarding the exchange item are verified, the marketplace server 18 posts it in the virtual marketplace of exchange items 22, which is stored in database 20.

The marketplace server 18 posts the exchange item in the virtual marketplace 22 by creating a digital representation of the exchange item. To do this, the server creates a digital image of the exchange item, determines the brand of the exchange item, and the information regarding the exchange item (e.g., a brief description, brand, selling price, balance, serial number, restrictions (if any), expiration date (if any), and/or any other pertinent information). In accordance with an organization protocol of the virtual marketplace, the digital representation of the exchange item is added. For instance, the organization protocol groups exchange items by types (e.g., restaurants, sporting goods, coffee shops, automotive goods, etc.), by brands (e.g., a sporting goods chain, a coffee shop chain, etc.), by sales price, by balance of the exchange item, by a savings value (e.g., a difference between the balance and the sales price), by expiration date, by date offered for sale, by special promotions, by seller, by restrictions, by a brief description (e.g., title of a video for resale), and/or any other organization scheme that lends itself to searching for particular items.

As such, for a particular exchange item offered for sale, its digital representation is added to the database 20 and will be displayed within a grouping per the organization protocol when a potential buyer or other user of the system 10 selects the grouping. In one example, if the exchange item is a gift card, a digital image of the gift card is displayed along with at least some of the related information (e.g., sales price, balance, etc.). If the gift card includes a logo of the branded company offering the gift card, the logo is often displayed in accordance with requirements of the branded company.

A potential buyer of an exchange item offered for sale access the system 10 using its user device 16. For example, the user device 16 logs into the system 10. If the user device 16 is associated with a buyer that does not have an account with the system 10, the buyer creates one through the user device 16 with the system. For buyers with an account, the marketplace server 18 verifies the buyer user device 16 before allowing it access to the virtual marketplace 22. The buyer verification process is discussed in greater detail with reference to one or more of FIGS. 5, 6A-6D, 13, and 20A-20D.

Once the buyer is verified, the buyer computing device 16 is allowed access the virtual marketplace 22. The buyer computing device 16 uses searching criteria that are in accordance with the organization protocol to search the virtual marketplace 22 for exchange items of interest. The marketplace server 18 provides video-graphics data to the buyer computing device 16 in accordance with the searching. When the buyer computing device 16 finds exchange items of interest, it displays the video-graphics of the corresponding exchange items (e.g., a grouping of gift cards).

The buyer computing device 16 receives an input corresponding to a selection of one of the exchange items of interest for purchase. The buyer computing device 16 sends the selected exchange item to the marketplace server 18 for processing.

The marketplace server 18 processes the selected exchange item via a multiple step process. One step includes verifying that the buyer is authorized to purchase the exchange item (e.g., has the financial resources, is not limited by buying restrictions (e.g., dollar amount, quantity, type, etc.), is a legitimate buyer, etc.). Another step includes verifying integrity of the information of the selected exchange item (e.g., balance remaining is accurate, the offer to sell the exchange item has not been withdrawn, the exchange item is not currently being processed for sale to another buyer, the exchange item is not expired, the exchange item has not been voided by the branded company, etc.).

When the buyer is authorized and the information regarding the selected exchange item has been verified, another step includes removing the exchange item from the virtual marketplace 22. Another step includes processing payment for the selected exchange item. The multiple step buying process is further described with reference to one or more of FIGS. 5, 6A-6D, 11-14, and 20A-20D.

Figure 3:
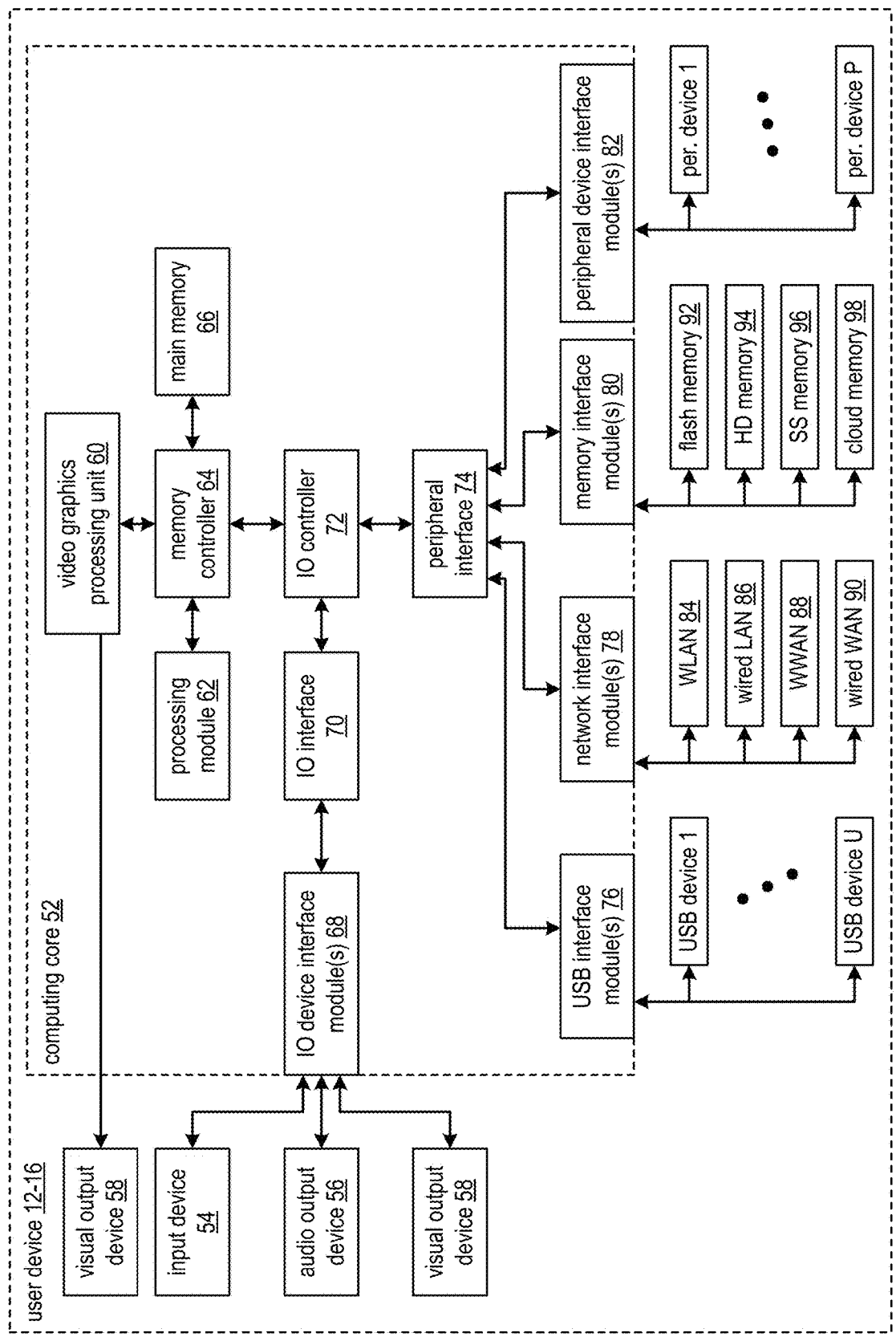
FIG. 3 is a schematic block diagram of an embodiment of user device of exchange item marketplace network in accordance with the present invention.

FIG. 3 is a schematic block diagram of an embodiment of computing device 12-16 of exchange item marketplace network 10. The computing device 12-16 includes a computing core 52, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more universal serial bus (USB) devices, one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices.

The computing core 52 includes a video graphics processing unit 60, one or more processing modules 62, a memory controller 64, main memory 66 (e.g., RAM), one or more input/output (I/O) device interface module 68, an input/output (I/O) interface 70, an input/output (I/O) controller 72, a peripheral interface 74, one or more USB interface modules 76, one or more network interface modules 78, one or more memory interface modules 80, and/or one or more peripheral device interface modules 82. Each of the interface modules 68, 76, 78, 80, and 82 includes a combination of hardware (e.g., connectors, wiring, etc.) and operational instructions stored on memory (e.g., driver software) that is executed by the processing module 62 and/or a processing circuit within the interface module. Each of the interface modules couples to one or more components of the computing device 12-16. For example, one of the IO device interface modules 68 couples to an audio output device 56. As another example, one of the memory interface modules 80 couples to flash memory 92 and another one of the memory interface modules 80 couples to cloud memory 98 (e.g., an on-line storage system and/or on-line backup system).

FIG. 4 is a schematic block diagram of an embodiment of a marketplace server 18 of exchange item marketplace network 10. The server 18 includes a computing core 122, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices. Note that the server 18 may include more or less devices than shown in this example embodiment of a server.

The computing core 122 includes a video graphics processing unit 60, a plurality of processing modules 62, a memory controller 64, a plurality of main memories 66 (e.g., RAM), one or more input/output (I/O) device interface module 68, an input/output (I/O) interface 70, an input/output (I/O) controller 72, a peripheral interface 74, one or more network interface modules 78, and/or one or more memory interface module 80.

Figure 5:
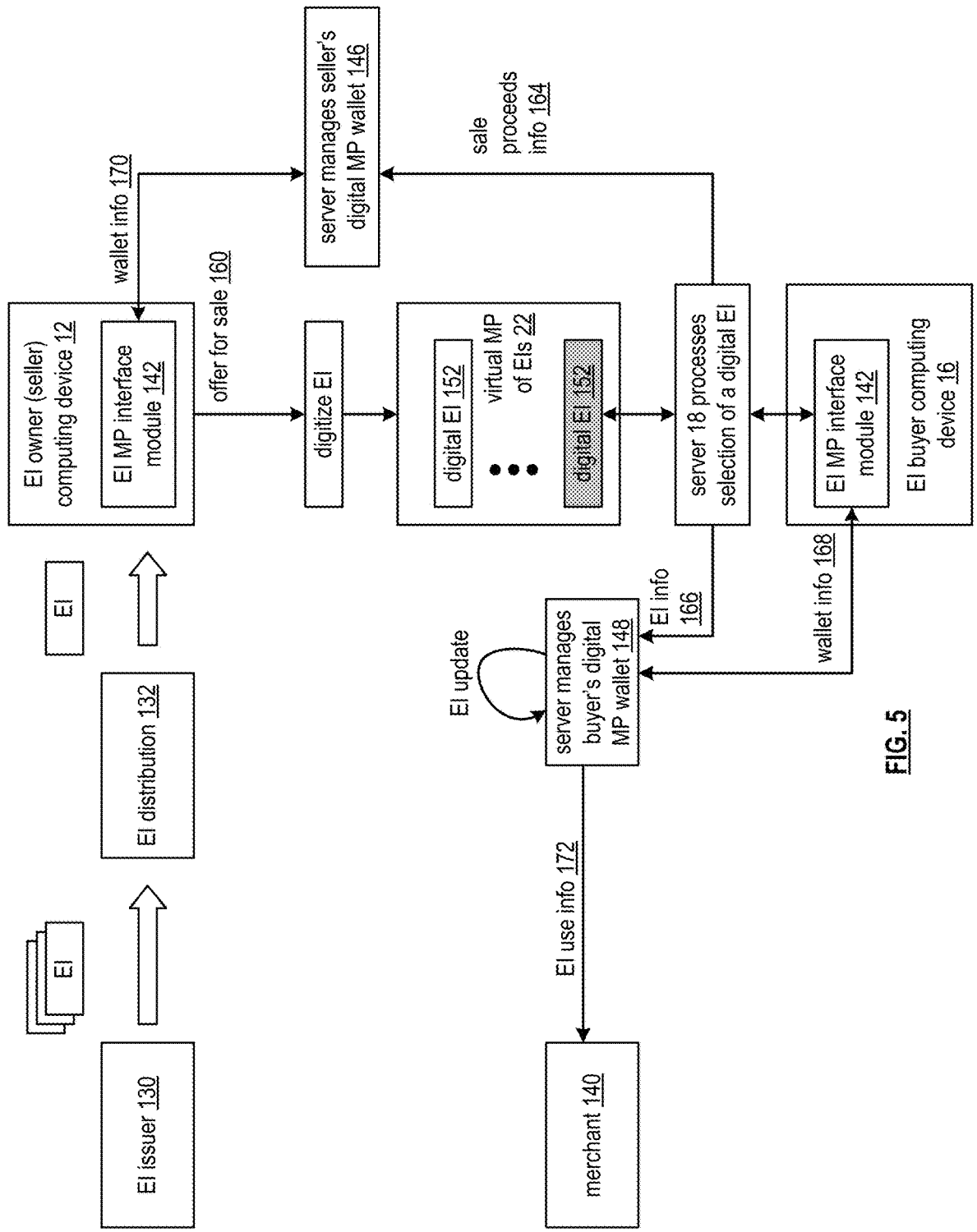
FIG. 5 is a schematic block diagram of an example of operation of an exchange item marketplace network in accordance with the present invention.

FIG. 5 is a schematic block diagram of an example of operation of an exchange item marketplace network 10. In this example, an exchange item (EI) issuer 130 issues a plurality of exchange items (e.g., closed loop financial instruments and/or other digital goods), which are distributed to consumers by an EI distributor 132. At some point in time, a consumer owns one of the exchange items (e.g., purchases the exchange item, is given the exchange item as a gift, is given the exchange item as compensation, etc.). At some later point in time, the owner of the exchange item decides to sell it.

To sell the exchange item, the owner of the EI evokes an EI marketplace (MP) interface module 142 on its computing device 12 or 14. The EI MP interface module 142 includes a browser application, a mobile device application, and/or any type of application that enables access to the virtual marketplace of exchange items 22. The computing core 52 of the user device executes one or more of these applications. For instance, each of the applications includes operational instructions that are stored in memory (e.g., main memory, flash memory, SS memory, HD memory, and/or cloud memory) and executed by the processing module 62 of the computing core 52. Alternatively, the EI MP interface module 142 includes a processing circuit and memory, wherein the memory stores and the processing circuit executes the operational instructions of the application. As yet another alternative, the processing circuit of the EI interface module 142 and the processing module 62 of the computing core 52 co-process the operational instructions of one or more of the applications.

With the EI MP interface module 142 operational on the computing device 12, the computing device 12 provides information regarding the EI for sale to the server 18 of the network 10. The information includes a type of EI (e.g., a gift card, a voucher, a credit, a digital good, etc.), brand information, if any, (e.g., a chain store, a restaurant, etc.), a balance remaining on or value of the exchange item, a sales price, a serial number and/or other identifying data regarding the exchange item.

The server 18 digitizes the exchange item to create a digital exchange item 152, which is added to the virtual marketplace of exchange items 22. For example, if the exchange item is a gift card, the digital exchange item 152 is a digital representation of the gift card (e.g., a rendered digital picture of the gift card, including any relevant logos). As another example, if the exchange item is a digital good (e.g., a video game), the digital exchange item 152 is a digital representation of packaging of the digital good. Note that the server 18 may be interacting with hundreds to hundreds of thousands of seller computing device 12-14 to post exchange items for sale in the virtual marketplace of exchange items 22.

For an exchange item 152 in the virtual marketplace of exchange items 22, its digital representation is displayed along with its relevant information (e.g., sales price, a discount percentage, restrictions (if any), etc.). The exchange item 152 is typically grouped and displayed with other like exchange items. For example, if the exchange item is a gift card for a particular coffee shop, it is grouped with other gift cards from the same coffee shop. The grouping of like exchange items may be further refined by sub-grouping based on one or more of sales price, time on the marketplace, discount amount, remaining balance, etc.

A buyer desiring to purchase an exchange item offered for sale 160 in the marketplace of exchange items 22 utilizes its computing device 16 and its EI MP interface module 142 to access the marketplace 22. While accessing the marketplace 22, the buyer, via the EI MP interface module 142 and the computing device 16 selects one of the exchange items to purchase, which is shaded gray.

The server 18 processes the selection of the exchange item by verifying the buyer, the buyer's computing device, the buyer's purchasing abilities, and/or the information regarding the selected exchange item. When verified, the server removes the selected exchange item from the marketplace 22 and places it in the buyer's digital wallet 148. To do this, the server processes the buyer's wallet information 168 (e.g., the buyer's ID, buyer account ID, buyer use restrictions (if any), etc.) and the information 166 of the selected exchange item. For example, the buyer's digital wallet includes a digital representation of the recently purchased exchange item and the corresponding information. The recently purchased exchange item is displayed in a categorical manner (e.g., date of purchase, type of exchange item, value or remaining balance of exchange item, etc.).

In addition, the server processes the financial transaction for the purchase of the selected exchange item. For example, the server 18 communicates with the financial server of the buyer to receive the funds for the purchase. The server then dispenses the funds to the seller, less processing and/or commission fees. The funds may be dispensed to seller in a variety of ways. For example, the server 18 transfers the seller's funds to a financial server of the seller (e.g., the seller's bank and/or other financial service institution). As another example, the server provides the funds to the seller's digital wallet 146, which is maintained by the server 18. The seller may withdraw the funds, or a portion thereof, from its wallet (e.g., as instructed via the seller's computing device, the server 18 transfers the selected amount of the funds to the seller's financial service's server). As another example, the seller acts as a buyer to buy an exchange item from the marketplace 22 and the funds in the wallet are used to pay for the purchased exchange item.

When the buyer utilizes the exchange item, certain transaction information associated with the utilizing of the exchange item may be communicated as EI use information 172 to a merchant 140. The EI use information 172 includes one or more of a brand identifier, a balance, an amount utilized for a utilization transaction, and a timestamp.

Figure 6A:
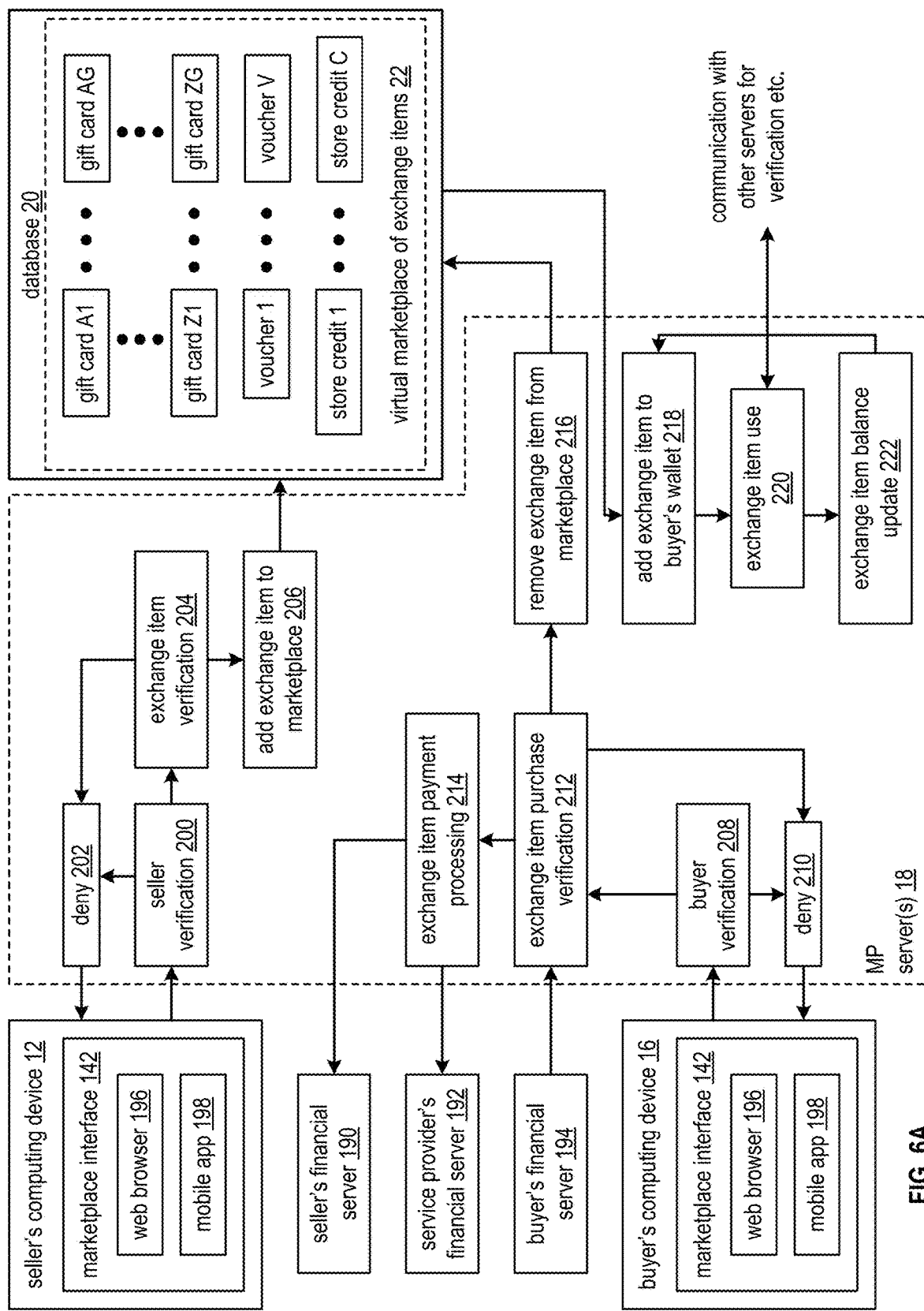
FIG. 6A is a schematic block diagram of another embodiment of an exchange item marketplace network in accordance with the present invention.

FIG. 6A is a schematic block diagram of another embodiment of an exchange item (EI) marketplace (MP) network that includes the seller's computing device 12, the buyer's computing device 16, a seller's financial server 190, a service provider's financial server 192, a buyer's financial server 194, the marketplace (MP) server(s) 18, and the database 20, which includes the virtual marketplace of exchange items 22. Each of the seller's computing device 12 and buyer's computing device 16 includes the (EI) marketplace interface 142, which includes a web browser 196 and a mobile application 198.

The MP server 18 performs function blocks that includes a seller verification 200, a deny 202, an exchange item verification 204, an add exchange item to marketplace 206, a buyer verification 208, a deny 210, an exchange item purchase verification 212, an exchange item payment processing 214, a remove exchange item from marketplace 216, an add exchange item to buyer's wallet 218, an exchange item use 220, and an exchange item balance update 222.

As an example of operation, the mobile application 198 of the seller's computing device 12 sends a request to sell an exchange item to the marketplace (MP) server(s) 18. The server 18 performs the seller verification 200 functional block to determine whether the seller and/or the seller's computing device 12 are a valid seller (e.g., device and/or seller are valid). When invalid, the server(s) 18 performs the deny 202 functional block to communicate a denial of the request to sell the exchange item to the seller's computing device 12.

When the seller is verified, the server performs the exchange item verification 204 functional block to determine whether the exchange item is valid (e.g., is a valid exchange item, perform a balance check with an associated entity, i.e., a retailer, etc.). When invalid, the server(s) perform the deny 202 functional block. When the exchange item is valid, the server(s) 18 perform the add exchange item to marketplace 206 functional block to add a digital representation of the exchange item to the virtual marketplace of exchange items 22 (e.g., creates a new entry for inventory within the virtual marketplace of exchange items 22).

When a buyer desires to purchase an exchange item, the mobile application 198 of the buyer's computing device 16 sends a request to buy a selected exchange item to the MP server(s) 18. The server(s) 18 perform the buyer verification 208 functional block to determine whether the buyer is valid (e.g., the user and/or buyer computing device are valid). When invalid, the server(s) 18 perform the deny 210 functional block to issue a denial of the purchase request to the buyer's computing device 16.

When the buyer is validated, the server(s) 18 perform the exchange item purchase verification 212 functional block to verify that the buyer, via the buyer's computing device, has sufficient means (e.g., money, credit, valid credit card, valid debit card, etc.) to pay for the selected exchange item. For example, the exchange item purchase verification 212 functional block enables the server 18 to receive buyer information from the buyer's financial server 194 verifying payment and/or verifying an ability to pay. When unable to purchase the selected exchange item, the server 18 performs the deny 210 functional block.

When the buyer is able to purchase the selected exchange item, the server 18 performs the exchange item payment processing 214 functional block to process payment for the selected exchange item. For example, the server 18 collects payment from the buyer's e-wallet, the buyer's computing device 16, or the buyer's financial server 194, issues a payment to the seller's e-wallet, to the seller's computing device, or to the seller's financial server 190, and issues a commission payment to the service provider's financial server 192.

After processing payment or concurrent with the processing of the payment, the server 18 performs the remove exchange item from marketplace 216 functional block to remove the selected exchange item from the virtual marketplace of exchange items 22. For example, the server 18 deletes an entry associated with the selected exchange item from the database 20.

The server 18 performs the add exchange item to the buyer's wallet 218 functional block to facilitate adding the exchange item to a buyer's e-wallet. For example, the server 18 updates a representation of the buyer's wallet within the database 20 to include a digital representation of the purchased exchange item and issues a message to the mobile application 198 to store a local copy of the digital representation within the buyer's computing device 16.

When the buyer desires to purchase something using an exchange item, the mobile application 198 communicates a utilization message to the server 18. The server 18 evokes the exchange item use 220 functional block to receive the utilization message and to facilitate communication with other servers for verification and transaction execution. For example, the server 18 forwards the utilization message to a retailer server associated with the exchange item to initiate execution of the transaction. Having successfully used the exchange item, the server 18, via the exchange item balance update 222 functional block, updates the buyer's wallet to indicate that the exchange item has been utilized and to update the balance remaining on the exchange item, when appropriate.

Figure 6B:
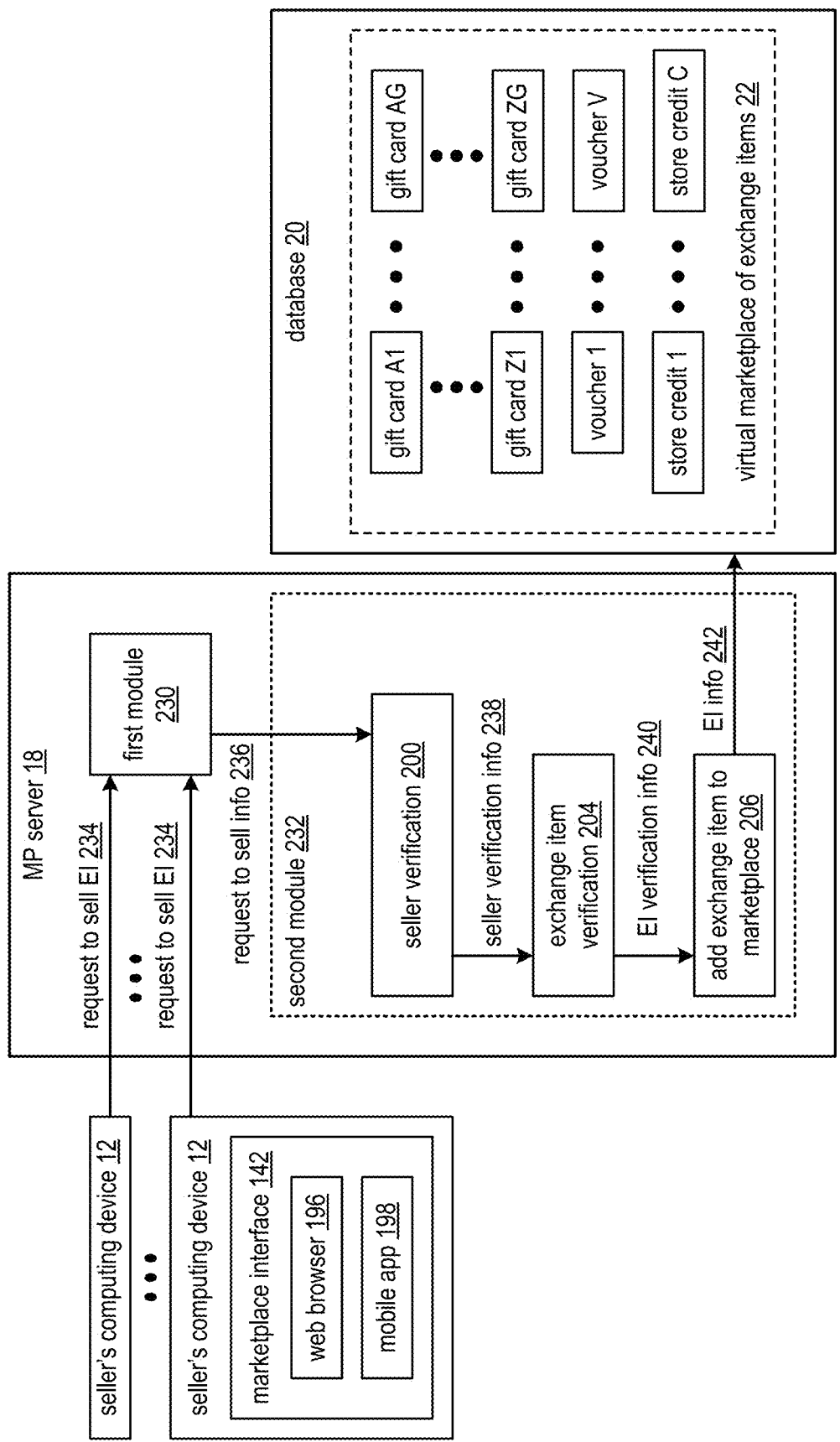
FIG. 6B is a schematic block diagram of an embodiment of seller portion of an exchange item marketplace network in accordance with the present invention.

FIG. 6B is a schematic block diagram of an embodiment of seller portion of an exchange item marketplace network that includes a plurality of seller's computing devices 12, the marketplace (MP) server(s) 18, and the database 20, which stores the virtual marketplace 22. Each of the seller's computing devices 12 include the marketplace interface 142, which includes the web browser 196 and the mobile application 198.

The MP server 18 includes a first module 230 to process receiving of requests to sell exchange items 234 and a second module 232 to process a selected request to sell an exchange item. The second module 232 includes several sub-modules (e.g., more modules). In an embodiment, the second module 232 includes the seller verification 200 functional block, the exchange item verification 204 functional block, and the add exchange item to marketplace 206 functional block.

In an example of operation, the first module 230 receives requests to sell exchange items (EI) 234 from the seller computing devices 12. Each request includes information regarding the exchange item being offered for sale. The information includes one or more of a selling price, branding information, a description of the exchange item (if applicable), a value of the exchange item, restrictions regarding the exchange item, etc.

The first module 230 provides the requests to the second module 232, which processes the requests to sell in a serial manner, in a parallel manner, and/or in a combined serial-parallel manner. For each request to sell, the second module 232 processes the request via the seller verification functional block 200, the exchange item verification functional block 204, and the add exchange item to the marketplace functional block 206.

The server(s) 18 perform the seller verification functional block 200 to verify seller information (e.g., information regarding the seller and/or information regarding the seller computing device). Accordingly, the server 18 verifies the information regarding the seller and/or seller computing device by one or more of verifying user information (e.g., user name, user account number, personal information number (PIN), user identifier, payment account info, etc.) associated with the seller computing device and verifying device information (e.g., Internet protocol (IP) address of the seller user device, authorized seller user device serial number, the seller user device is utilizing an authorized mobile application 198, etc.) of the seller computing device.

When the seller information is favorably verified 238, the server 18 performs the exchange item verification functional block 204 to verify information regarding the exchange item being offered for sale. Accordingly, the server 18 determines validity of one or more of a brand identifier (e.g., and/or an exchange item type indicator) of the exchange item, a value of the exchange item, and a serial number of the exchange item. For example, the server 18 compares the information regarding the exchange item provided by the seller to information and/or rules stored in the database 20. For instance, the server verifies the serial number and/or format of the serial number for the brand identifier. Further, the server 18 verifies the value of the exchange item by issuing a value verification request to an external entity and receiving a verification response thereto.

When the exchange item is verified 240, the server 18, via the exchange item verification 204 functional block, further determines a selling price for the exchange item. For instance the server uses one or more seller software tools as is discussed with reference to FIG. 16.

The server 18 also performs the add exchange item to marketplace functional block 206 to add the exchange item to marketplace of exchange items 22 (e.g., a digital exchange item marketplace). The adding includes creating a digital representation of the exchange item. The digital representation of the exchange item includes one or more of an image of the exchange item when the exchange item is a physical entity, the brand, serial number, the value, the selling price, the discount level, and the identifier of the seller user device. The adding further includes associating the selling price with the digital representation of the exchange item and adding the digital representation with the associated selling price to the digital exchange item marketplace. For example, the add exchange item to marketplace 206 issues exchange item information 242 to the database 20 for storage in the virtual marketplace of exchange items 22. The exchange item information 242 includes one or more of the association of the selling price to the digital representation and the digital representation of the exchange item.

Figure 6C:
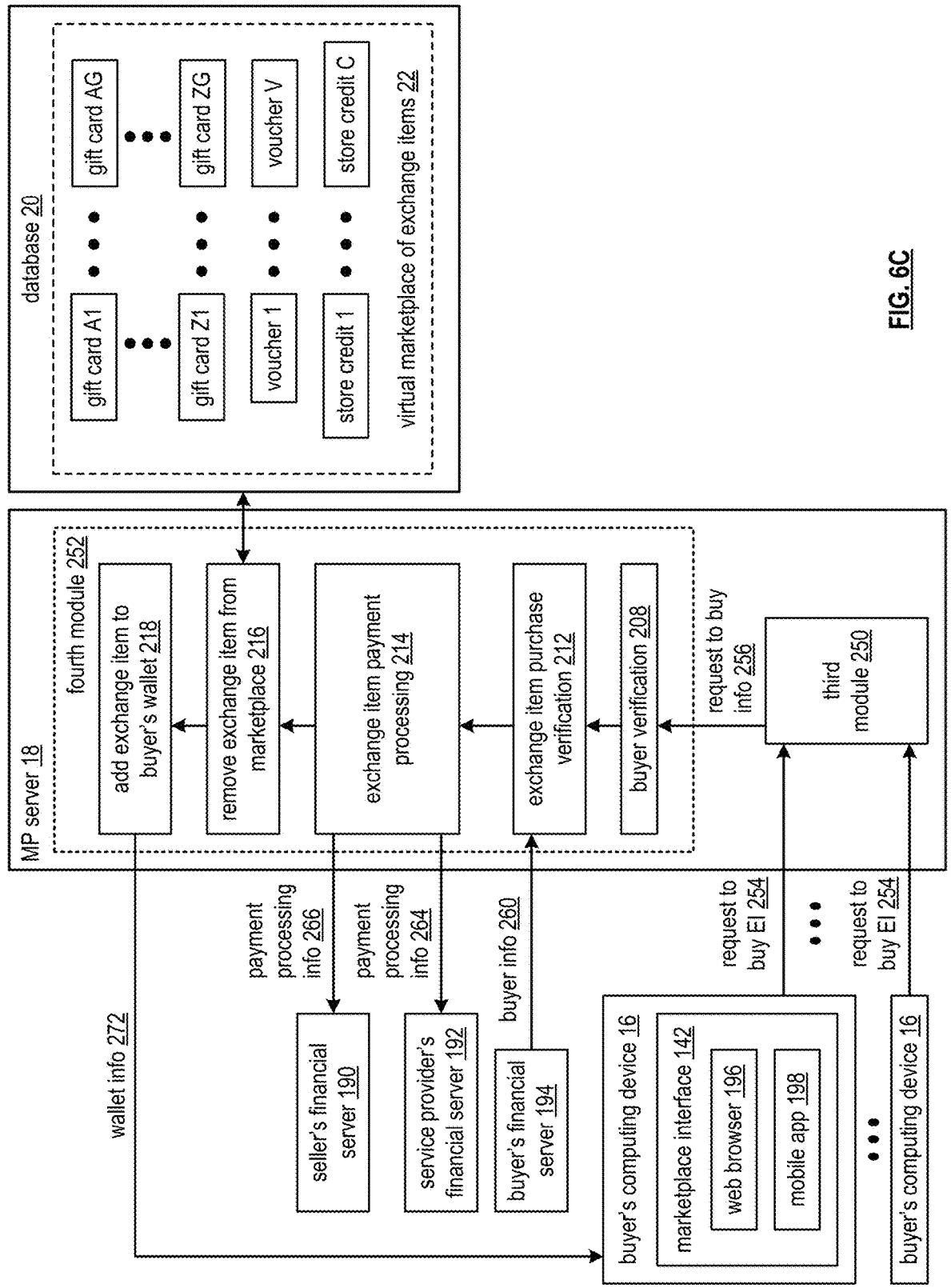
FIG. 6C is a schematic block diagram of an embodiment of buyer portion of an exchange item marketplace network in accordance with the present invention.

FIG. 6C is a schematic block diagram of an embodiment of buyer portion of an exchange item marketplace network that includes buyer's computing devices 16, the marketplace (MP) server(s) 18, the database 20 that stores the virtual marketplace 22, the buyer's financial server 194, the service provider's financial server 192, and the seller's financial server 190. Each buyer computing device 16 includes the marketplace interface 142, which includes the web browser 196 and the mobile application 198.

The MP server 18 includes a third module 250 to receive requests to buy and a fourth module 252 to process the requests to buy. The fourth module 252 includes the buyer verification 208 functional block, the exchange item purchase verification 212 functional block, the exchange item payment processing 214 functional block, the remove exchange item from marketplace 216 functional block, and the add exchange item to buyer's wallet 218 functional block.

In an example of operation, the third module 250 receives requests to buy 254 from the buyer computing devices. Each request to buy 254 includes one or more of a brand identifier, an exchange item (EI) type indicator, a purchase price, a purchase price range, purchase terms (e.g., payment timing, delivery timing, payment method, etc.), buyer payment account information (e.g., credit or debit card information, Apple Pay™ information, PayPal™ information, etc.), buyer user device information (e.g., buyer name, exchange item marketplace identifier, etc.), security information (e.g., buyer PIN, digital security certificate information, etc.), and other buyer information (e.g., security question responses, etc.). The server(s) 18 process the requests to buy in a serial manner, in a parallel manner and/or in a serial-parallel manner. For example, the server 18 may process the requests to buy based on one or more of a random selection, a first in first out approach, a buyer prioritization approach, a brand based approach, a discount level approach, a serial number based approach, an EI value ranking approach, and a market efficiency optimizing approach.

The fourth module 252 begins processing of a request to buy via the buyer verification 208 functional block to verify buyer information (e.g., buyer information and/or information regarding the computing device). The verifying includes one or more of verifying user information (e.g., buyer name, buyer account information, buyer PIN, buyer user ID, buyer payment account info, etc.) associated with the buyer computing device, verifying device information (e.g., buyer user device IP address, buyer user device serial number, version of buyer's user device mobile application 198, etc.) of the buyer computing device, and executing a verification tree process.

The buyer verification 208 functional block includes a verification tree process that issues a series of questions to the buyer computing device and/or the buyer's financial server 194, receives a series of responses from the buyer computing device, and evaluates the series of responses in an effort to verify the information regarding the buyer computing device. An example of the verification tree process will be discussed in greater detail with reference to one or more of FIGS. 20A-20D.

When the information regarding the buyer computing device is favorably verified, the server 18 performs the exchange item purchase verification 212 functional block to verify payment. The verifying includes verifying information regarding the selected exchange item and verifying buyer payment account information in light of the verified information regarding the selected exchange item.

The verifying the information regarding the selected exchange item includes one or more of accessing the virtual marketplace of exchange items 22 to verify that the selected exchange item is still for sale, verifying that an alternative exchange item is available when the selected exchange item is now unavailable, verifying the balance, verifying the purchase price to a selling price, and verifying that any selling restrictions are met (e.g., transaction timing, payment type, etc.). The verifying buyer payment account information includes one or more of receiving buyer information 260 from the buyer's financial server 194 indicating payment approval, verifying that any buying restrictions have been met, and verifying validity of buyer financial payment information. For example, the exchange item purchase verification 212 indicates favorable payment verification information when verifying that the selected exchange item is still available for sale at the purchase price and that the buyer user device 16 is able to make the payment.

When the payment information is favorably verified, the server 18 performs the exchange item payment processing 214 functional block to process payment for the selected exchange item. The server 18 processes the payment for the selected exchange item utilizing one or more payment processing steps. As an example of the one or more payment processing steps, the exchange item payment processing 214 functional block determines a transaction processing fee (e.g., a credit card payment fee of 3% of the selling price), determines a commission fee (e.g., a flat rate fee of 15% of the selling price for the marketplace operator, a variable fee based on other factors, may further include the transaction processing fee), debits an account associated with the buyer computing device for the selling price of the selected exchange item (e.g., completing a transaction with the buyer's financial server 194), credits an account associated with the seller computing device for the selling price less the commission fee (e.g., issues payment processing information 266 to the seller's financial server 190), and credits one or more accounts for the transaction processing fee and for the commission fee (e.g., issuing payment processing information 264 for the commission fee to the service provider's financial server 192).

When the payment processing information 264 indicates that the payment has been successful, the server 18 performs the remove exchange item from marketplace 216 functional block to remove the selected exchange item from the digital exchange item marketplace. In addition, the server performs the add exchange item to buyer's wallet 218 functional block to add the selected exchange item to a digital wallet associated with the buyer computing device. For example, when the digital wallet is active, the server provides a digital representation of the selected exchange item and exchange item information to the buyer's computing device for display thereon. For example, the server 18 generates wallet information 272 from the exchange item information and sends the wallet information 272 to the buyer's computing device 16 for storage and display. The wallet information 272 includes the digital representation (e.g., an image of the exchange item when the exchange item represents a physical item) of the selected exchange item and the exchange item information (e.g., EI type, brand, balance, serial number, PIN, etc.).

Figure 6D:
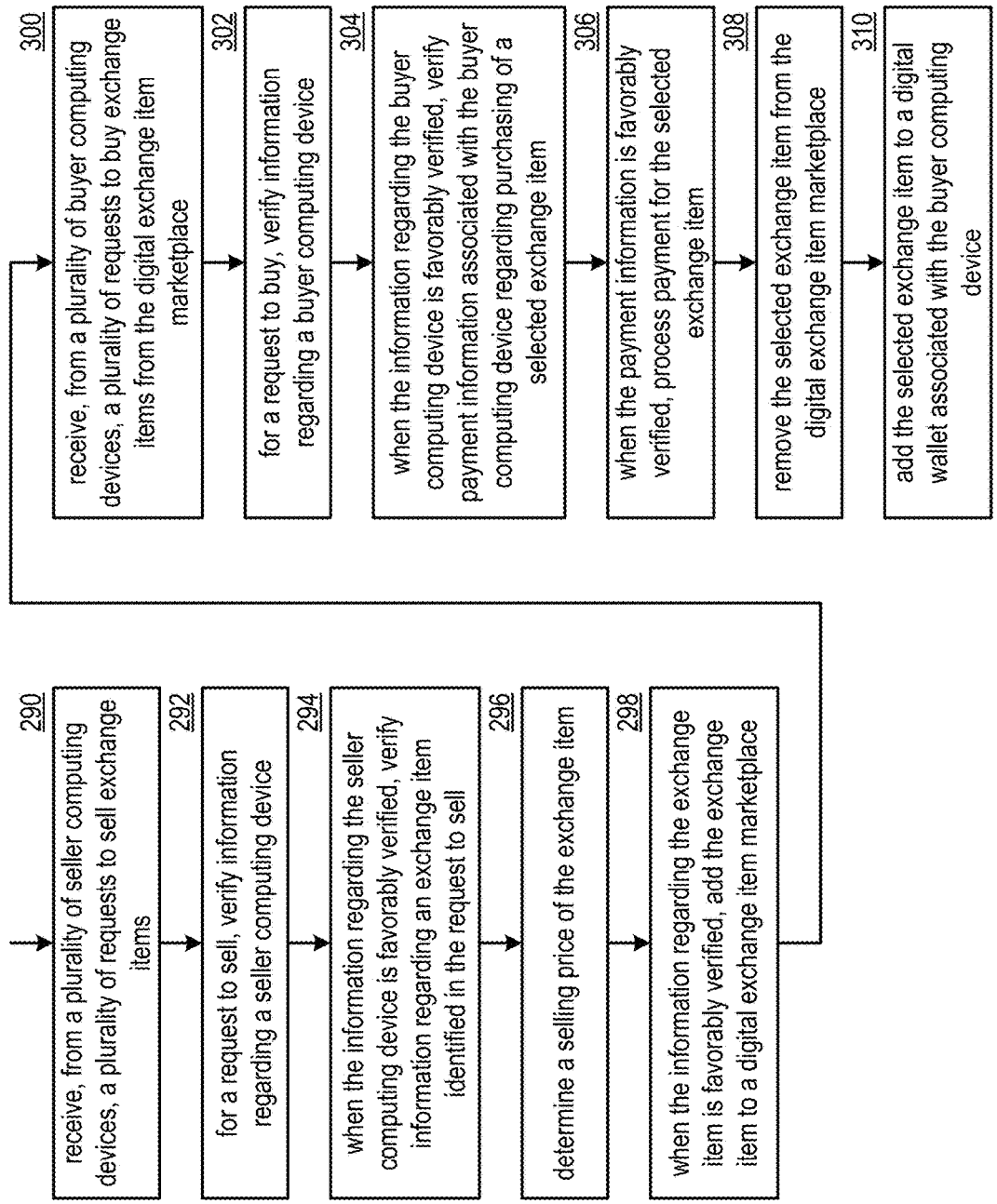
FIG. 6D is a flowchart illustrating an example of exchanging exchange items within an exchange item marketplace network in accordance with the present invention.

FIG. 6D is a flowchart illustrating an example of buying and selling exchange items within an exchange item marketplace network. The method includes step 290 where a processing module of a computing device and/or a server receives requests to sell exchange items from seller computing devices. For a request to sell, the method continues at step 292 where the processing module processes the request to sell by verifying information regarding a seller's computing device associated with the request to sell. The verifying includes one or more of verifying user information (e.g., seller name, seller account, seller PIN, seller ID, seller payment account info, etc.) associated with the seller computing device and verifying device information (e.g., seller user device IP address, seller user device serial number, seller user device application information, etc.) of the seller's computing device.

When the information regarding the seller's computing device is favorably verified, the method continues at step 294 where the processing module verifies information regarding an exchange item identified in the request to sell. The verifying includes determining that a brand identifier of the exchange item, a value of the exchange item, and a serial number of the exchange item are valid. When the brand identifier of the exchange item, the value of the exchange item, and the serial number of the exchange item are valid, the method continues at step 296 where the processing module determines a selling price for the exchange item. For example, the processing module utilizing seller software tools to establish a selling price.

When the information regarding the exchange item is favorably verified, the method continues at step 298 where the processing module adds the exchange item to a digital exchange item marketplace. The adding includes one or more of creating a digital representation of the exchange item, associating a selling price with the digital representation of the exchange item, and adding the digital representation with the associated selling price to the digital exchange item marketplace.

The method includes step 300 where the processing module receives requests to buy exchange items from buyer computing devices. For a request to buy, the method continues at step 302 where the processing module begins to process the request to buy by verifying information regarding a buyer computing device (e.g., buyer user information and/or information regarding the buyer computing device) associated with the request to buy. The verifying includes one or more of verifying user information associated with the buyer computing device (e.g., buyer user name, buyer account information, buyer PIN, buyer user ID, buyer payment account info, etc.), verifying device information (e.g., buyer device IP address, buyer device serial number, buyer device application identification, etc.) of the buyer computing device, and executing a verification tree process.

When the information regarding the buyer computing device is favorably verified, the method continues at step 304 where the processing module verifies payment information associated with the buyer computing device regarding purchasing of a selected exchange item (e.g., buyer information and exchange item information). The verifying includes one or more of verifying information regarding the selected exchange item (e.g., the EI is still valid, verify balance, verify selling price, selling restrictions, etc.) and verifying buyer payment account information in light of the verified information regarding the selected exchange item (e.g., buyer has sufficient funds, any buying restrictions have been satisfied, buyer financial payment information is valid, etc.).

When the payment information is favorably verified, the method continues at step 306 where the processing module processes payment for the selected exchange item. The processing of the payment for the selected exchange item includes one or more steps. Examples of the steps includes determining a transaction processing fee (e.g., credit card payment fee), determining a commission fee (e.g., flat rate for the marketplace service provider, variable fee based on other factors, may include the transaction processing fee), debiting an account associated with the buyer computing device for the selling price of the selected exchange item, deciding to credit an account associated with the seller computing device for the selling price less the commission fee, and crediting one or more accounts for the transaction processing fee and for the commission fee (e.g., transaction processing fee to credit card affiliate, commission less transaction processing fee to market place operator/service provider).

The method continues at step 308 where the processing module removes the selected exchange item from the digital exchange item marketplace. For example, the processing module updates a database associated with the digital exchange item marketplace to delete an entry associated with the purchased exchange item.

The method continues at step 310 where the processing module adds the selected exchange item to a digital wallet associated with the buyer's computing device. The adding includes, when the digital wallet is active, providing a digital representation of the selected exchange item and exchange item information to the buyer's computer device for display thereon.

FIG. 7 is a flowchart illustrating an example of seller verification for an individual seller 330 within an exchange item marketplace network. The method includes step 332 where a seller's computing device 12 registers with the marketplace network 10 (e.g., with a marketplace server 18 via a network). For example, the seller's computing device registers by issuing a registration request to the marketplace server 18, where the registration request includes one or more of a seller identifier, a seller user device identifier, seller payment information, an identifier of an exchange item for sale, and other information describing the exchange item for sale.

The method continues at step 334 where the marketplace server 18 lists the exchange item for sale. The listing includes updating the virtual marketplace of exchange items to provisionally include an entry for the exchange item for sale, but not display it for sale. The provisional entry of the exchange item includes one or more of the identifier of the exchange item for sale, at least some of the other information describing the exchange item for sale, a balance associated with exchange item for sale, and a discount level associated with exchange item for sale.

The method continues at step 336 where the marketplace server 18 verifies the seller's computing device. The verifying includes one or more of determining whether to allow the seller to sell the exchange item and determining whether to allow the seller's computing device to be utilized in the selling of the exchange item for sale. The method continues to step 338 where, when the seller computing device has been favorably verified, the seller's computing device accepts terms and conditions associated with the offering of the exchange item for sale from the marketplace server.

FIG. 8 is a flowchart illustrating an example of offering an exchange item for sale by an individual seller within an exchange item marketplace network. The method begins or continues at step 350 where a seller's computing device associated with an individual seller accesses an exchange item marketplace network. The method continues at step 352 where the marketplace server 18 determines whether the individual seller has an account with the exchange item marketplace network 10. For example, the marketplace server accesses accounts information to identify an entry associated with the individual seller.

When the individual seller does not have the account, the method continues at step 354 where the marketplace server 18 creates a new entry within the accounts information for the individual user and/or seller user device (e.g., generating the new entry to include one or more of an identifier of the individual seller, an identifier of the seller user device, a personal identification number (PIN), seller payment information, seller address, etc.).

When the individual seller has the account or has just created an account, the method continues at step 356 where the seller's computing device logs in to access to the exchange item marketplace network. The method continues at step 358 where the marketplace server accesses the account information for the individual seller. The method continues at step 360 where the marketplace server determines whether the accessed account information for the individual seller is valid. For example, the marketplace server compares a listed address of the seller to a list of valid addresses. As another example, the marketplace server receives a query response to a query request regarding the seller payment information (e.g., verifying banking information).

When the account information is invalid, the method continues at step 362 where the marketplace server facilitates performing an alternate verification process. The alternate verification process includes one or more of informing an operator to perform a manual verification, verifying another aspect of portions of the seller account information, issuing a verification request to an external entity, and interpreting a received verification response. When the verification was unsuccessful, access to the marketplace is denied.

When the verification was successful, the method continues at step 370 where the seller's computing device provides a brand of an exchange item for sale. For example, the seller user device issues exchange item information to the marketplace server, where the exchange item information includes an identifier of the exchange item for sale and other information associated with exchange item for sale.

The method continues at step 372 where the marketplace server determines whether a brand identifier of the exchange item for sale is valid. For example, the marketplace server compares the brand identifier to a list of valid brand identifiers. As another example, the marketplace server interprets a brand identifier verification response associated with a brand identifier verification request, where the request and response are exchanged with an external entity. As yet another example, the marketplace server indicates that the brand is valid when a received serial number of the exchange item for sale from the seller user device compares favorably to at least one valid serial number associated with the brand.

When the marketplace server determines that the brand identifier is invalid, the method continues at step 376 where the marketplace server attempts to create a valid brand (e.g., establishing a new brand for sale). For example, the marketplace server performs a brand analysis algorithm to produce a brand validity indicator. For instance, the marketplace server issues a brand establishment request to a server associated with establishment of a new brand, receives a brand establishment response, and interprets the brand establishment response to produce the brand validity indicator. When a valid brand cannot be established, the method continues at step 378 where the marketplace server denies the request to sell.

When the brand can be established, the method continues at step 380 where the marketplace server establishes the brand as a valid brand. For example, the marketplace server updates a virtual marketplace of exchange items to include in association of the brand identifier and a valid brand indicator.

With a valid brand, the method continues at step 374 where the seller's computing device provides a personal identification number (PIN) and serial number associated with the exchange item for sale. For example, the seller user device captures an image of the exchange item for sale, sends the captured image to the marketplace server, and the marketplace server interprets the captured image to produce the PIN and serial number. The method continues at step 382 where the marketplace server temporarily stores exchange item information. For example, the marketplace server facilitates storage within the virtual marketplace of exchange items of one or more of the identifier of the exchange item for sale, the serial number of the exchange item for sale, the PIN of the exchange item for sale, the captured image, the brand, the value, and a discount level.

FIG. 9 is a flowchart illustrating an example of seller verification for a bulk seller 400 within an exchange item marketplace network. The method begins or continues at step 402 where the bulk seller registers with the exchange item marketplace network. For example, a bulk seller server associated with the bulk seller's computing device issues a registration request to a marketplace server of the exchange item marketplace network. The registration request includes one or more of an identifier of the bulk seller and/or the computing device, banking information associated with the bookseller, a descriptor of potential bulk exchange items for sale.

The method continues at step 404 where the marketplace server verifies the bulk seller and/or the bulk seller's computing device. The verifying includes one or more of verifying a bulk selling organization and verifying the bulk seller's computing device. For example, the marketplace server performs a credit check on the bulk selling organization. As another example, the marketplace server compares attributes of the bulk seller's computing device (e.g., IP address, access the street, etc.) to expected attributes of the bulk seller's computing device. If not verified, the request is denied.

When the bulk seller is verified, the method continues at step 408 where the bulk seller's computing device uploads bulk file information to the marketplace server. The bulk file information includes one or more of an identifier of the bulk selling organization, an identifier of the bulk seller server, identifiers of the exchange items for sale, and other information associated with the exchange items for sale (e.g., sale price, discount level, serial numbers, personal identification numbers (PINs), etc.). The method continues at step 410 where the marketplace server performs bulk listing of information associated with the bulk file information. For example, the marketplace server adds the exchange items for sale to a virtual marketplace of exchange items.

FIG. 10 is a flowchart illustrating an example of offering an exchange item for sale by a bulk seller within an exchange item marketplace network. The method includes step 420 where a bulk seller's computing device attempts to access an exchange item marketplace network. For example, the bulk seller's computing device issues an access request to a marketplace server of the exchange item marketplace network.

The method continues at step 422 where the marketplace server determines whether the bulk seller has an account with the exchange item marketplace network. For example, the marketplace server accesses accounts information to identify an entry associated with the bulk seller. If not, the method continues at step 424 where the marketplace server creates a new entry within the accounts information for the bulk seller and/or bulk seller's computing device (e.g., generating the new entry to include one or more of an identifier of the bulk seller, an identifier of the bulk seller server, a personal identification number (PIN), bulk seller payment information, bulk seller address, etc.).

When the bulk seller has the account or newly created account, the method continues at step 426 where the bulk seller server logs in to the exchange item marketplace network. The method continues at step 428 where the marketplace server accesses the account information for the bulk seller. The method continues at step 430 where the marketplace server determines whether the accessed account information for the bulk seller is valid. For example, the marketplace server compares a listed address of the bulk seller to a list of valid addresses. As another example, the marketplace server receives a query response to a query request regarding the bulk seller payment information (e.g., verifying banking information).

When the account information is invalid, the method continues at step 432 where the marketplace server facilitates performing an alternate verification process. The alternate verification process includes one or more of informing an operator to perform a manual verification, verifying another aspect of portions of the bulk seller account information, issuing a verification request to an external entity, and interpreting a received verification response. The method continues at step 434 where the marketplace server determines whether the alternate verification process successfully verified the account information associated with the bulk seller. If not, the access request is denied.

When the account information has been verified, the method continues at step 438 where the bulk seller's computing device uploads exchange items for sale. For example, the bulk seller server sends a bulk sale request to the marketplace server, where the bulk sale request includes one or more of identifiers of the exchange items for sale, sale prices, discount levels, serial numbers, personal identification numbers (PINs), etc. The method continues at step 440 where the marketplace server stores exchange item information for the exchange items for sale. For example, the marketplace server stores the identifiers of the exchange items for sale, the sale prices, the discount levels, the serial numbers, the PINs, etc. in a virtual marketplace of exchange items associated with the marketplace server.

Figure 11:
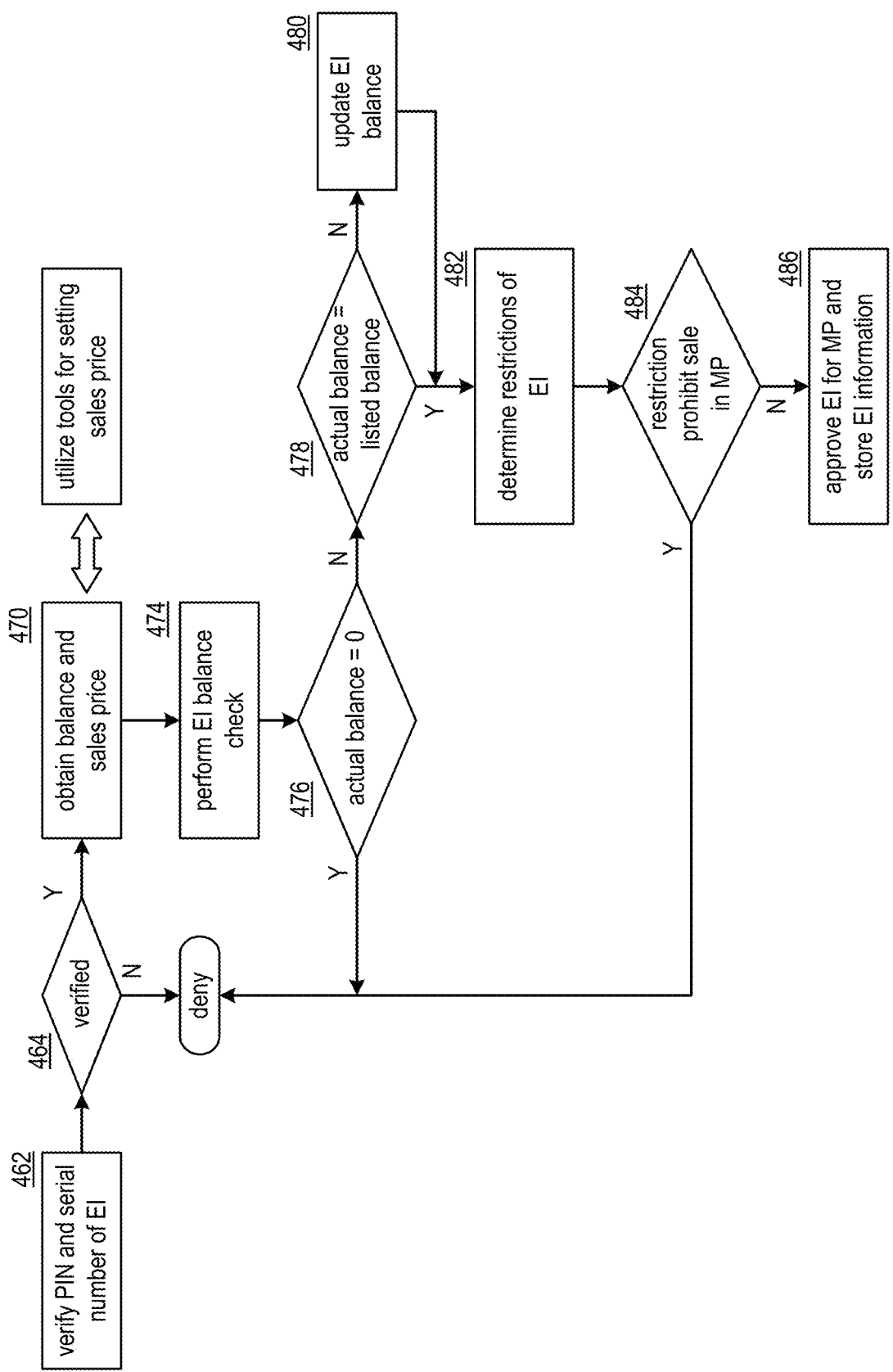
FIG. 11 is a logic diagram of an embodiment of a method of verification of an exchange item in an exchange item marketplace network in accordance with the present invention.

FIG. 11 is a flowchart illustrating an example of exchange item verification within an exchange item marketplace. The method includes step 462 where a marketplace server of an exchange item marketplace verifies a personal identification number (PIN) and a serial number of an exchange item for sale. For example, the marketplace server verifies that the serial number conforms to serial number rules associated with a particular brand associated with the exchange item for sale. As another example, the marketplace server verifies that the PIN corresponds to the serial number in accordance with one or more of the serial number rules associated with particular brand and a received serial number verification response (e.g., from an exchange item brand server).

The method continues at step 464 where the marketplace server determines whether the verification is favorable. When the verification is unfavorable, the request to add the exchange item to the marketplace is denied.

When the verification is favorable, the method continues at step 470 where the marketplace server obtains balance and sales price information. For example, the marketplace server receives balance information for the exchange item for sale and a desired price as the sales price information. The marketplace server may utilize seller software tools for setting the sales price. For example, when the user requests automatic price determination, the marketplace server determines at least one of a sales pricing range and a recommended sales price based on one or more of sales history, seller information, potential buyer information, and exchange item availability information.

The method continues at step 474 where the marketplace server performs an exchange item balance check. For example, the marketplace server issues a balance check request to a brand server associated with exchange item for sale, receives a balance check response, and compares a balance received from a seller (e.g., a listed balance) to a balance received from the brand server (e.g., an actual balance), where the balance check request includes one or more of the balance received from the seller, the serial number, and the PIN.

The method continues at step 476 where the marketplace server determines whether the actual balance is substantially equal to zero. If so, the request is denied. If not, the method continues at step 478 where the marketplace server determines whether the actual balance is substantially the same as the listed balance. If not, the method continues at step 480 where the marketplace server updates the exchange item balance (e.g., within a database of the marketplace) to indicate the actual balance.

The method continues at step 482 where the marketplace server determines restrictions (e.g., online only use, in-store only use, etc.) of the exchange item for sale. The determining may be based on one or more of a predetermination, accessing the database of the marketplace, and interpreting a restrictions query response from the brand server. The method continues at step 484 where the marketplace server determines whether the restrictions inhibit sale of the exchange item in the marketplace. The determining includes comparing circumstances of selling exchange items within the marketplace with the restrictions to produce a comparison and interpreting the comparison to determine whether the sale is prohibited. For example, the marketplace server indicates that the sale is prohibited when detecting that a particular restriction associated with the exchange item prohibits the sale by the seller (e.g., unauthorized seller). If so, the request is denied. If not, the method continues at step 486 where the marketplace server approves the exchange item for the marketplace and stores exchange item information (e.g., brand identifier, serial number, PIN, barcode information, exchange item image, actual balance, and the restrictions).

Figure 12:
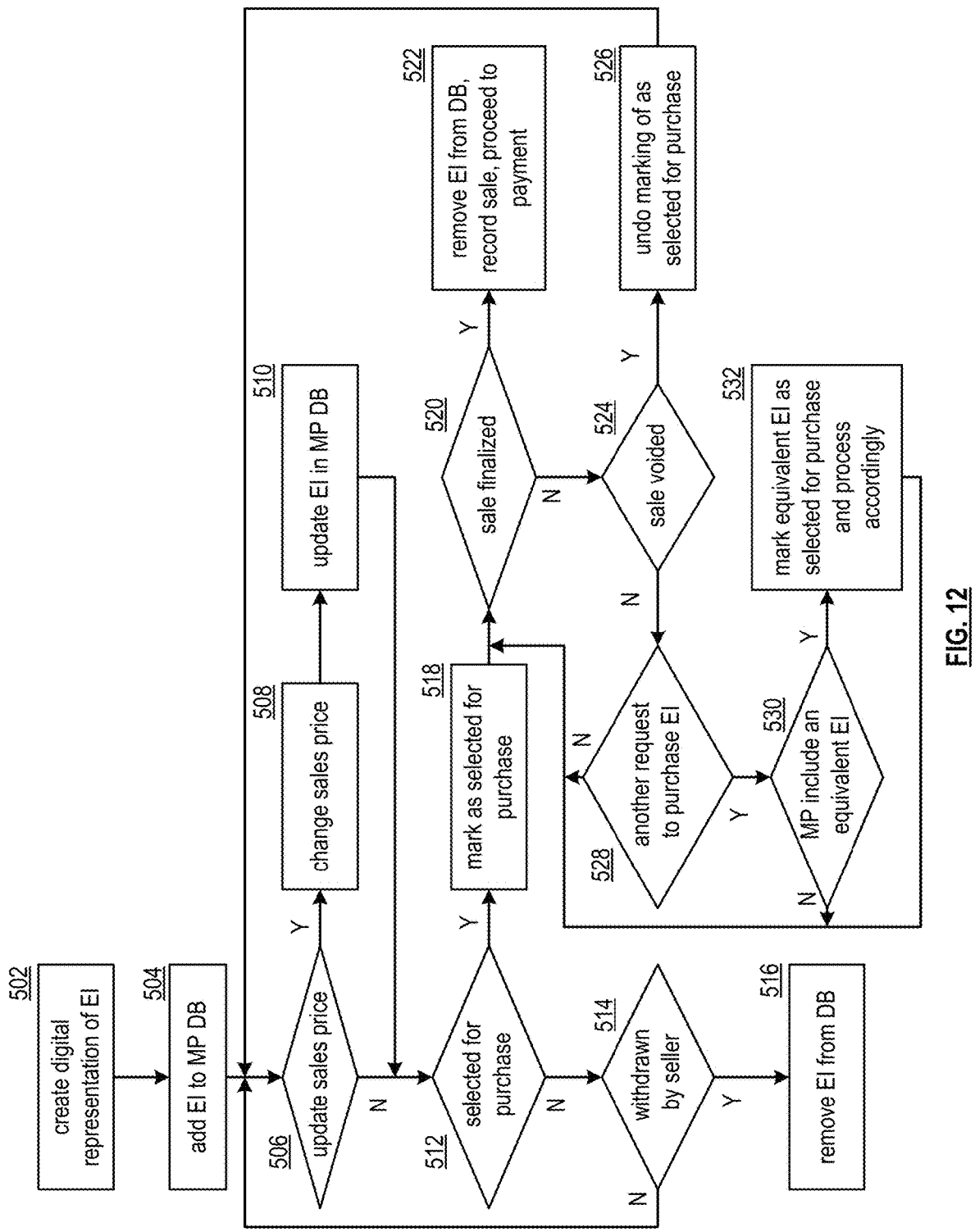
FIG. 12 is a logic diagram of an embodiment of a method of adding and deleting an exchange item to an exchange item marketplace network in accordance with the present invention.

FIG. 12 is a flowchart illustrating an example of adding and/or removing an exchange item within an exchange item marketplace network. The method includes step 502 where a marketplace server of the exchange item marketplace network creates a digital representation of an exchange item for sale. For example, the marketplace server captures a digital image of a front and back of a gift card exchange item and interprets the captured digital image to produce exchange item information (e.g., brand, value, serial number).

The method continues at step 504 where the marketplace server adds the exchange item (EI) to a database (DB) of the marketplace (MP). For example, the marketplace server inserts a new entry into a sorted list of other previously entered exchange items within the database associated with the brand, where the new entry includes the brand, the value, the serial number, and a price (e.g., a discounted price as compared to the value).

The method continues at step 506 where the marketplace server determines whether to update sales price for the exchange item within the database. The determining may be based on one or more of a request and a market efficiency pricing algorithm output. For example, the marketplace server receives a request from a seller associated with the exchange item to change the price. As another example, the marketplace server executes a market efficiency pricing algorithm to produce an indication that the price should be changed to improve the efficiency of the marketplace. If the price is to be updated, the method continues at step 508 where the marketplace server changes the sales price accordingly. The method continues at step 510 where the marketplace server updates the exchange item information in the database of the marketplace.

If the price is not being updated or after the price has been updated, the method continues at step 512 where the marketplace server determines whether the exchange item has been selected for purchase. If not, the method continues at step 514 where the marketplace server determines whether the offer to sell the exchange item has been withdrawn (e.g., interpreting a request from the seller, in accordance with a withdraw protocol, accessing the database). If yes, the method continues at step 516 where the marketplace server removes the exchange item from the database (e.g., database update to remove the entry associated with exchange item). If not, the method repeats at step 506.

When the exchange item has been selected for purchase, the method continues at step 518 where the marketplace server marks the exchange item as selected for purchase. For example, the marketplace server updates an entry of the marketplace database to indicate that the exchange item has been selected for purchase, but not yet sold. The method continues at step 520 where the marketplace server determines whether the sale has been finalized. The determining may be based on one or more of confirming payment from a purchaser, confirming payment to the seller, and confirming payment to another payee (e.g., a commission to a market place operator).

When the sale is finalized, the method continues at step 522 where the marketplace server removes the exchange item from the market database (e.g., removes the entry associated with the exchange item from the database), records sale of the exchange item (e.g., notifies a seller of the purchase), adds the exchange item to the buyer's e-wallet, and proceeds to a payment process (e.g., to collect payment from the purchaser).

When the sale is not finalized (e.g., still pending approval of the buyer's financial information), the method continues at step 524 where the marketplace server determines whether the sale is to be voided. The determining may be based on one or more of detecting an unfavorable payment condition, receiving a sale voided request, and detecting an estimated fraud level that compares unfavorably to a fraud threshold level.

If the sale is to be voided, the method continues at step 526 where the marketplace server undoes the marking of the as selected for purchase (e.g., database updated to reflect that the exchange item is available for sale). The method then repeats at step 506.

When the sale is not to be voided, the method continues at step 528 where the marketplace server determines whether another request to purchase another exchange item has been received (e.g., a request purchase, the same exchange item or a similar exchange item). If not, the method repeats at step 520.

When another request to purchase the exchange item has been received, the method continues at step 530 where the marketplace server determines whether the marketplace includes another equivalent exchange item (e.g., performs a database search). If not, the method repeats at step 520. If yes, the method continues at step 532 where the marketplace server marks the equivalent exchange item as selected for purchase and processes the purchase accordingly. The method branches to step 520 to finalize both pending sales.

Figure 13:
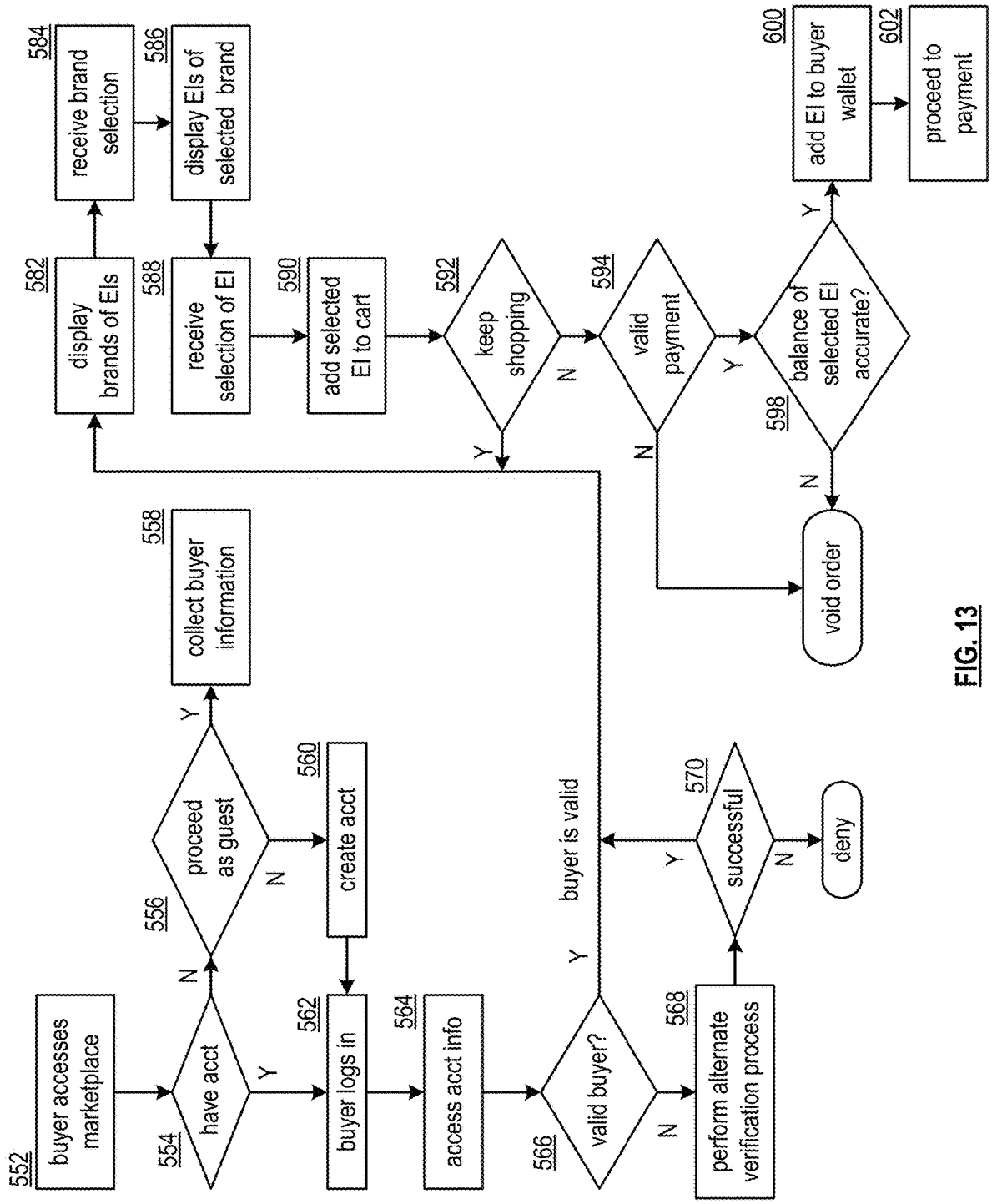
FIG. 13 is a logic diagram of an embodiment of a method of buyer verification in an exchange item marketplace network in accordance with the present invention.

FIG. 13 is a flowchart illustrating an example of buyer verification and exchange item purchase verification within an exchange item marketplace. The method includes step 552 where a buyer's computing device accesses the exchange item marketplace. For example, the buyer's computing device sends a registration request to the marketplace server. The registration request includes one or more of an identifier of the buyer, an identifier of the buyer user device, payment information associated with the buyer, a security credential, and other buying information (e.g., buying history, buying preferences, buying terms and conditions, etc.).

The method continues at step 554 where the marketplace server determines (e.g., database access) whether the buyer has an account the marketplace. If not, the method continues at step 556 where the marketplace server determines whether to allow the buyer to proceed as a guest. The determining may be based on one or more of a system security level, a fraud detection algorithm fraud level indicator, a comparison of the fraud level indicator to a fraud threshold level, a request, a predetermination, a marketplace activity indicator, and a marketplace efficiency indicator.

If the buyer is allowed to access the system as the guest, the method continues at step 558 where the marketplace server collects the buyer's information (e.g., information contained the request and any other information to support the buyer functioning as a guest in the marketplace), and may, based on the buyer's information, enable the buyer to further access the marketplace to purchase an exchange item. If the buyer is not allowed to access the system as the guest, the method continues at step 560 where the marketplace server creates an account for the buyer (e.g., adds a new entry in the database). The creating of the account may include obtaining further information from the buyer.

When the buyer has an account or after the account is created, the method continues at step 562 where the buyer logs into the marketplace (e.g., accesses the marketplace network). The method continues at step 564 where the marketplace server accesses account information for the buyer (e.g., retrieves buyer information from the database).

The method continues at step 566 where the marketplace server determines whether the buyer is a valid buyer. For example, the marketplace server compares one or more aspects of the buyer information to expected values of the one or more aspects to produce a comparison and interprets the in light of a desired pattern for the comparison. For instance, the marketplace server utilizes a decision tree structure to interpret a plurality of fraud detection questions to provide a plurality of fraud detection answers and to interpret the plurality of fraud detection answers to indicate whether the buyer is valid.

When the buyer is invalid, the method continues at step 568 where the marketplace server performs an alternate verification process (e.g., facilitating manual interpretation of risk factors by an operator associated with the market place network, invoking a secondary fraud detection algorithm). The method continues at step 570 where the marketplace server determines whether the alternate verification process is successful. If not, the buyer's access to the marketplace is denied.

If the buyer is validated, the method continues at step 582 where the marketplace server facilitates display of brands of exchange items available for purchase. For example, the marketplace server sends marketplace inventory information (e.g., brands, values, discount levels, etc.) to the buyer's computing device for display thereon. The method continues at step 584 where the marketplace server receives a brand selection from the buyer's computing device.

The method continues at step 586 where the marketplace server facilitates display of exchange items associated with the selected brand. For example, the marketplace server sends marketplace inventory information associated with the selected brand to the buyer's computing device for display thereon (e.g., displaying various available balances and discount levels for exchange items of the brand). In addition, the marketplace server provides the buyer's computing device with exchange item information of related brands to the selected brand (e.g., selected a particular coffee shop, provide exchange items from multiple coffee shops).

The method continues at step 588 where the marketplace server receives a selection of an exchange item for purchase from the buyer's computing device. For example, the buyer's computing device sends the server a message that includes one or more of the ID of the exchange item, the brand(s) of the exchange item, a descriptor of the exchange item, a value of the exchange item, a purchase price of the exchange item, a desired purchase price of the exchange item, a range of a desired purchase price of the exchange item, a serial number associated with exchange item, and/or buyer payment information.

The method continues at step 590 where the marketplace server adds the selected exchange item to a cart associated with the buyer (e.g., update a temporary list of one or more exchange items for purchase). The method continues at step 592 where the marketplace server determines whether the buyer intends to keep shopping. The determining may be based on one or more of detection of the expiration of a shopping timer, receiving an indicator that buyer is still shopping, receiving an indicator that the buyer has finished shopping. If yes, the method repeats at step 582.

When buyer desires to checkout, the method continues at step 594 where the marketplace server determines whether valid payment has been obtained. The determining includes at least one of verifying a complete payment (e.g., verifying a credit card transaction, etc.) and verifying that the buyer is capable of providing full payment (e.g., verifying purchase ability on a buyer credit card). If not, the order is voided. Alternatively, the method branches from step 564 to step 582 to perform the steps 582-592, such that steps 566-570 to validate the buyer are performed after step 592 and before step 594.

If a valid payment is received, the method continues at step 598 where the marketplace server determines whether a balance of each selected exchange item is accurate (e.g., a balance listed in the database matches a balance check response from a brand server associated with the exchange item). If the balance is not accurate, the transaction is voided. Note that it may be restarted with adjustments made based on the accurate balance.

If the balance is accurate, the method continues at step 600 where the marketplace server adds the exchange item to a buyer wallet (e.g., the marketplace server sends exchange item information to the buyer user device). The method continues at step 602 where the marketplace server continues to proceed to payment to conclude collection of payment from the buyer if not already collected and to distribute payment to one or more payees (e.g., the seller, other payees).

Figure 14:
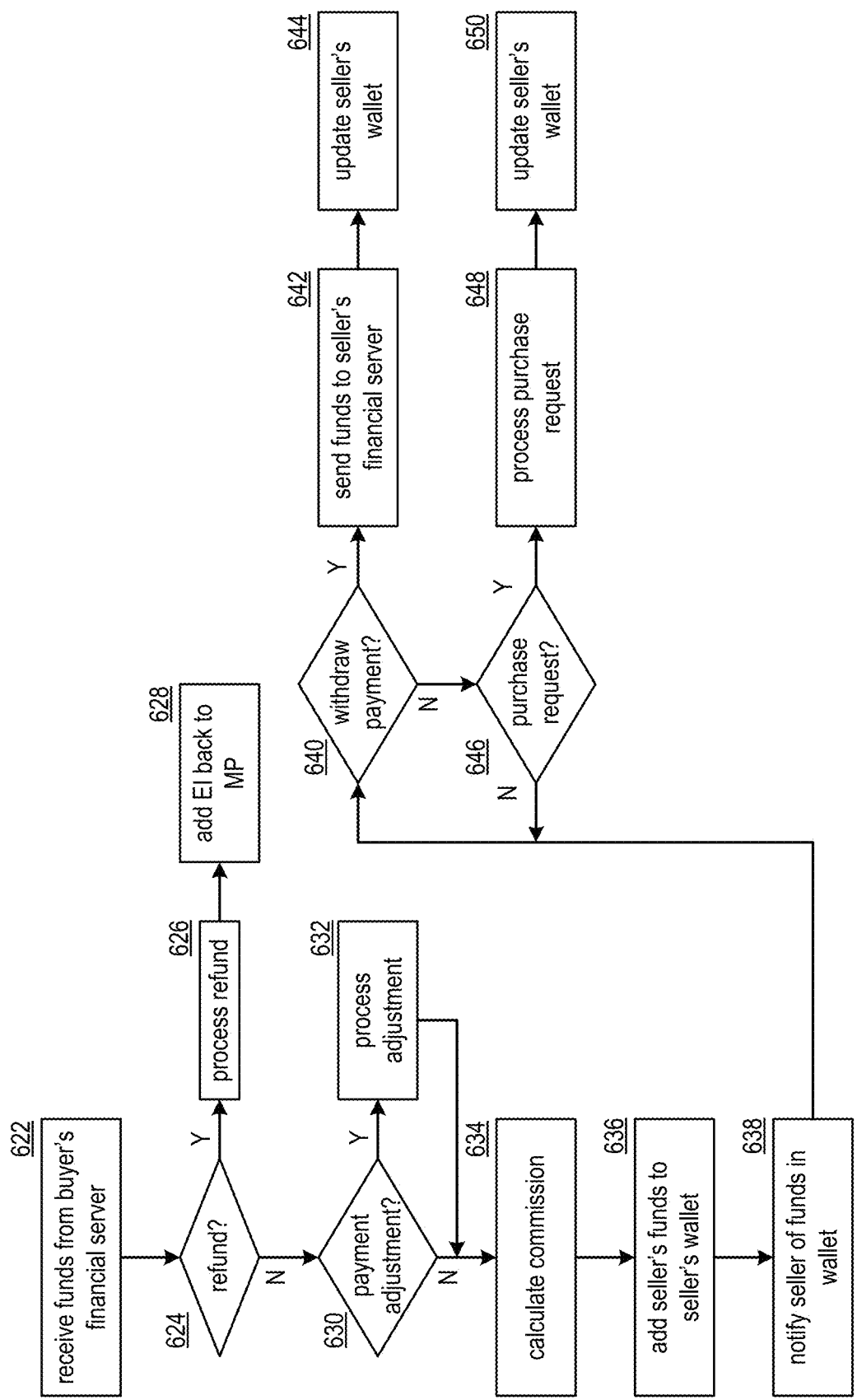
FIG. 14 is a logic diagram of an embodiment of a method of exchange item payment in an exchange item marketplace network in accordance with the present invention.

FIG. 14 is a flowchart illustrating an example of exchange item payment within an exchange item marketplace. The method includes step 622 where a marketplace server associated with exchange item marketplace receives funds from a buyer's financial server for payment of a selected exchange item for purchase. For example, the marketplace server verifies that a credit card payment shall be made to compensate for purchase of the selected exchange item.

The method continues at step 624 where the marketplace server determines whether a refund is to be processed for the payment of the exchange item for purchase. The determining may be based on one or more of receiving a transaction cancellation request after the funds have been received for payment, detecting that an estimated fraud level is greater than a fraud threshold level, and interpreting at least one of a seller or buyer terms and conditions to trigger the refund.

If a refund is to be made, the method continues at step 626 where the marketplace server processes the refund (e.g., reverse a credit card payment from the buyer). The method continues to step 628 where the marketplace server adds the selected exchange item back to the marketplace for sale (e.g., re-creates an entry to include the exchange item information and stores the entry in a database associated with the exchange item marketplace).

If a refund is not being made, the method continues at step 630 where the marketplace server determines whether a payment adjustment is to be processed when the refund is not to be processed. The determining may be based on one or more of interpreting seller terms and conditions, buyer terms and conditions, network operator terms and conditions, and other payee's terms and conditions. For example, the marketplace server interprets terms and conditions of a credit card company associated with the buyer that indicates that a 3% fee is required. If an adjustment is required, the method continues at step 632 where the server processes the adjustment.

If no adjustments are to be made or after the adjustment is made, the method continues at step 634 where the marketplace server calculates a commission for the network operator and/or other payees in accordance with terms and conditions associated with payment resolution. For example, the marketplace server subtracts the 3% credit card fee from a gross commission rate of 15% for the network operator to produce a net commission rate of 12% for the network operator.

The method continues at step 636 where the marketplace server adds the seller's funds to a seller's e-wallet. The adding includes at least one of indicating a marketplace credit, indicating a cash payment, indicating a payment in accordance with payment information for the seller, and indicating another exchange item as compensation for the seller. The method continues at step 638 where the marketplace server notifies the seller of funds in the seller's wallet. For example, the marketplace server sends a seller wallet update to a seller user device, where the seller wallet update includes an indication of the funds to be added the seller's wallet.

The method continues at step 640 where the marketplace server determines whether a funds withdraw request has been received from the seller's computing device. If not, the method continues at step 646 where the server determines whether it is receiving a purchase request from the seller's computing device, which is now functioning as a buyer's computing device. If not, the method repeats at step 640.

When a funds withdraw request is received, the method continues at step 642 where the marketplace server sends funds to the seller's financial server. For example, the marketplace server sends and automatic clearinghouse (ACH) transfer of funds to the seller's financial server in accordance with seller payment information. The method continues at step 644 where the marketplace server updates the seller's wallet. For example, the marketplace server sends a further update to the seller user device indicating that the seller's wallet has been updated to include the payment.

When a purchase request is received, the method continues at step 648 where the marketplace server processes the purchase request. For example, the marketplace server indicates that the selected other exchange item has been removed from the marketplace and transferred to the seller's wallet. The method continues at step 650 where the marketplace server updates the seller's wallet to debit the amount of the purchase just processed.

Figure 15:
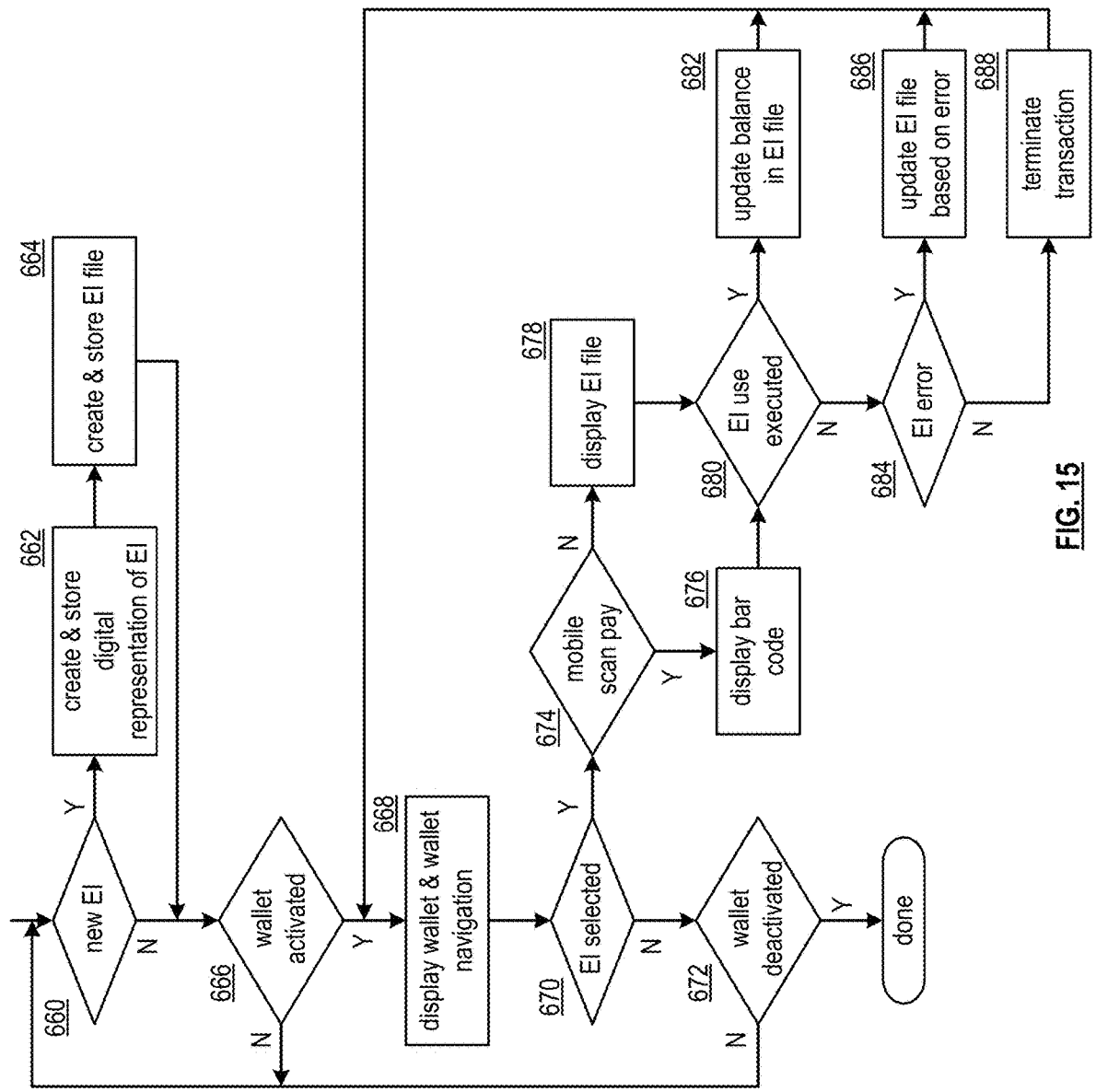
FIG. 15 is a logic diagram of an embodiment of a method of exchange item balance update in an exchange item marketplace network in accordance with the present invention.

FIG. 15 is a flowchart illustrating a method that includes step 660 where a marketplace server determines whether a new exchange item is to be added to a buyer wallet associated with the buyer user device. The determining may be based on one or more of processing a purchase request for the new exchange item, obtaining a favorable purchase response to a purchase request for the new exchange item, and receiving a payment response indication that includes the new exchange item as compensation.

If a new exchange item is to be added to the buyer's e-wallet, the method continues at step 662 where the marketplace server and/or the buyer's computing device creates and stores a digital representation of the exchange item. The creating of the digital representation includes at least one of capturing a digital image of the exchange item, interpreting the captured image to produce attributes (e.g., brand, brand logo, serial number, barcode, etc.) of the exchange item, and receiving the attributes of the exchange item. The method continues at step 664 where the buyer's computing device and/or the marketplace server creates and stores an exchange item file, where the file includes the digital representation of the exchange item and other information regarding the exchange item.

The method continues at step 666 where the buyer's computing device determines whether the buyer's wallet is activated (e.g., status check, interpret a query). If not, the method repeats at step 660. If the wallet is activated, the method continues to step 668 where the buyer's computing device displays the buyer wallet and wallet navigation information (e.g., tools to facilitate searching a plurality of digital representations of the exchange items associated with the buyer wallet). The method continues at step 670 where the buyer's computing device determines whether an exchange item has been selected for utilization (e.g., to spend down a gift card when the exchange item is the gift card). If not, the method continues at step 672 where the buyer's computing device determines whether the wallet has been deactivated. If deactivated, the method ends. If not deactivated, the method repeats at step 660.

When an exchange item has been selected, the method continues at step 674 where the buyer's computing device determines whether use of the selected exchange item will be via a mobile scan payment (e.g., displaying a bar code of the exchange item on a display of the buyer's computing device). If yes, the method continues at step 676 where the buyer's computing device displays a bar code of the exchange item and, at step 680, the bar code is read by point of sales equipment of a merchant to execute a purchase.

If mobile scan pay is not being used, the method continues at step 678 where the buyer's computing device displays the exchange item file (e.g., including a unique serial number associated with the exchange item). The displaying of the exchange item file facilitates manual reading of the unique serial number by an operator of the point-of-sale terminal or similar to facilitate utilization of the exchange item to execute a purchase.

The method continues at step 680 where the buyer's computing device determines whether the exchange item use has been successfully executed to make a purchase. The determining may be based on one or more of interpreting a payment confirmation indicator, receiving a purchase verification, and receiving an indicator that at least a portion of an available balance associated with the exchange item for use has been utilized. If yes, the method continues at step 682 where the buyer's computing device updates balance information in the exchange item file. For example, the buyer user device subtracts a point-of-sale purchase amount from a previous balance of the exchange item to produce an updated balance.

If the use of the exchange item was not executed, the method continues at step 684 where the buyer's computing device determines whether the unsuccessful use of the exchange item to execute a purchase was due to an error of the exchange item. The error may be an expired exchange item, insufficient balance on the exchange item, a violated restriction, etc. If it is not an error (e.g., a denial by the POS equipment), the method continues at step 688 where the transaction is terminated and the method repeats at step 668.

If it is an error, the method continues at step 686 where the buyer's computing device updates the exchange item file based on the exchange item error. For example, the buyer user device updates the exchange item file correct the balance when the balance mismatch has been indicated.

Figure 16:
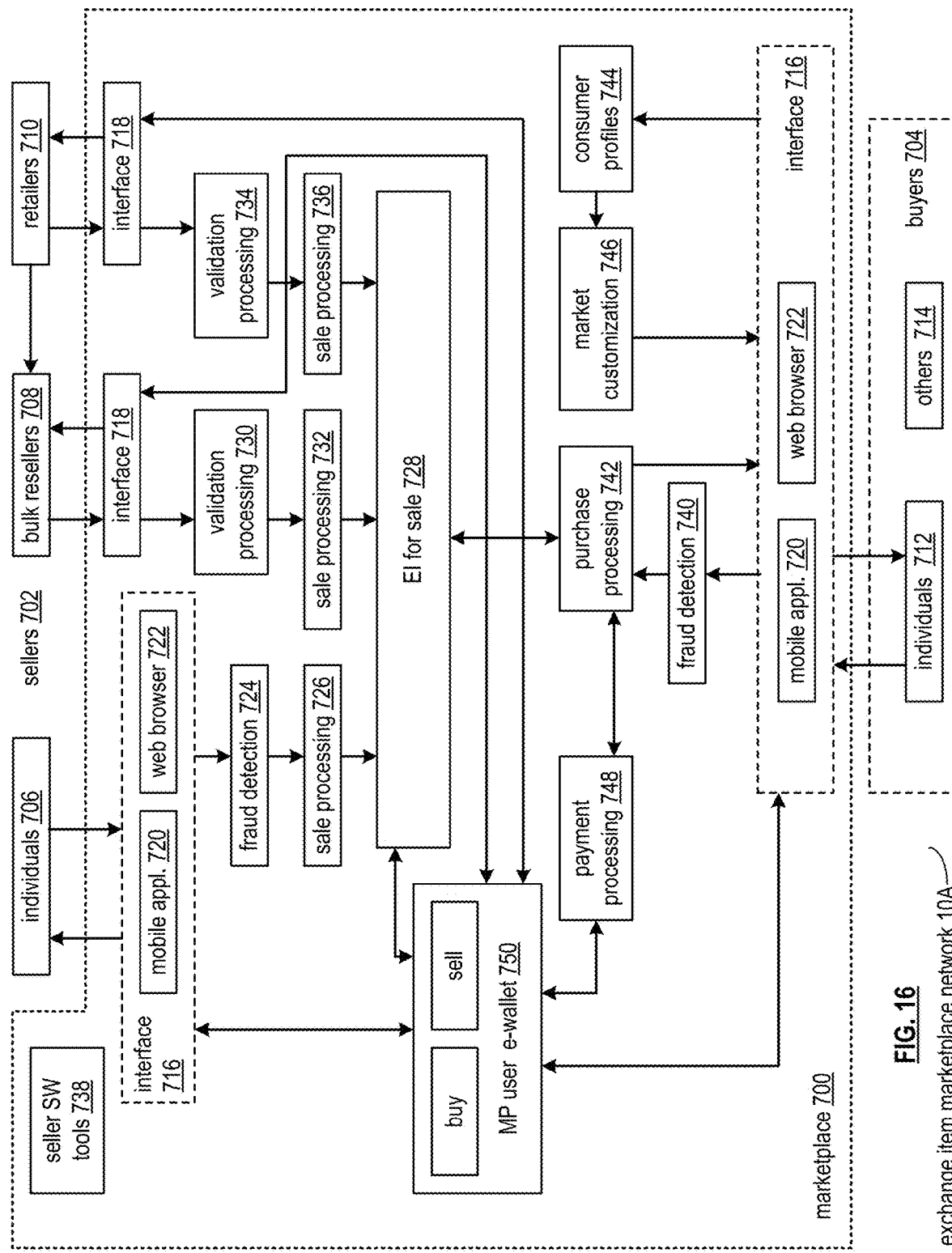
FIG. 16 is a schematic block diagram of another embodiment of an exchange item marketplace network in accordance with the present invention.

FIG. 16 is a schematic block diagram of another embodiment of an exchange item marketplace network 10A that includes a plurality of sellers 702, a plurality of buyers 704, and an on-line exchange item marketplace 700. The sellers 702 include individual sellers 706, bulk resellers 708, and retailers 710. The buyers 704 include individual buyers 712 and other types of buyers 714 (e.g., bulk buyers, resale buyers, etc.).

Each seller 702 and each buyer 704 corresponds to a computing device 12-16 that includes a marketplace interface module 716 that enables the computing device access to the marketplace 700 and to function therein. The marketplace interface module 716 includes a browser application 722, a mobile device application 720, and/or any type of application that enables access to the marketplace 700. The computing core 52 of the user device executes one or more of these applications. For instance, each of the applications includes operational instructions that are stored in memory (e.g., main memory, flash memory, SS memory, HD memory, and/or cloud memory) and executed by the processing module 62 of the computing core 52.

Alternatively, the marketplace interface module 716 includes a processing circuit and memory, wherein the memory stores and the processing circuit executes the operational instructions of the application. As yet another alternative, the processing circuit of the marketplace interface module 716 and the processing module 62 of the computing core 52 co-process the operational instructions of one or more of the applications. Interface 718 functions in a similar manner to provide bulk resellers 708 and/or retailers 710 access and function within the marketplace 700.

One or more marketplace servers 18 supports the online exchange item (EI) marketplace 700 by performing the functions of the corresponding functional blocks. The functional blocks include seller software tools 738, individual seller fraud detection 724, individual sale processing 726, bulk seller verification processing 730, bulk sale processing 732, retailer verification processing 734, retailer sale processing 736, displaying exchange items for sale 728 in the marketplace 700, payment processing 748, MP user e-wallet 750, buyer fraud detection 740, purchase processing 742, consumer profiles 744, and market customization 746. A functional block includes one or more of a standalone processing module that executes operational instructions to perform the corresponding functions of the block, a software algorithm executed by the computer core of the server to perform the corresponding functions of the block, and/or a combination thereof.

The server(s) 18 perform the marketplace user e-wallet functional block 750 to create and maintain an e-wallet for a user of the marketplace 700. The e-wallet is essentially a file for an individual user (e.g., a person, a legal entity, etc.) that stores information regarding exchange items bought, sold, and/or used by the user. For example, the e-wallet stores a digital representation of each purchased exchange item that has a value greater than zero. For example, a digital representation of a gift card is displayed in an asset section of the e-wallet while the gift card has a balance above zero and the gift card has not expired. When the balance is zero or the gift card expires, the digital representation is removed and the information regarding the gift card is stored in an archive section of the e-wallet.

The e-wallet is further capable of storing and tracking marketplace credit. For example, a user may purchase marketplace credit that is subsequently used to purchase an exchange item. In addition, a seller of an exchange item may be paid in marketplace credit that the seller may use to purchase an exchange item or cash out.

The e-wallet further functions to archive data regarding previous exchange item purchases and/or previous exchange item sales. The amount of data stored for each exchange item purchase or sale may be user defined or set based on a system default setting. For example, the data for a purchase includes one or more of a purchase price, the exchange item ID, a serial number, a brand name, a purchase date, the value of the exchange item, restrictions of the exchange item, and an expiration date. The data for a purchased exchange item may further include use information (e.g., when the exchanged item was used, the amount of value used, the date of use, the place of use, etc.) and/or remaining value information.

As another example, the data for a sale includes one or more of an asking selling price, a sold price, the exchange item ID, a serial number, a brand name, an offer for sale time stamp, a sold time stamp, the value of the exchange item, restrictions of the exchange item, and an expiration date. The data for a sold exchange item may further include price reduction information (e.g., the amount of the change, a change time stamp, etc.) and/or information regarding a withdrawal of an offer for sale.

The server(s) 18 perform the seller software tools functional block 738 to assist a seller (e.g., individual, bulk, or retailer) in setting a price for an exchange item. For example, the server(s) 18 record data regarding exchange items offered for sale, data regarding purchases of exchange items, and data regarding exchange items for which the offer for sale was withdrawn. From this data, the server(s) 18 determines predictive sales information. For example, the server (s) 18 determines for a particular type of exchange item (e.g., a gift card for a particular franchise) a correlation between the value of the exchange item and duration in the marketplace (e.g., a $250 gift card has an average duration of 1 day, a $100 gift card has an average duration of 12 hours, a $50 gift card has an average duration of 5 hours, etc.).

As another example of predictive sales information, the server(s) 18 determine a correlation between sales price and duration in the marketplace (e.g., a 5% discount has an average duration of 12.5 hours, a 3% discount has an average of 1 day, and a 10% discount has an average duration of 1.5 hours). As yet another example, the server(s) 18 determine a periodic sales volume for a particular exchange item (e.g., how many sold in an hour, six hours, a day, etc.). As yet another example, the server(s) 18 determine a current quantity of the particular exchange items for sale (e.g., how many are currently being offered for sale, at what sales price, the current average duration in the marketplace, etc.). The server(s) 18 may further analyze any type of data maintained by the system 10A to assist in the creation of predictive sales information.

In addition to creating the predictive sales information, the server(s) 18 generate a seller's profile, which includes information regarding the sales tendencies and/or preferences of a particular seller. For example, the seller's profile includes information regarding one or more of the types of exchange items offered for sale, information regarding if and when exchange item offers for sale are withdrawn, initial asking prices for exchange items offered for sale, actual sales price information and corresponding discounted percentage, frequency for which initial asking price is adjusted, average duration of exchange items in the marketplace, standard deviation of duration of exchange items in the marketplace, etc.

From the predictive sales information and the seller's profile, the server(s) 18 provide a suggested sales price for a particular exchange item. For example, the seller profile indicates that the seller has a tendency to offer a particular exchange item with a minimal discount and prefers that the exchange item remain in the marketplace for less than 6 hours. Further, the predictive sales information for the particular exchange item indicates that there is currently above normal quantity of the exchange item for sale, the current asking price has a greater discount than the seller's preference, and the current average duration in the marketplace is 7 hours, the server(s) 18 provides one or more recommendations and corresponding predictive outcomes (e.g., an initial asking price below the seller's profile to sell the exchange item within 6 hours, an initial asking price corresponding to the seller's profile to sell the exchange item within 11 hours, etc.). The server(s) 18 may further provide the predictive sales information to the seller's computing device.

The server(s) 18 perform the individual seller fraud detection functional block 724 to automate detection of a fraudulent seller and/or a fraudulent exchange item. This includes the seller verification and the exchange item verification as discussed in one or more of FIGS. 6A—6D, 7-11, 18A, and 18B. The fraud detection further includes an automated process for resolving a potential fraud issue. For example, when a verification of seller falls between verified and not verified, the server(s) 18 evoke a process to render a definitive verification decision. As another example, when the verification of an exchange item falls between verified and not verified, the server(s) 18 evoke a process to render a definitive verification decision.

To extend the use of the marketplace to retailers or branded companies (i.e., the entity that initiates a gift card and ultimately accepts the gift card as payment), the server(s) 18 perform the retailer verification processing functional block 734 and the retailer sale processing functional block 736. The retailer verification processing functional block 734 includes one or more of setting up an account for a retailer to sell exchange items via the marketplace, verifying the retailer at least at the setup of the account and potentially for each transaction conducted via the marketplace, verifying the exchange items being offered for sale, and/or other verification mechanisms. As an example, a secure portal is established between the retailer seller and the marketplace server(s) 18 such that any communications via the secure portal is at least initially deemed a valid communication.

The retailer sale processing functional block 736 includes one or more of creating digital representations of the exchange items offered for sale, determining selling parameters and posting the digital representations and the parameters in the marketplace. The selling parameters include one or more of sales price, listing duration before changing price, restrictions, withdraw procedures, etc.

The server(s) 18 perform the buyer fraud detection functional block 740 to automate detection of a fraudulent buyer and/or fraudulent financial information used for purchasing. This includes the buyer verification and the purchase verification as discussed in one or more of FIGS. 5, 6A-6D, 13, and 20A-20D. The fraud detection further includes an automated process for resolving a potential fraud issue. For example, when a verification of buyer falls between verified and not verified, the server(s) 18 evoke a process to render a definitive verification decision. As another example, when the verification of financial information falls between verified and not verified, the server(s) 18 evoke a process to render a definitive verification decision.

The server(s) 18 perform the payment processing functional block 748 to process payment through the user e-wallets of the seller and of the buyer. For instance, payment by the buyer is made from the buyer's e-wallet by debiting a credit card, a checking account, a savings account, a currency balance (e.g., money on account for purchases), and/or marketplace credit. Payment to the seller is made by crediting the seller's e-wallet with currency, marketplace credit, and/or some form of financial receipt. The mechanics of the payment process include the functionality described in one or more of FIGS. 5, 6A-6D, 11-14, and 20A-20D.

The server(s) 18 perform the consumer profiles functional block 744 for a buyer. For the buyer, its consumer profile includes data regarding exchange item purchases of the buyer. The data includes one or more of the exchange items purchased, frequency of purchases, average purchase price, average value of purchased like exchange items (e.g., coffee shop gift cards), preferred discounts, etc. Note that this may be included in the buyer's e-wallet or maintained as a separate file.

The server(s) 18 perform the market customization functional block 746 to customize marketing of exchange items being offered for sale to particular buyers based on their buyer profiles. The market customization functional block 746 further includes determining a type and a quantity of exchange items a retailer should offer for sale and directing marketing efforts to a particular segment of buyers. In this manner, the system 10A efficiently and effectively couples exchange items for sale to buyers who typically buy such exchange items.

The server(s) 18 perform the individual sales processing function block 726, the bulk seller verification processing functional block 730, the bulk sale processing functional block 732, and the purchase processing functional block 742 as described with reference to one or more of FIGS. 2, 5, 6A—6D, 7-10, 18A, and 18B. The server(s) 18 also perform the displaying exchange items for sale functional block 728 to add/remove/edit an exchange item in the marketplace 700 as described with reference to one or more of FIGS. 2, 5, 6A—6D, 7-10, 12, and 17A-21B.

Figure 17A:
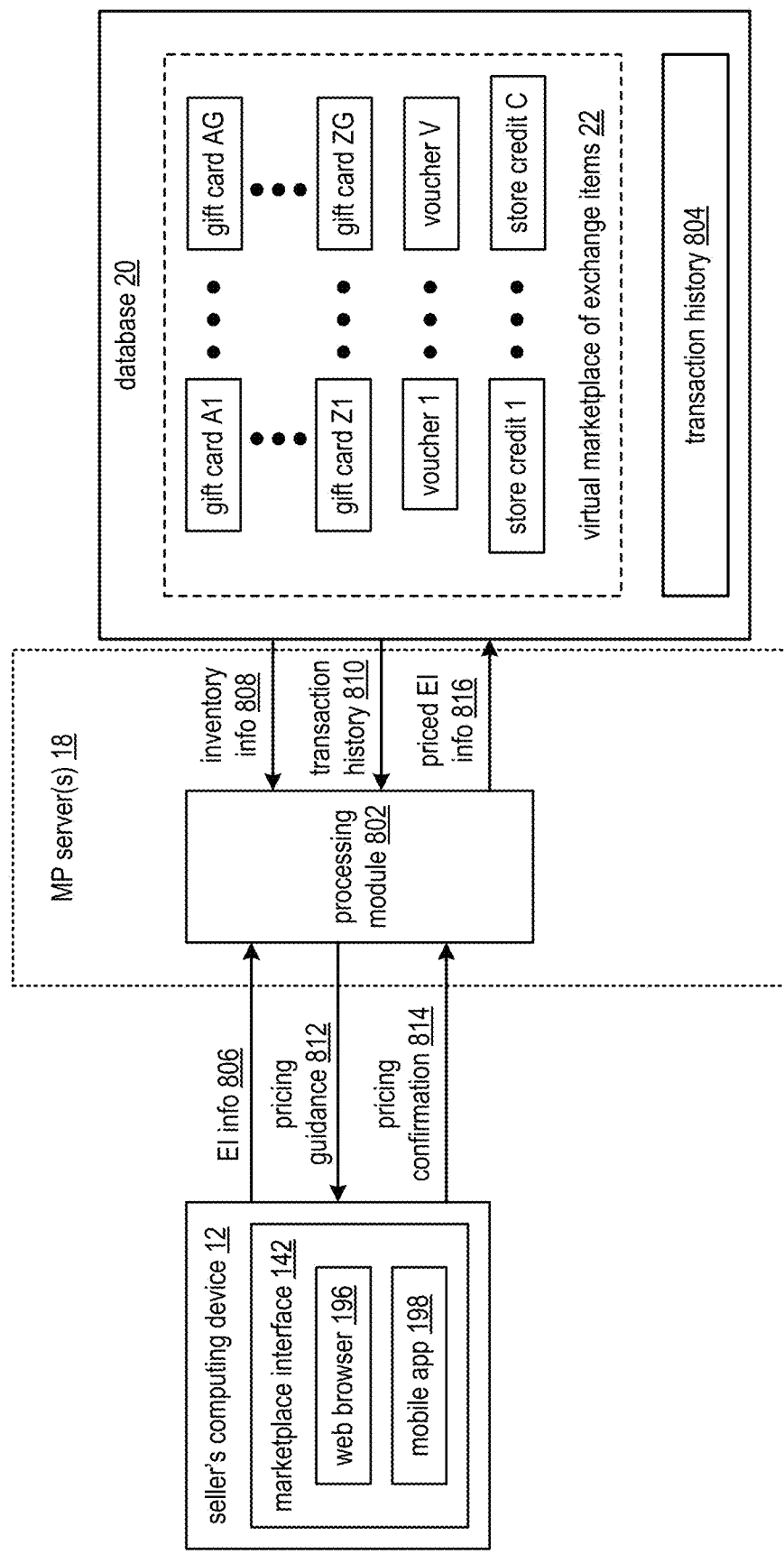
FIG. 17A is a schematic block diagram of an embodiment of a seller device interfacing with a marketplace server in accordance with the present invention.

FIG. 17A is a schematic block diagram of another embodiment of an exchange item marketplace network that includes the seller's computing device 12 and the marketplace (MP) server(s) 18, which includes a processing module 802. The seller's computing device 12 and the MP server(s) 18 may be operably coupled with the network(s) 24. The database 20 stores the virtual marketplace of exchange items 22 and transaction history 804.

In an example of operation of the pricing of the exchange items, the processing module 802 receives exchange item (EI) information 806 from the seller's computing device 12 (e.g., from the mobile app 198, from an input via the web browser 196) for an exchange item for sale. The EI information 806 includes one or more of an EI type indicator (e.g., gift card, store credit, voucher, etc.), a brand identifier, a balance, a personal identification number (PIN), a serial number, an expiration date, a seller identifier (ID, a desired selling price, a desired net price (e.g., actual selling price less all commissions and fees), and a desired pricing approach (e.g., fixed specified price, market-based, auto pricing, an auto pricing approach, i.e., as suggested by the MP server 18, based on an input, etc.).

Having received the EI information 806, the processing module 802 obtains inventory information 808 by retrieving a portion of the virtual marketplace of exchange items 22 inventory information from the database 20. For example, the processing module 802 accesses the database 20 based on the brand of the EI information 806 to identify the portion of the virtual marketplace of exchange items 22 that corresponds to the brand. The portion may identify one or more exchange items associated with the brand. The inventory information 808 includes one or more of the brand, a balance, a price, an expiration date, availability volume, pricing rules for the brand, and exchange item utilization rules for the brand. For example, the processing module 802 retrieves inventory information 808 identifying available gift cards A1-AG when the brand of the EI information 806 is brand A and the EI type of the EI information 806 is gift card.

Having obtained the inventory information 808, the processing module 802 identifies transaction history 810 corresponding to the EI information 806. The identifying includes the processing module 802 retrieving at least a portion of the transaction history 804 from the database 20 to produce the transaction history 810, where the retrieved portion is associated with the brand and may further be associated with exchange items of the brand and similar balance information. The transaction history 810 includes one or more records of sales of similar exchange items to the exchange item for sale and may further include one or more summaries (e.g., volume sold by price range and timeframe) of two or more records of sale. Each record of sale includes one or more of a sold EI type indicator, a sold brand, a sell price, a balance, a discount level, a commission level, a fee level, a date, a timestamp, a seller identifier, a buyer identifier, a selling season indicator, a special sale indicator, etc. For example, the processing module 802 retrieves a portion from the transaction history 804 that identifies sell pricing of a last 10 transactions and a last month of transactions of sold gift cards of the indicated brand associated with a similar balance as the indicated balance of the EI information 806.

Having identified the transaction history corresponding to the EI information, when the pricing approach is the auto pricing approach, the processing module 802 determines a selling price. The determining includes one or more of selecting a particular auto-pricing approach of a plurality of auto-pricing approaches, generating the selling based on the selected pricing approach and one or more of the EI information 806, the inventory information 808, the transaction history 810, and the pricing rules associated with the brand. The selecting of the auto-pricing approach may be based on one or more of a predetermination, a pricing approach indicator of the EI information 806, another request, system registry information associated with the database 20, and an input from a system operator of the exchange item marketplace network.

The auto-pricing approaches include calculating an average selling price on a last group of sold exchange items that compare favorably to the exchange item for sale (i.e., an average selling price of a last five sold exchange items that compare favorably to the exchange item for sale), calculating an average selling price of exchange items sold during a time frame (e.g., a last n days, a number of days of a similar seasonal timeframe of a previous year), i.e., an average selling price of exchange items sold during the last 30 days that compare favorably to the exchange item for sale, calculating the selling price based on available inventory of similar exchange items (e.g., a.k.a. supply and demand pricing), and calculating the selling price to optimize an aspect of market efficiency of the exchange item marketplace network (e.g., to facilitate optimization of transaction volume).

Having produced the selling price, the processing module 802 issues pricing guidance 812 to the seller's computing device 12. The pricing guidance 812 includes one or more of a representation of the inventory information 808 (e.g., a subset associated with the indicated brand), a representation of the transaction history 810 (e.g., a selected subset associated with recent sales of similar exchange items), a pricing range based on the transaction history 810 and the selling price, and the selling price (e.g., suggested auto-pricing level). For example, the processing module 802 generates the pricing guidance 812 and sends the pricing guidance 812 to the seller's computing device 12 for display and feedback.

Having sent the pricing guidance 812 to the seller's computing device 12, the processing module 802 receives pricing confirmation 814 from the seller's computing device 12, where the seller's computing device 12 generates the pricing confirmation 814 to include at least one of an acknowledgment of the selling price, a new desired selling price when the selling price is unacceptable, preconditions to enable the new desired selling price, a market price indicator (e.g., sell immediately at a substantially identical price to a last similar exchange items sold), and acknowledgment of the auto pricing process. When receiving the pricing confirmation 814 that includes the new desired selling price, the processing module 802 establishes the selling price for the exchange item for sale at the desired selling price level in accordance with the pricing rules for the brand (e.g., allowing the desired selling price if within an allowable range, etc.).

Having received the pricing confirmation 814, the processing module 802 updates the virtual marketplace of exchange items 22 to include priced exchange item information 816. The priced exchange item information 816 includes one or more of the brand, the balance, the pin, the serial number, expiration date, the seller identifier, the selling price, the selling preconditions, and the pricing rules. For example, the processing module 802 generates a new entry for the virtual marketplace of exchange items 22 and stores the new entry in the database 20 such that the exchange item for sale becomes visible to buyers.

Figure 17B:
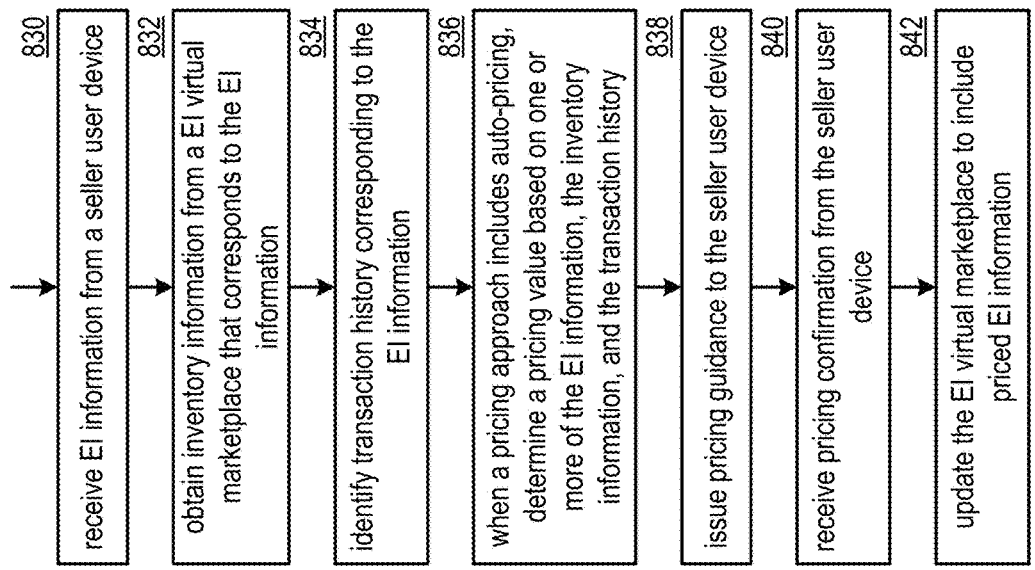
FIG. 17B is a logic diagram of an embodiment of a method for a seller device to interface with a marketplace server in accordance with the present invention.

FIG. 17B is a flowchart illustrating an example of pricing exchange items within an exchange item marketplace network that is executed by a server and/or a computing device. The method includes step 830 where a processing module of the server and/or computing device receives exchange item (EI) information from a seller's computing device. For example, the processing module receives qualified EI information that may include a verified serial number for a verified brand.

The method continues at step 832 where the processing module obtains inventory information from EI virtual marketplace that corresponds to the EI information. For example, the processing module accesses the EI virtual marketplace based on the verified brand to identify similar exchange items and retrieves inventory information associated with the similar exchange items.

The method continues at step 834 where the processing module identifies transaction history corresponding to the EI information. For example, the processing module accesses transaction history to identify transactions associated with the verified brand and retrieves historical information of the identified transactions. When a pricing approach includes auto-pricing, the method continues at step 836 where the processing module determines a pricing value based on one or more of the EI information, the inventory information, and the transaction history. For example, the processing module determines a particular auto-approach and calculates the pricing value utilizing the particular auto-approach.

The method continues at step 838 where the processing module issues pricing guidance to the seller user device. The pricing guidance includes one or more of a representation of the inventory information, a representation of the transaction history, and the pricing value. For example, the processing module generates the pricing guidance and sends the pricing guidance to the seller user device.

The method continues at step 840 where the processing module receives pricing confirmation from the seller user device, where the seller user device generates the pricing confirmation to include at least one of an acknowledgment of the pricing value and an alternative desired selling price. The method continues at step 842 where the processing module updates the EI virtual marketplace to include EI information. For example, the processing module stores a new entry that includes one or more of the verified brand, the verified balance, a pin, a serial number, and expiration date, a seller identifier, the pricing value (e.g., selling price), and any associated pricing rules.

Figure 18A:
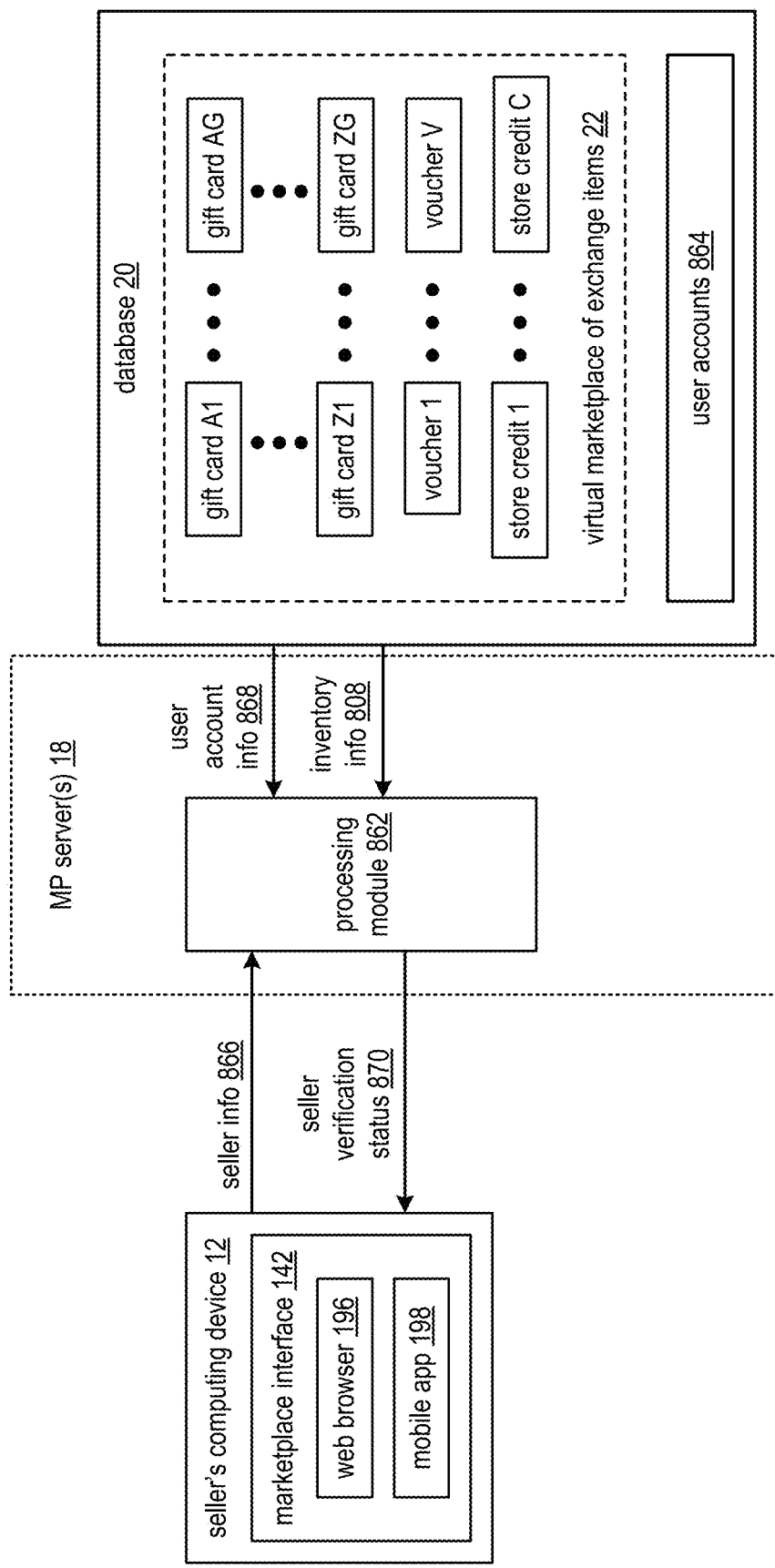
FIG. 18A is a schematic block diagram of another embodiment of a seller device interfacing with a marketplace server in accordance with the present invention.

FIG. 18A is a schematic block diagram of another embodiment of an exchange item marketplace network that includes the seller's computing device 12 and the marketplace (MP) server(s) 18. The MP server(s) 18 includes a processing module 862 and is coupled to the database 20.

In an example of operation of the verifying of the seller, the processing module 862 receives seller information 866 from the seller's computing device 12, where the seller's computing device 12 is associated with a proposed exchange item for sale. The seller information 866 includes one or more of a user identifier (ID), user payment information (e.g., credit card information, bank account information, PayPal™ information, Apple Pay™ information, etc.), user street address, user personal identification number (PIN), user account activity history, user device browser history, etc. For example, the processing module 862 receives the seller information 866 as new account information when the seller's computing device 12 accesses the MP server(s) 18 a first time. As another example, the processing module 862 retrieves at least a portion of the seller information 866 from the database 20 when the seller's computing device 12 was previously accessed the MP server(s) 18.

Having received the seller information 866, the processing module 862 obtains user account information 868 corresponding to the seller's user device 12. For example, the processing module 862 accesses database 20 to retrieve a portion of the user accounts 864 as the user account information 868, where the retrieved portion corresponds to the seller's user device 12. The user account information 868 includes one or more of a user identifier, user payment information (e.g., credit card information, bank account information, PayPal™ information, Apple Pay™ information, etc.), user street address, user PIN, account activity history, a virtual account balance within the marketplace, a record of exchange item purchases, etc.

Having obtained the user account information 868, the processing module 862 obtains inventory information 808 corresponding to the proposed exchange item for sale. For example, the processing module 862 retrieves, from the database 20, a portion of the virtual marketplace of exchange items 22 to extract the inventory information 808, where the portion is associated with the proposed exchange item for sale (e.g., same brand, similar balance).

Having obtained the inventory information 808, the processing module 862 selects a seller verification approach from a plurality of seller verification approaches. The plurality of seller verification approaches includes validating a street address, determining whether associated account activity history is favorable, verifying seller payment information (e.g., verifying bank information), verifying that history of the web browser 196 compares favorably to a predetermined browser profile and/or a historical profile for the seller's computing device 12, etc.

The selecting of the seller verification approach may be based on one or more of utilizing a predetermined approach, utilizing an approach associated with the seller's computing device 12, determining a risk level based on one or more of the seller ID, the brand associated with the proposed exchange item for sale, account activity history of the user account information, and mapping the risk level to a particular seller verification approach. For example, the processing module 862 determines to utilize the approach to verify that the history of the web browser 196 compares favorably to the historical profile for the seller's computing device 12 when the historical profile has matched a common profile for the seller's computing device 12 for the last 24 months.

Having selected the seller verification approach, the processing module 862 applies the selected seller verification approach to the seller information 866 utilizing the user account information 868 and the inventory information 808 to produce a seller verification status 870 (e.g., approved seller status, disapproved seller status, conditional approval status, i.e., limited to a particular brand and particular balance range). For example, the processing module 862 verifies the street address for the seller's user device, then verifies credit card information, and then verifies that the browser history compares favorably to a predetermined profile of the seller associated with selling of previous exchange items of the brand.

Having produced the seller verification status 870, the processing module 862 indicates the seller verification status 870. For example, the processing module 862 sends the seller verification status 870 to the seller's computing device 12 and updates the user accounts 864 to include a historical record entry of the seller verification status for this instance of verification.

Figure 18B:
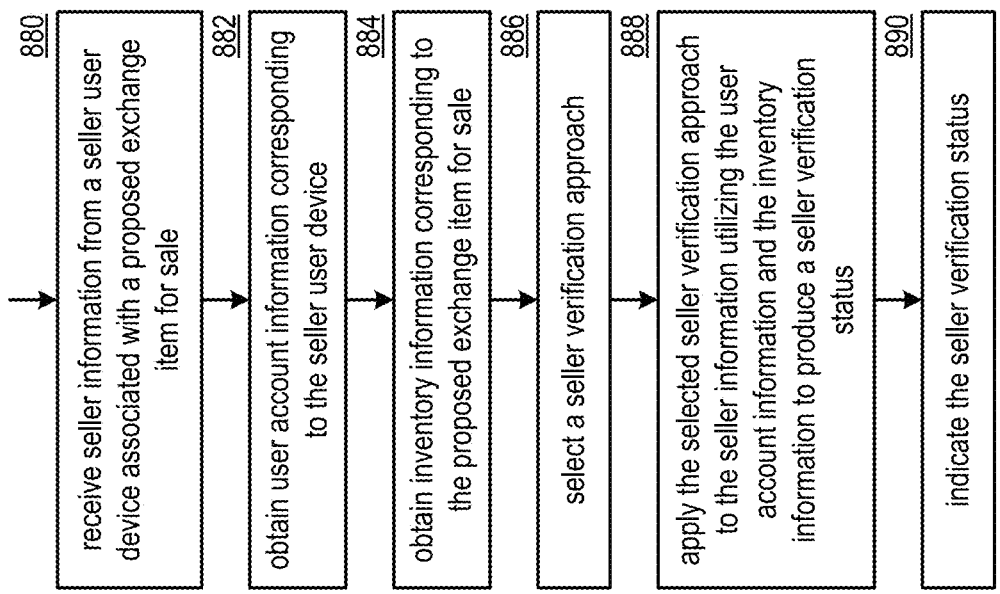
FIG. 18B is a logic diagram of another embodiment of a method for a seller device to interface with a marketplace server in accordance with the present invention.

FIG. 18B is a flowchart illustrating an example of verifying a seller within an exchange item marketplace network that is performed by a server and/or a computing device. The method begins or continues at step 880 where a processing module of the server and/or computing device receives seller information from a seller's computing device associated with the proposed exchange item for sale. The receiving may include one or more of receiving as part of new account information and retrieving user account information from a database as the seller information.

The method continues at step 882 where the processing module obtains user account information corresponding to the seller user device. For example, the processing module accesses the database to retrieve the user account information from a user accounts portion of the database. The method continues at step 884 where the processing module obtains inventory information corresponding to the proposed exchange item for sale. For example, the processing module retrieves the inventory information from a virtual marketplace of exchange items of the database and extracts pricing rules for a brand associated with the proposed exchange item for sale.

The method continues at step 886 where the processing module selects a seller verification approach. The selecting includes one or more of determining a risk level based on one or more of seller identity, the brand associated with the proposed exchange item for sale, and account activity history associated with the user account information, and mapping the determined risk level to an approach of a plurality of verification approaches.

The method continues at step 888 where the processing module applies the selected seller verification approach to the seller information utilizing the user account information in the inventory information to produce a seller verification status. For example, the processing module applies one or more steps associated with one or more approaches of the selected seller verification approach to produce the seller verification status. The method continues at step 890 where the processing module indicates the seller verification status. For example, the processing module sends the seller verification status seller user device and updates the user accounts to include a history record of the seller verification status.

Figure 19A:
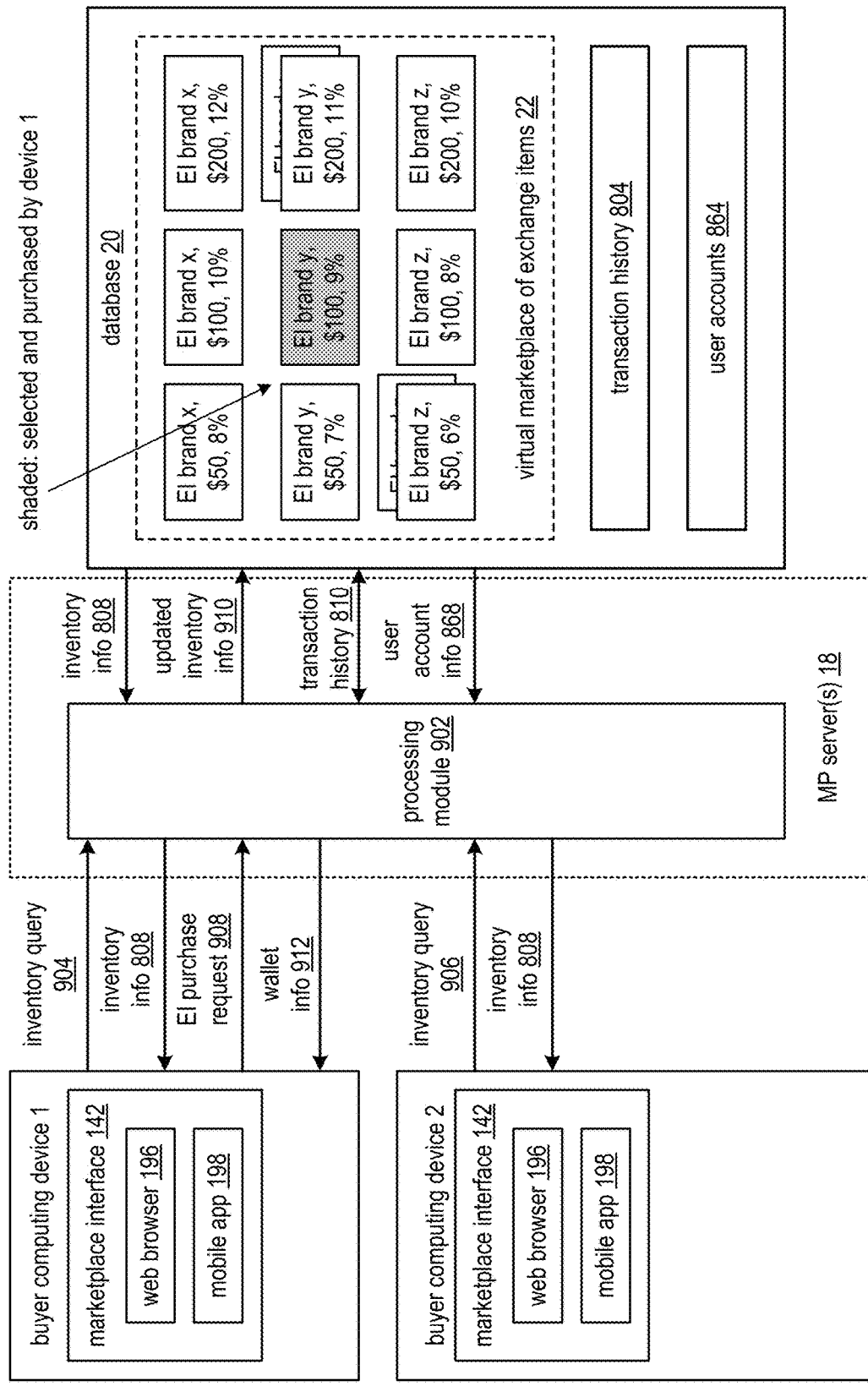
FIGS. 19A and 19B are schematic block diagrams of an embodiment of a buyer device interfacing with a marketplace server in accordance with the present invention.
Figure 19B:
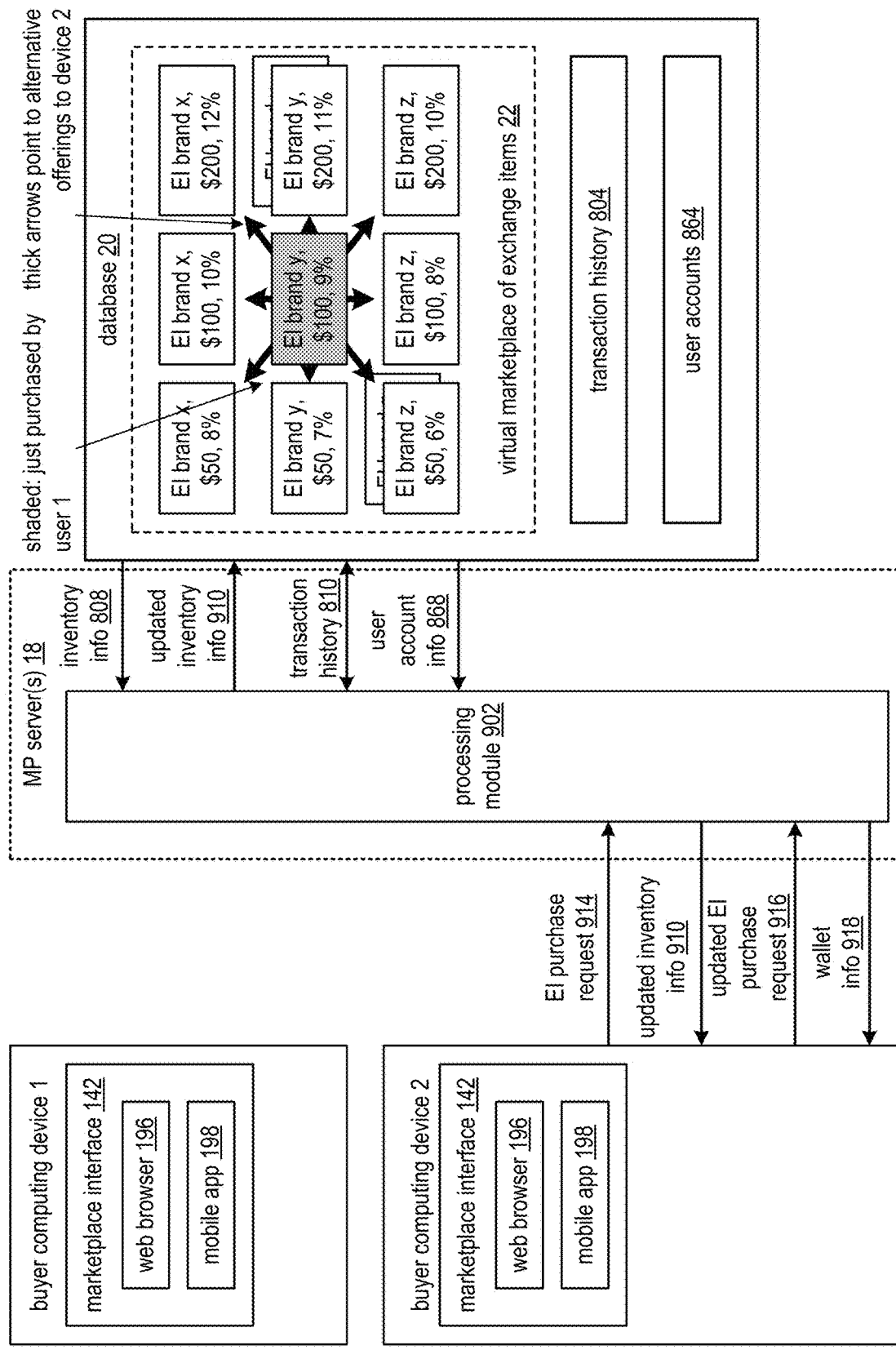

FIGS. 19A and 19B are schematic block diagrams of another embodiment of an exchange item marketplace network that includes buyer's computing devices 1-2 and marketplace (MP) server(s) 18. The MP server(s) 18 includes a processing module 902 and is coupled to the database 20.

FIG. 19A illustrates steps of an example of operation of the selecting of the exchange item for purchase where the processing module 902 receives an exchange item (EI) purchase request 908 from the buyer user device 1 for a unique EI for purchase, where the buyer user devices 1-2 receive common inventory information 808 that includes the unique EI. The EI purchase request 908 includes one or more of an EI type indicator, a brand, a price, a balance, a serial number, and a price range. For example, the processing module 902 receives an inventory query 904 from the buyer user device 1 and the processing module 902 receives an inventory query 906 from the buyer's computing device 2 within a time frame (e.g., within one second) of receiving the inventory query 904, the processing module issues inventory information 808 to the buyer's computing devices 1-2 (e.g., as retrieved from the virtual marketplace of exchange items 22), and the processing module 902 receives the EI purchase request 908 from the buyer's computing device 1 for the unique EI.

Each of the inventory queries 904 and 906 includes EI search guidance including one or more of a desired brand, one or more alternate brands, an adjacent brand indicator, a desired price, a desired price range, a desired value, a desired value range, a desired time frame for purchase, a desired discount level, and a desired discount level range. For example, each of the inventory queries 904 and 906 indicate a desired exchange item of brand y with a price range of $50-$100. The processing module 902 may organize the inventory information 808 retrieved from the database 20 by EI factors including one or more of brand, value, discount level, etc. based on the inventory queries 904 and 906. For example, the processing module 902 organizes the inventory information 808 to indicate other values and discount levels for the desired brand of the inventory queries 904 and 906 (e.g., a first EI with a brandy, value $50 with a discount level of 7%; a second EI with the brand y, value $100 with a discount level of 9%; one or more third EI with the brand y, value $200 with a discount level of 11%).

The processing module 902 may further organize the inventory information 808 by further EI factors based on other aspects of the inventory queries 904 and 906. For example, the processing module 902 organizes the inventory information 808 to further indicate values and discount levels for adjacent brands (e.g., similar category as a desired brand) to the desired brand of the inventory queries 904 and 906 (e.g., a fourth EI with a brand x, value $50 with a discount level of 8%; a fifth EI with the brand x, value $100 with a discount level of 10%; a sixth EI with the brand x, value $200 with a discount level of 12%; one or more seventh EI with a brand z, value $50 with a discount level of 6%; an eighth EI with the brand z, value $100 with a discount level of 8%; a ninth EI with the brand z, value $200 with a discount level of 10%).

Having organized the inventory information 808, the processing module 902 sends the organized inventory information 808 to each of the buyer's computing devices 1-2, where the inventory information 808 may be presented, utilizing either or both of the web browser 196 and the mobile application 198, for selection of an EI for purchase. For example, the processing module 902 receives the EI purchase request 908 from the buyer user device 1, where the EI purchase request 908 indicates that the second EI of the brand y with the value of $100 and the discount of 9% is the selected unique EI for purchase.

Having received the EI purchase request 908, the processing module 902 processes the EI purchase request 908 from the buyer's computing device 1 to complete a purchase transaction. For example, the processing module 902 verifies user account information 868 for the buyer's computing device 1 of the user accounts 864, issue's wallet information 912 to the buyer's computing device 1 to indicate purchase of the unique EI, updates the transaction history 804 with transaction history 810 of the transaction (e.g., brand, purchase price, value, discount level, buyer identity, seller identity, etc.), and stores updated inventory information 910 in the virtual marketplace of exchange items 22 (e.g., removes the EI exchange item of the brand y, $100 value, and 9% discount level). The wallet information 912 includes a digital representation of the unique EI including one or more of EI type, brand, an image of the EI, the purchase price, the balance, serial number, the pin, and EI use rules.

FIG. 19B illustrates further steps of the example of operation of the selecting of the exchange item for purchase where the processing module 902 receives an EI purchase request 914 for the same particular exchange item that was just purchased by the buyer user device 1. When the EI of the EI purchase request 914 is unavailable, the processing module 902 issues updated inventory information 910 to the buyer's computing device 2. For example, the processing module 902 compares the desired EI of the EI purchase request 914 to inventory information 808 retrieved from the virtual marketplace of exchange items 22, indicates that the desired EI of the EI purchase request 914 is unavailable based on the comparison, generates the updated inventory information 910 based on the inventory information 808, and sends the updated inventory information 910 to the buyer user device 2.

The processing module 902 generates the updated inventory information 910 based on interpreting one or more of recent transaction history 810 and user account information 868 associated with the buyer's computing device 2 retrieved from the user accounts 864 to produce a purchasing pattern (e.g., brand preference, value level preference, discount level preference, etc.) for the buyer's computing device 2 and generating the updated inventory information 910 based on the purchasing pattern and available exchange items, e.g., list similar brand items, similar balance levels for adjacent brands, and similar discount levels for adjacent brands. The processing module 902 may further organize the updated inventory information 910 in an order based on the purchasing pattern. For example, the processing module 902 lists same brand EI's with similar balances, same brand EI's with similar discounts, adjacent brand EI's with same balances, and adjacent brand EI's with similar discount levels.

Having sent the updated inventory information 910, the processing module 902 receives an updated EI purchase request 916 from the buyer's computing device 2 for another EI. Having received the updated EI purchase request 916, the processing module 902 processes the updated EI purchase request 916 to complete another transaction. For example, the processing module 902 verifies that user account information 868 for the buyer's computing device 2 is favorable, issues wallet information 918 to the buyer's computing device 2 to indicate purchase of the other EI, sends updated transaction history 810 to the database 20 to update the transaction history 804 with details of the other transaction, and rights updated inventory information 910 to the virtual marketplace of exchange items 22 within the database 20 to remove the other EI.

Figure 19C:
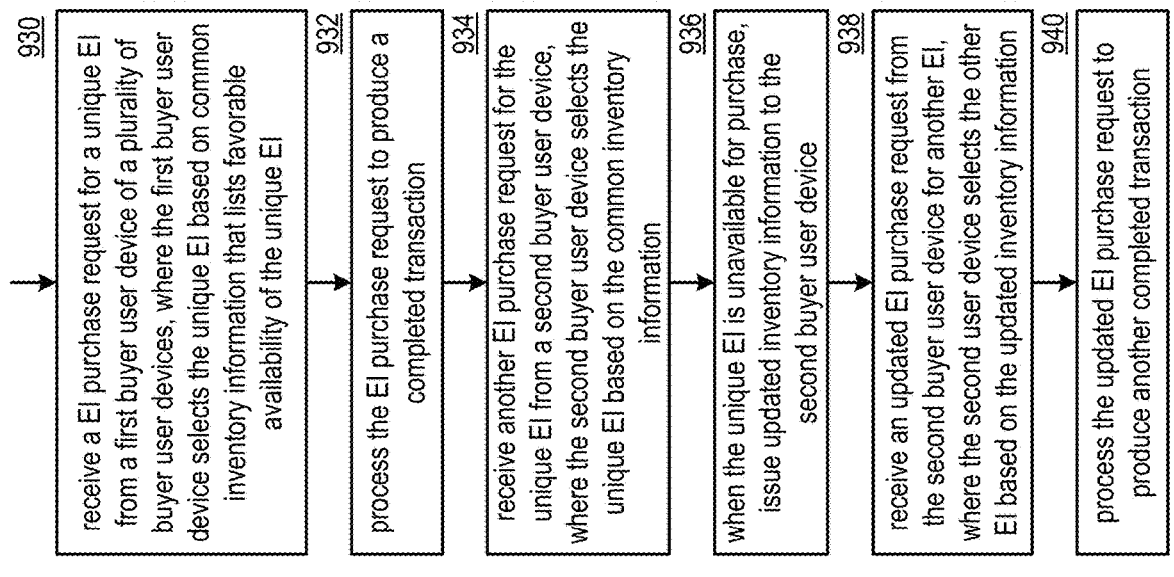
FIG. 19C is a logic diagram of an embodiment of a method for a buyer device to interface with a marketplace server in accordance with the present invention.

FIG. 19C is a flowchart illustrating an example of selecting an exchange item for purchase within an exchange item marketplace network that is performed by a server and/or a computing device. The method includes step 930 where a processing module of the server and/or the computing device receives an exchange item (EI) purchase request for a unique EI from a first buyer's computing device of a plurality of buyer's computing devices, where the first buyer's computing (or user) device selects the unique EI based on common inventory information that lists favorable availability of the unique EI. For example, the processing module receives inventory queries from the plurality of buyer user devices, issues the common inventory information to the plurality of buyer user devices, and receives a first purchase request from the first buyer user device as the EI purchase request.

The method continues at step 932 where the processing module processes the EI purchase request to produce a completed transaction. For example, the processing module verifies that user account information for the first buyer user device is favorable, issues wallet information to the first buyer user device to indicate purchase of the unique EI, updates transaction history to record information of the transaction, writes updated inventory information to a virtual marketplace of exchange items in a database (e.g., removes the unique EI and/or changes a status to unavailable).

The method continues at step 934 where the processing module receives another EI purchase request for the unique EI from a second buyer computing (or user) device, where the second buyer user device selects the unique EI based on the common inventory information. When the unique EI is unavailable for purchase, the method continues at step 936 where the processing module issues updated inventory information to the second buyer user device. The issuing includes interpreting one or more of transaction history and user account information associated with the second buyer user device to produce a purchasing pattern, generating the updated inventory information based on the purchasing pattern and available exchange items, and sending the updated inventory information to the second buyer user device.

The method continues at step 938 where the processing module receives an updated EI purchase request from the second buyer user device for another EI, where the second user device selects the other EI based on the updated inventory information. The method continues at step 940 where the processing module processes the updated EI purchase request to produce another completed transaction. For example, the processing module verifies that user account information for the second buyer user device is favorable, issues wallet information to the second buyer user device to indicate purchase of the other EI, updates transaction history to record information of the other transaction, and rights updated inventory information to the virtual marketplace of exchange items in the database (e.g., to remove the other EI).

Figure 20A:
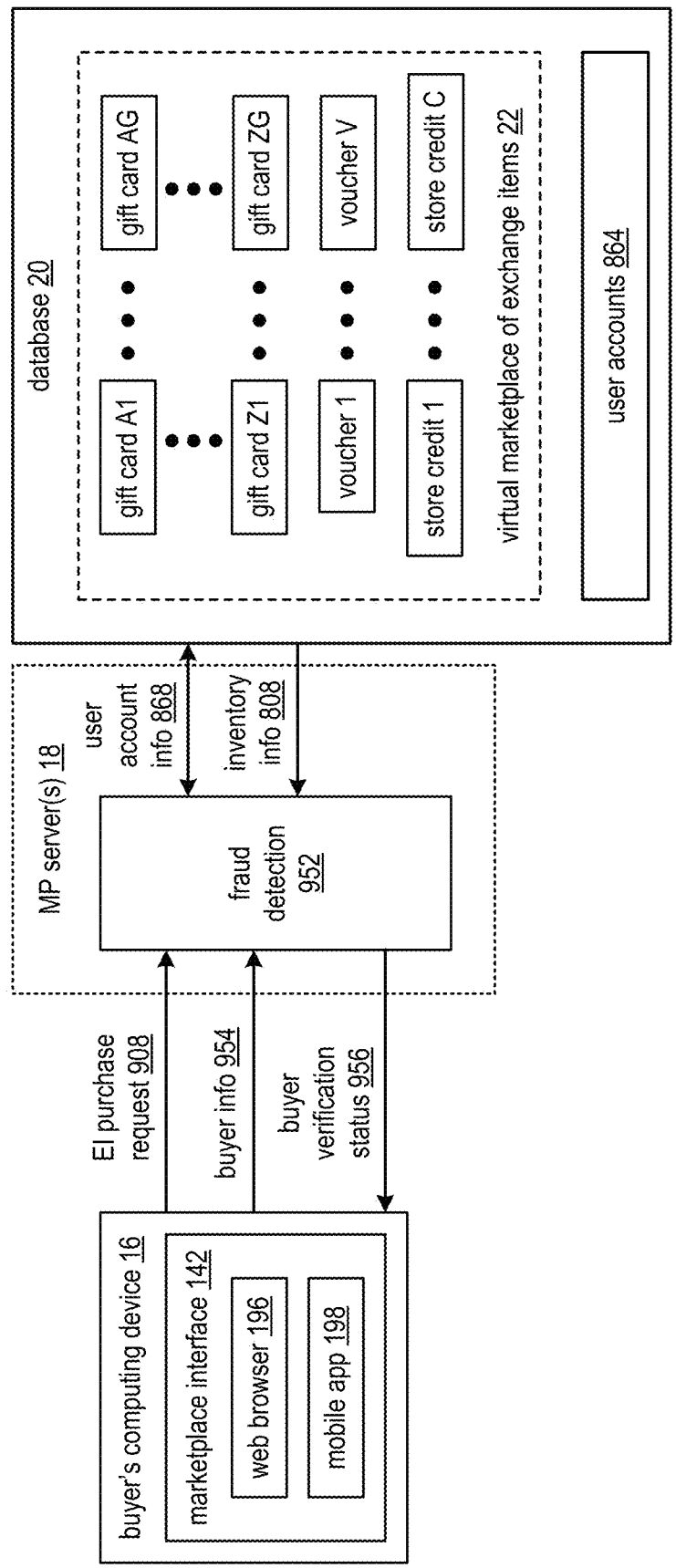
FIGS. 20A-20C are schematic block diagrams of an embodiment of a buyer device interfacing with a marketplace server regarding buyer verification in accordance with the present invention.

FIG. 20A is a schematic block diagram of another embodiment of an exchange item marketplace network that includes the buyer's computing (or user) device 16 and the marketplace (MP) server(s) 18. The MP server(s) 18 includes a fraud detection 952 functional block and is coupled to the database 20.

In an example of operation of the verifying of the buyer, the server 18, via the fraud detection 952 functional block, receives an exchange item (EI) purchase request 908 from the buyer's computing device 16 to request purchase of a selected exchange item. For example, the fraud detection 952 functional block receives the EI purchase request 908 from a new buyer, where a corresponding entry within the user accounts 864 has not been established. As another example, the fraud detection 952 functional block receives the EI purchase request 908 from an existing buyer, where the corresponding entry within the user accounts 864 has been previously established.

Having received the EI purchase request 908, the fraud detection 952 functional block obtains buyer information 954 associated with the EI purchase request 908. The buyer information 954 includes one or more of a buyer user identifier (ID), user payment information (e.g., credit card information, bank account information, PayPal information, Apple Pay information, etc.), user street address, user personal information number (PIN), account activity history, history of the web browser 196, activity logs from the mobile application 198, email history, and social media information (e.g., friends, groups, topics, etc.). The obtaining of the buyer information 954 includes at least one of receiving the buyer information 954 from the buyer's computing device 16 and interpreting user account information 868 (e.g., account activity history, user payment history, etc.) extracted from the user accounts 864 retrieved from the database 20.

Having obtained the buyer information 954, the fraud detection 952 functional block obtains inventory information 808 associated with the EI purchase request 908. The obtaining includes identifying inventory traits based on the EI purchase request 908 (e.g., requested brand, requested balance), identifying inventory information 808 associated with the identified inventory traits, and retrieving the identified inventory information 808 from the virtual marketplace of exchange items 22.

Having obtained the inventory information 808, the fraud detection 952 functional block selects a fraud determination approach based on one or more of a predetermination, a system security level, the EI purchase request 908, the buyer information 954, and the inventory information 808. For example, the fraud detection 952 functional block selects the approach of a plurality of approaches based on a type of the EI purchase request 908. As another example, the fraud detection 952 functional block selects the approach based on identity of the buyer. The fraud detection approach includes utilizing a fraud decision tree in conjunction with a plurality of answers to questions, utilizing a scoring threshold for a sum of a plurality of sub-scores associated with attributes of purchasing the selected exchange item, utilizing a majority vote on a plurality of pass/fail tests, utilizing a 100% favorable results requirement for the plurality of pass/fail tests, and any combination of two or more of the fraud detection approaches.

Having selected the fraud determination approach, the fraud detection 952 functional block determines a predicted fraud level utilizing the selected fraud determination approach. For example, the fraud detection 952 functional block facilitates performing of the decision tree analysis to produce the predicted fraud level. The performing of the decision tree analysis is discussed in greater detail with reference to FIGS. 20B-C.

Having determined the predicted fraud level, the fraud detection 952 functional block issues buyer verification status 956 to the buyer's computing device 16, where the buyer verification status 956 includes one of an approved buyer status, a disapproved buyer status, and a conditional approval status (e.g., contingent upon other conditions). The buyer verification status 956 may further include wallet information indicating completion of a purchasing transaction of the selected exchange item for purchase. For example, the fraud detection 952 generates the buyer verification status 956 to indicate the approved status when the predicted fraud level compares favorably to an approval threshold level. As another example, the fraud detection 952 functional block generates the buyer verification status 956 to indicate the disapproved buyer status when the predicted fraud level compares unfavorably to the approval threshold level. As yet another example, the fraud detection 952 functional block generates the buyer verification status 956 to indicate the disapproved buyer status when the predicted fraud level compares favorably to a disapproval threshold level. Having generated the buyer verification status 956, the fraud detection 952 functional block sends the buyer verification status 956 to the buyer's computing device 16, where the buyer's computing device 16 may interpret and/or display the buyer verification status 956 utilizing one or more of the web browser 196 and the mobile application 198.

Figure 20C:
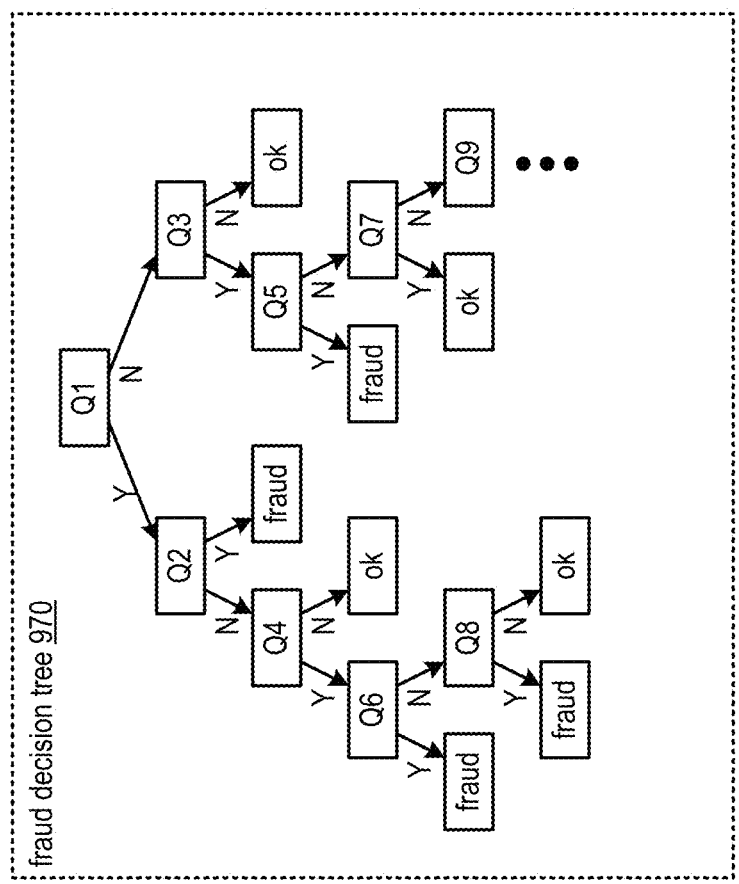
Figure 20B:
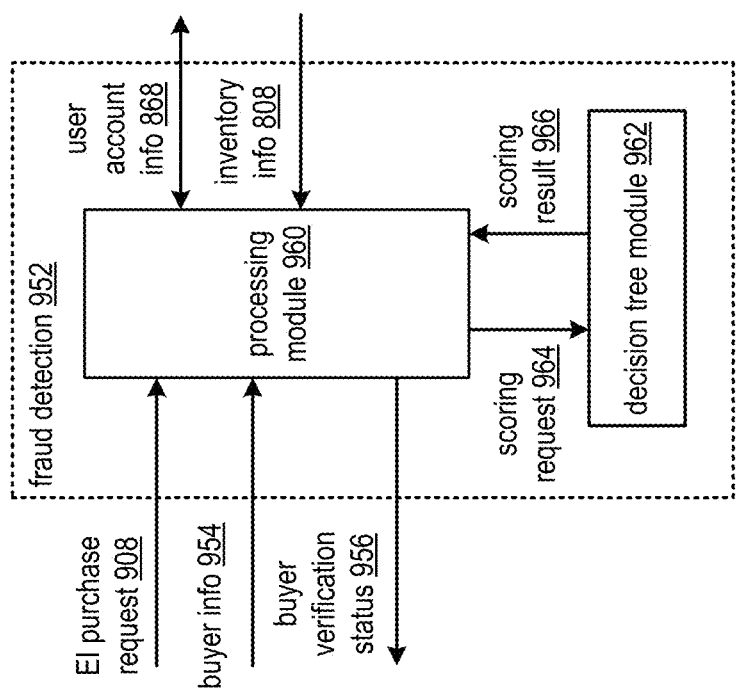

FIG. 20B is a schematic block diagram of an embodiment of the fraud detection 952 functional block of FIG. 20A that is implemented via a processing module 960, which further implements a decision tree module 962 as part of the fraud detection.

In another example of operation of the verifying of the buyer, the processing module 960, having selected the fraud determination approach based on one or more of the EI purchase request 908, the user account information 868, the inventory information 808, and the buyer information 954, issues a scoring request 964 to the decision tree module 962. The scoring request 964 includes one or more of a decision tree template, a plurality of decision tree questions, a plurality of decision tree question threshold levels, a plurality of answers to at least some of the plurality of questions, a decision tree scoring approach, one or more decision tree question formulation inputs, the EI purchase request 908, the user account information 868, the inventory information 808, and the buyer information 954.

Having received the scoring request 964, the decision tree module 962 determines a decision tree from one or more decision trees and based on the scoring request 964. The determining may be based on one or more of a predetermination, interpreting the scoring request 964, system registry information, a system fraud level, an external threat assessment input, a comparison of previous estimated fraud levels and actual outcomes (e.g., interpreting transaction history), and a desired risk level. For example, the decision tree module 962 selects a decision tree, modifies a structure of the decision tree to achieve a desired level of error (e.g., rate of false positives, rate of false negatives), and updates one or more of questions and answers thresholds for elements of the modified decision tree structure to achieve the desired level of error.

Having determined the decision tree, the decision tree module 962 performs a decision tree algorithm on content of the scoring request 964 utilizing the determined decision tree to produce a scoring result 966, where the decision tree algorithm traverses the determined decision tree from node to node based on the modified decision tree structure and answers to questions associated with each node that is associated with a corresponding question. For example, the decision tree module 962, for each node associated with a question of a plurality of questions of the determined decision tree, determines a corresponding answer (e.g., a hard yes, a hard no, a variable metric for comparison to a threshold), traverses to a next node of the determined decision tree based on the answer (e.g., two or more branches when branches exist within the tree structure), and determines a predicted fraud level when traversing to a node not associated with a question (e.g., a leaf node).

The determining of the predicted fraud level includes one of interpreting a hard result (e.g., fraud, okay not fraud) associated with the leaf node and generating a composite fraud score for a comparison to a fraud threshold level, where the composite fraud score is based on one or more results of nodes of the traversing of the decision tree. For example, the decision tree module 962 sums each numerical metric associated with each traversed node to produce the composite fraud score as the scoring result 966.

The processing module 960 interprets the scoring result 966 to generate the buyer verification status 956. When the hard result is utilized, the processing module 960 indicates the approved buyer status when the "okay not fraud" scoring result 966 is received. When the composite fraud score is utilized, the processing module 960 indicates the approved buyer status when the scoring result 966 compares favorably to the approved threshold level. Alternatively, when the composite fraud score is utilized, the processing module 960 indicates the disapproved buyer status when the scoring result 966 compares favorably to the disapproved threshold level.

FIG. 20C is a schematic block diagram of an embodiment of a fraud decision tree 970 that includes a plurality of nodes organized in a decision tree structure that includes branches between various nodes of the plurality of nodes in accordance with the decision tree structure. A corresponding decision tree algorithm utilizes the fraud decision tree 970 to traverse through the nodes utilizing the decision tree structure to arrive at and end node of a plurality of end nodes (e.g., leaf nodes). Each end node is associated with a scoring result, where the association includes at least one of a hard result (e.g., fraud, okay not fraud) and a variable scoring result (e.g., a varying number for comparison to a threshold determined a fraud level). Each non-end node is associated with a question of a plurality of potential questions of the fraud decision tree 970 and at least two branches based on an answer to the question, where each branch is associated with at least one of a hard yes/no answer and a calculated metric. Examples of questions associated with the fraud decision tree 970 includes is an Internet protocol address unique to a buyer user device, does a buyer email address age compare favorably to an age threshold, is a buyer credit card bank included in an approved list of banks, does a transaction amount compare favorably to a transaction threshold level, etc.

In an example of utilization of the fraud decision tree 970, a question 1 (Q1) is answered to produce a hard yes/no answer. The decision tree structure's traversed based on the answer, where a next question is Q2 when the answer is yes and the next question is Q3 when the answer is no. As another example, when utilizing variable metric answers rather than the hard yes/no answers, the answer to Q1 includes a first variable metric for comparison to a first threshold level. When the first variable metric compares favorably to the first threshold level, the branch is taken to the next question Q2, otherwise the branch is taken to the next question Q3. As yet another example, the branching based on the hard yes/no answers or the variable metrics are utilized to determine next questions and a variable metric is produced for one or more of the answers for utilization when an end node is reached to produce a composite scoring result based on a corresponding one or more variable metrics.

The decision tree structure (e.g., which questions, branching between nodes, threshold levels) of the fraud decision tree 970 may be changed from time to time based on comparing actual fraud results to predicted fraud results. For example, the decision tree structure is optimized to reduce error and detecting fraud when approving a transaction that turns out to be fraudulent.

Figure 20D:
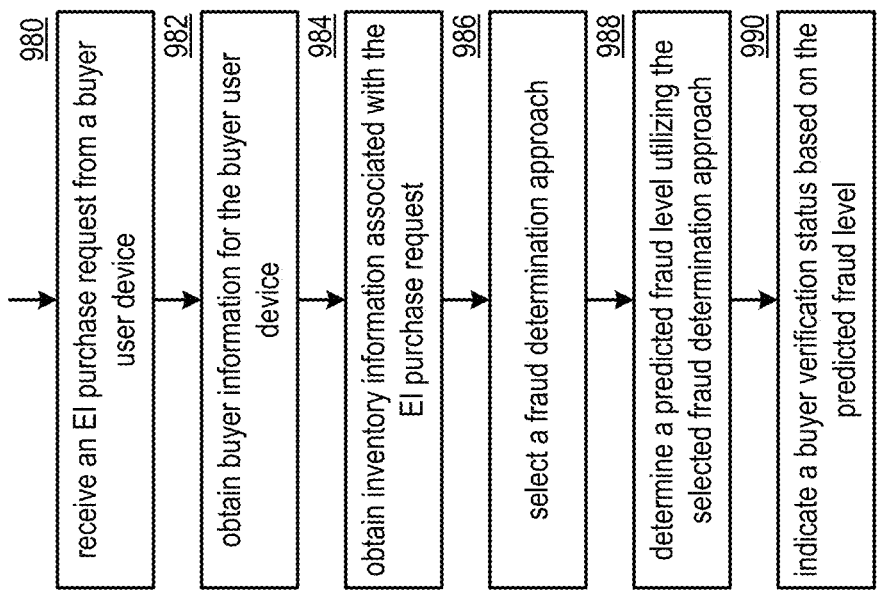
FIG. 20D is a logic diagram of an embodiment of a method for a buyer device to interface with a marketplace server regarding buyer verification in accordance with the present invention.

FIG. 20D is a flowchart illustrating an example of verifying a buyer within an exchange item marketplace network that is performed by a server and/or a computing device. The method includes step 980 where a processing module of the server and/or of the computing device receives an exchange item (EI) purchase request from a buyer user device. The receiving includes receiving the EI purchase request from a new buyer and receiving the EI purchase request from an existing buyer.

The method continues at step 982 where the processing module obtains buyer information for the buyer user device. The obtaining includes at least one of receiving the buyer information from the buyer user device and interpreting user account information from a database associated with the buyer user device. The method continues at step 984 where the processing module obtains inventory information associated with the EI purchase request.

The method continues at step 986 where the processing module selects a fraud determination approach. The selecting may be based on one or more of a predetermination, a system security level, the EI purchase request, the buyer information, and the inventory information. For example, the processing module selects an approach based on a type of EI purchase. As another example, the processing module selects the approach based on identity of the buyer (e.g., associated with a corresponding risk level).

The method continues at step 988 where the processing module determines a predicted fraud level utilizing the selected fraud determination approach. For example, the processing module performs a decision tree analysis to produce the predicted fraud level when utilizing a decision tree approach. As another example, the processing module generates a plurality of sub-scores and processes the plurality of sub-scores to produce the predicted fraud level when utilizing a scoring threshold approach.

The method continues at step 990 where the processing module indicates a buyer verification status based on the predicted fraud level. For example, the processing module issues an approved status to the buyer user device when the predicted fraud level compares favorably to an approved threshold level. As another example, the processing module issues a disapproved status to the buyer user device when the predicted fraud level compares unfavorably to the approved threshold level. As yet another example, the processing module issues a conditional approval to the buyer user device when the predicted fraud level compares favorably to a conditional threshold level. The issuing of the conditional approval may further include generating conditions (e.g., utilizing a different form of payment as compared to a previous form of payment) associated with the conditional approval.

Figure 21A:
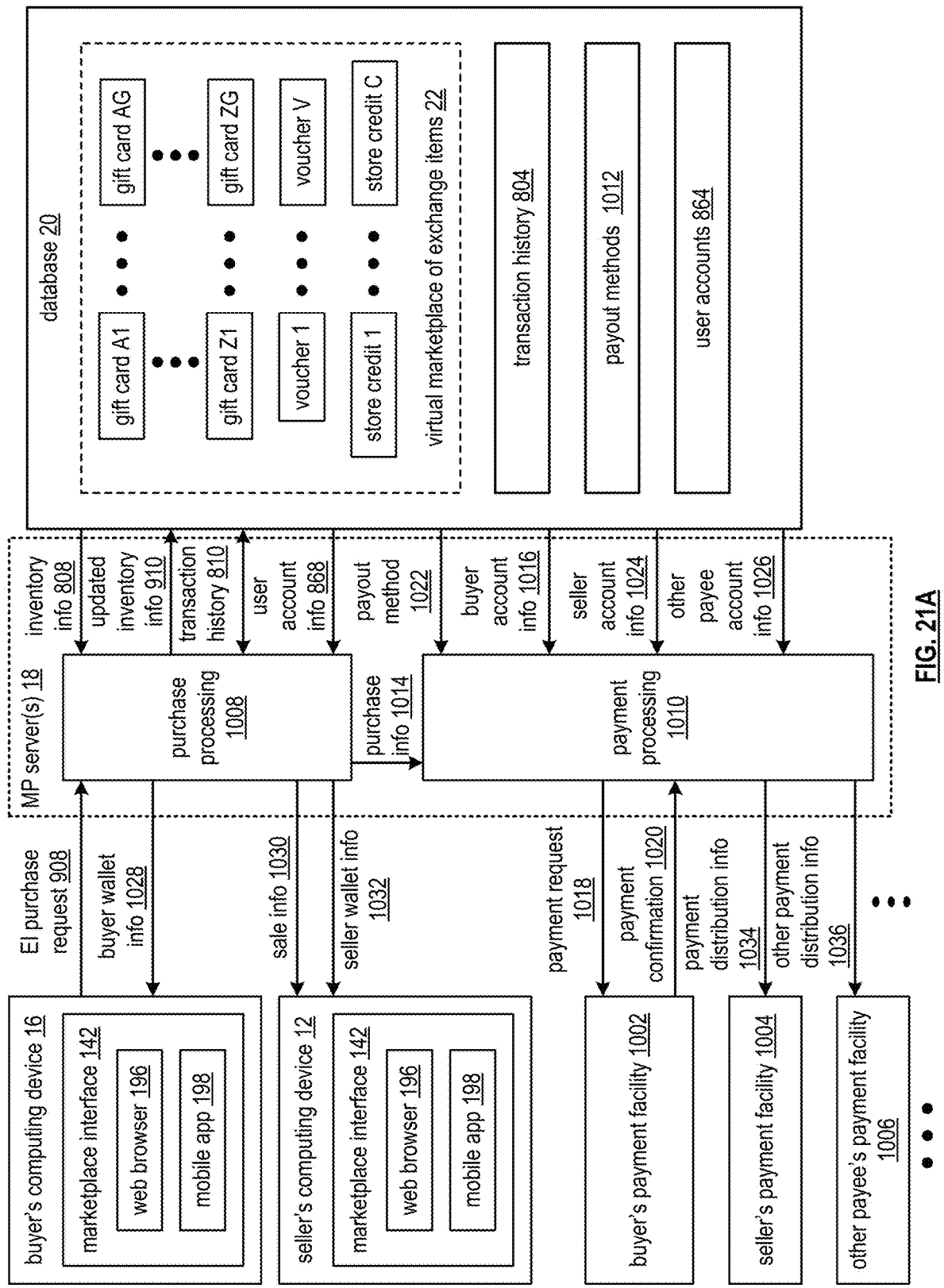
FIG. 21A is a schematic block diagram of an embodiment of a buyer device interfacing with a marketplace server regarding buyer purchase in accordance with the present invention.

FIG. 21A is a schematic block diagram of another embodiment of an exchange item marketplace network that includes the buyer's computing (or user) device 16, the seller's computing (or user) device 12, a buyer's payment facility 1002, a seller's payment facility 1004, another payee's payment facility 1006, and the marketplace (MP) server(s) 18. The buyer's payment facility 1002, the seller's payment facility 1004, and the other payee's payment facility 1006 may be implemented utilizing one or more of a server, a service provider associated with one or more of a bank, a plurality of banks, and intermediate bank, a settlement bank, etc.

The MP server(s) 18 has its processing module configure to implement a purchase processing 1008 and a payment processing 1010. The database 20 stores the virtual marketplace of exchange items, the user accounts 864, the transaction history 804, and payout methods 1012.

In an example of operation of the processing of the payment, the payment processing 1010 receives purchase information 1014 from the purchase processing 1008 with regards to the exchange item purchase transaction, where the purchase processing 1008 processes the purchase of the exchange item for purchase and generates the purchase information 1014. The purchase information 1014 includes one or more of an exchange item descriptor of the transaction, a selling price, a transaction identifier (ID), a seller ID, a buyer ID, and another payee ID.

The processing of the purchase includes the purchase processing 1008 receiving an exchange item (EI) purchase request 908 from the buyer's computing device 16. The processing further includes verifying inventory availability by retrieving inventory information 808 from the virtual marketplace of exchange items 22 and verifying a buyer of the buyer's computing device 16 by accessing transaction history 810 and user account information 868 associated with the buyer. The processing further includes updating available inventory information by issuing updated inventory information 910 to the virtual marketplace of exchange items 22 and updating a digital wallet associated with the buyer's computing device 16 by issuing buyer wallet information 1028 to the buyer's computing device 16. The processing further includes informing the seller's computing device 12 of the sale by issuing sale information 1030 to the seller's computing device 12 and updating a digital wallet associated with the seller's computing device 12 by issuing seller wallet information 1032 to the seller's computing device 12 when processing of the transaction impacts the digital wallet associated with the seller's user device (e.g., when the seller is to receive payment in the form of one or more of a marketplace credit, another exchange item).

The buyer wallet information 1028 and the seller wallet information 1032 include one or more of a digital representation of an exchange item, an exchange item type, a brand, an image of an exchange item, a price, a balance, a serial number, a personal identification number (VIN), and exchange item utilization rules. The sale information 1030 includes one or more of the exchange item type, the brand, the price, the balance, serial number, the transaction ID, a timestamp, and a date.

Having received the purchase information 1014, the payment processing 1010 issues a payment request 1018 to the buyer's payment facility 1002 in accordance with buyer account information 1016 and a payout method 1022 associated with one or more of the transaction and the buyer's computing device. The payment request 1018 includes one or more of a payment vendor ID, the exchange item descriptor, the price, and the transaction ID. For example, the payment processing 1010 issues a credit card payment request to the buyer's payment facility 1002 when the payout method 1022 retrieved from the payout methods 1012 within the database 20 indicates that a credit card is to be utilized for payment, where the payment request 1018 includes account information of the buyer account information 1016 retrieved from the user accounts 864 within the database 20.

Having issued the payment request 1018, the payment processing 1010 receives payment confirmation 1020 from the buyer's payment facility 1002 (e.g., confirmation of an approved credit card transaction). The payment confirmation 1020 includes one or more of the payment vendor ID, the exchange item descriptor, the price, the transaction ID, a confirmation number, and chargeback information.

Having received the payment confirmation 1020 the payment processing 1010 determines whether the payment confirmation 1020 indicates favorable payment (e.g., approved for a later payment, payment confirmed). When the payment confirmation 1020 indicates favorable payment, the payment processing 1010 identifies a payment method for each of the seller and one or more other payee's (e.g., an exchange item marketplace network operator, financial institutions, another seller, an exchange item investor, a brand owner, a retailer, a distributor, a bulk seller, a marketplace manager). The payment method includes one or more of a payment by wire, facilitating issuing of a physical check, an automatic clearing house (ACH) payment, generating a store credit, generating a marketplace credit, transferring another exchange item, issuing a PayPal™ payment, issuing an Apple Pay™ payment, etc.

The identifying of the payment method is based on one or more of a seller payment method of the payout method 1022, seller account information 1024, other payee payment method of the payout method 1022, and other payee account information 1026. For example, the payment processing 1010 accesses the user accounts 864 to retrieve the seller account information 1024 and the other payee account information 1026 and accesses the payout methods 1012 to extract the payment methods for the seller and the other payees.

Having identified the payment methods, the payment processing 1010 issues payment distribution information 1034 to the seller's payment facility 1004 in accordance with the seller payment method and the seller account information 1024 and issues other payment distribution information 1036 to the other payee's payment facility 1006 in accordance with the other payee's payment method and the other payee account information 1026. The payment distribution information 1034 and the other payment distribution information 1036 includes one or more of the buyer ID, the payment vendor ID, the exchange item descriptor, a payment amount, the transaction ID, payee account number, a payment authorization number, and an adjustment amount (e.g., service fees, transaction fees, etc.).

Figure 21B:
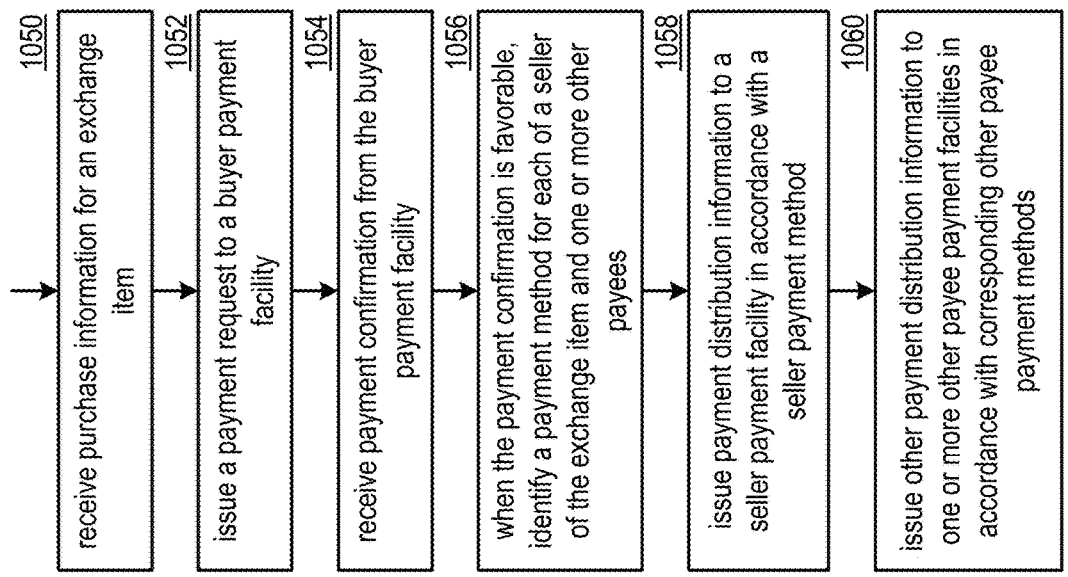
FIG. 21B is a logic diagram of an embodiment of a method for a seller device to interface with a marketplace server regarding buyer purchase in accordance with the present invention.

FIG. 21B is a flowchart illustrating an example of processing payment within an exchange item marketplace network that is performed by a server and/or a computing device. The method includes step 1050 where a processing module of the server and/or of the computing device receives purchase information for an exchange item purchase transaction. The method continues at step 1052 where the processing module issues a payment request to a buyer payment facility. The issuing includes obtaining buyer account information and extracting a payment method associated with one or more of the buyer account information and the purchase transaction. For example, the processing module identifies a credit card account number from the buyer account information and issues a payment request to a credit card company as the buyer payment facility, where the payment request includes the credit card account number.

The method continues at step 1054 where the processing module receives payment confirmation from the buyer payment facility. For example, the processing module interprets a status (e.g., favorable payment confirmation, unfavorable payment confirmation) associated with the payment confirmation and account information for acceptance of the payment (e.g., a holding account of a market place operator).

When the payment confirmation is favorable, the method continues at step 1056 where the processing module identifies a payment method for each of a seller of the exchange item and one or more other payees. The identifying includes one or more of accessing payment method information, accessing seller account information, and accessing other payee account information. For example, the processing module identifies an automatic clearing house (ACH) method and account number for the seller and identifies a holding account for a network operator as the other payee.

The method continues at step 1058 where the processing module issues payment distribution information to a seller payment facility in accordance with a seller payment method. For example, the processing module generates the payment distribution information based on the payment method for the seller and facilitates the payment in accordance with the payment method. For instance, the processing module facilitates generating the payment distribution information to include an account number of the network operator holding account and a payment amount, and sending of the payment distribution information to a seller bank account as the seller payment facility. As another example, the processing module sends the payment distribution information to the seller payment facility in accordance with a payment time requirement of the seller payment method (e.g., sending with a one-hour time delay).

The method continues at step 1060 where the processing module issues other payment distribution information to one or more other payee payment facilities in accordance with corresponding other payee payment methods. For example, the processing module generates the other payment distribution information based on the other payee payment method and facilitates the payment in accordance with the payment method (e.g., sending immediately, sending the time delay, wiring payment, initiating an ACH, etc.).

Figure 22A:
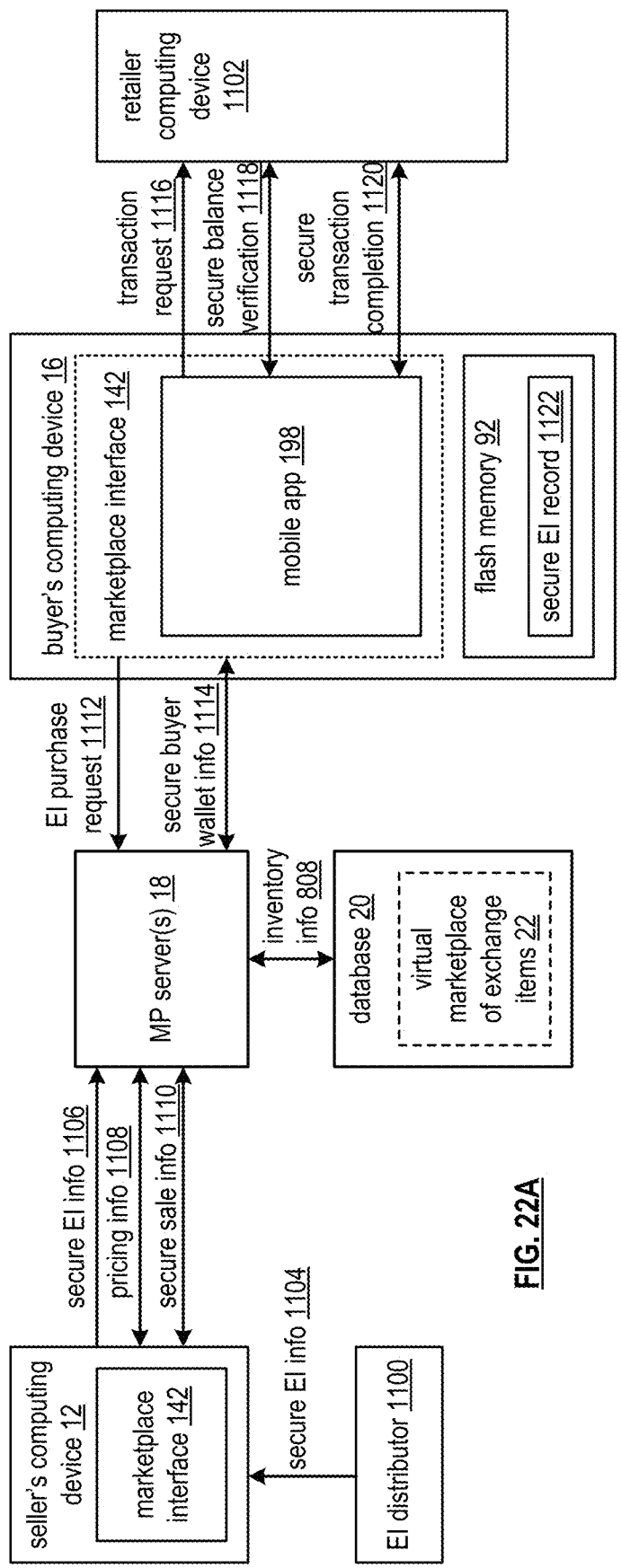
FIG. 22A is a schematic block diagram of another embodiment of an exchange item marketplace network in accordance with the present invention.

FIG. 22A is a schematic block diagram of another embodiment of an exchange item marketplace network that includes an EI distributor 1100, the seller's computing device 12, the MP server(s) 18, the database 20, the buyer's computing device 16, and a retailer computing device 1102. The EI distributor 1100 may be implemented utilizing one or more of the distributor servers 30 of FIG. 2 and the brand server(s) 26 of FIG. 2. The retailer computing device 1102 may be implemented utilizing one or more of the point-of-sale (POS) equipment 32 of FIG. 2, a merchant server, and the retail servers 34 of FIG. 2. The seller's computing device 12 includes the marketplace interface 142. The buyer's computing device 16 includes the marketplace interface 142 and the flash memory 92 of FIG. 3. The marketplace interface 142 includes the mobile app 198. The exchange item marketplace network functions to generate a transactions block chain while facilitating a plurality of exchange item transactions. The transactions block chain includes a block associated with each transaction of the plurality of exchange item transactions. Each block includes a header section and a transaction section. A structure of the transactions block chain is discussed in greater detail with reference to FIGS. 22B-C.

In an example of operation of the generating of the transactions block chain, the EI distributor 1100 generates a block 0 of the transactions block chain to establish exchange item (EI) information when determining to offer an exchange item for sale. The determining may be based on one or more of receiving a purchase request from the seller's computing device 12, receiving a bulk EI creation request, receiving the EI information from one or more of a branded company server and a processor service, and interpreting a schedule. For example, the EI distributor 1100 determines to establish the EI information when receiving, via the processor service, EI information for a plurality of exchange items from the branded company server. As another example, the EI distributor 1100 determines to establish the EI information when receiving, via a retail point-of-sale device, a purchase request for the EI from the seller's computing device 12.

Having determined to offer the EI for sale, the EI distributor 1100 obtains the EI information. The obtaining includes receiving the EI information from the processor service and generating the EI information. The generating the EI information includes obtaining one or more of available balance, serial number, personal identification number (PIN), brand, EI type, expiration date, pricing approach, purchase restrictions, a hash of one or more of the elements of the EI information (e.g., a secure hash of the EI type using a private key of a private/public key pair of the brand server(s) 26), and the public key of the private/public key pair of the brand server(s) 26. Having obtained the EI information, the EI distributor 1100 generates the block 0 to include the EI information.

The generating of the block 0 includes populating the block zero with a representation of the EI information and establishing trust for the block 0 utilizing a trust approach. The trust approach includes at least one of a digital signature approach utilizing a private key of a private/public key pair of the EI distributor 1100 and encrypting the EI information utilizing the private key of the private/public key pair of the EI distributor 1100 to produce the representation of the EI information. For example, the EI distributor 1100 encrypts the EI information and the public key of the EI distributor 1100 utilizing the private key of the EI distributor 1100 to produce the transaction section of the block 0 when utilizing the encryption trust approach. As another example, the EI distributor 1100 utilizes the private key of the EI distributor 1100 to generate a digital signature over the EI information and the public key of the EI distributor 1100 to produce the transaction section of the block 0.

When receiving the EI purchase request from the seller's computing device 12, the EI distributor 1100 generates a block 1 of the EI transactions chain to indicate that the seller's computing device 12 is purchasing the EI from the EI distributor 1100, where the block 1 is chained to the block 0 in accordance with a trusted chaining approach, and where the block 1 is generated utilizing the trust approach (e.g., as utilized when generating the block 0). The trusted chaining approach is discussed in greater detail with reference to FIG. 22C.

The generating of the block 1 includes generating seller to distributor payment information 1 (e.g., purchase price of this transaction, a timestamp of this transaction, purchaser identifier, and the transaction portion of the previous block), and establishing trust for the block 1 utilizing the trust approach. For example, the EI distributor 1100 obtains a public key of a private/public key pair of the seller's computing device 12, encrypts the seller to distributor payment information 1 and the public key of the seller's computing device 12 utilizing the private key of the EI distributor 1100 to produce the transaction portion of the block 1 when utilizing the encryption trust approach. As another example, the EI distributor 1100 utilizes the private key of the EI distributor 1100 to generate a digital signature over the seller to distributor payment information 1 and the public key of the seller's computing device 12 to produce the transaction section of the block 1.

Having generated the block 1 chained to the block 0, the EI distributor 1100 issues secure EI information 1104 to the seller's computing device 12. The issuing includes generating the secure EI information 1104 to include the EI transactions chain (e.g., blocks 0-1) and sending the secure EI information 1104 to the seller's computing device 12.

When determining to offer the EI for sale via the virtual marketplace of exchange items 22, the seller's computing device 12 issues secure EI information 1106 to the MP servers 18, where the secure EI information 1106 includes one or more of the secure EI information 1104 and a request to sell the EI via the virtual marketplace of exchange items 22. Having received the secure EI information 1106, MP servers 18 communicates pricing information 1108 with the seller's computing device 12, where the pricing information 1108 includes one or more of a desired price, a desired price range, a recommended price range, a recommended price, and a confirmed price.

Having communicated the confirmed price, the seller's computing device 12 and the MP servers 18 communicates secure sale information 1110. For example, the MP servers 18 updates inventory information 808 to provide a representation of the EI for storage in the database 20 based on the transaction portion of the block 1, the MP servers 18 provides a public key of a private/public key pair of the MP servers 18 to the seller's computing device 12, and the seller's computing device 12 generates a block 2 of the EI transactions chain to indicate that the MP servers 18 is representing the EI for purchase by a buyer's computing device 16, where the block 2 is chained to the block 1 in accordance with the trusted chaining approach, and where the block 2 is generated utilizing the trust approach (e.g., as utilized when generating the block 1).

The generating of the block 2 includes generating a marketplace to seller representation and/or payment information 2 (e.g., desired price, a timestamp of this transaction, purchaser identifier, and the transaction portion of the previous block), and establishing trust for the block 2 utilizing the trust approach. For example, the seller's computing device 12 obtains the public key of a private/public key pair of the MP servers 18, encrypts the seller representation and/or payment information 2 and the public key of the MP servers 18 utilizing the private key of the seller's computing device 12 to produce the transaction section of the block 2 when utilizing the encryption trust approach. As another example, the seller's computing device 12 utilizes the private key of the seller's computer device 12 to generate a digital signature over the seller representation and/or payment information 2 and the public key of the MP servers 18 to produce the transaction portion of the block 2.

Having generated the block 2 chained to the block 1, the seller's computing device 12 issues the secure sale information 1110 to the MP servers 18. The issuing includes generating the secure sale information 1110 to include the EI transactions chain (e.g., blocks 0-2) and sending the secure sale information 1110 to the MP servers 18.

When determining to purchase the EI for sale via the virtual marketplace of exchange items 22, the buyer's computing device 12 issues an EI purchase request 1112 to the MP servers 18, where the EI purchase request 1112 includes a request to purchase the EI (e.g., buyer's computing device 16 identifier, public key of a private/public key pair of the buyer's computing device 16, a purchase price, etc.). Having received the EI purchase request 1112, the MP servers 18 communicate secure buyer wallet information 1114 with the buyer's computing device 16. For example, the buyer's computing device 12 sends payment instructions to the MP servers 18 (e.g., purchase price, payment account information), the MP servers 18 generates a block 3 of the EI transactions chain to indicate that the buyer's computing device 16 is purchasing the EI for the purchase price amount, where the block 3 is chained to the block 2 in accordance with the trusted chaining approach, and where the block 3 is generated utilizing the trust approach (e.g., as utilized when generating the block 2).

The generating of the block 3 includes generating buyer to marketplace payment information 3 (e.g., a confirmed purchase price, payment instructions, a timestamp of this transaction, purchaser identifier, and the transaction portion of the previous block), and establishing trust for the block 3 utilizing the trust approach. For example, the MP servers 18 obtains the public key of the private/public key pair of the buyer's computing device 16, encrypts the buyer to marketplace payment information 3 and the public key of the buyer's computing device 16 utilizing the private key of the MP servers 18 to produce the transaction section of the block 3 when utilizing the encryption trust approach. As another example, the MP servers 18 utilizes the private key of the MP servers 18 to generate a digital signature over the buyer to marketplace payment information 3 and the public key of the buyer's computing device 16 to produce the transaction section of the block 3.

Having generated the block 3 chained to the block 2, the MP servers 18 issues secure buyer wallet information 1114 to the buyers computing device 16. The issuing includes generating the secure buyer wallet information 1114 to include the EI transactions chain (e.g., blocks 0-3) and sending the secure buyer wallet information 1114 to buyer's computing device 16, where the mobile app 198 facilitates storage of the transactions chain as a secure EI record 1122 in the flash memory 92.

When the buyer's computing device 16 determines to utilize the EI for payment of a transaction with the retailer computing device 1102, the buyer's computing device 16 sends a transaction request 1116 to the retailer computing device 1102, where the transaction request 1116 includes one or more of a retail transaction identifier of the transaction with the retailer computing device 1102, and payment instructions that identifies the EI.

Having received the transaction request 1116 the retailer computing device 1102 and the buyer's computing device 16 communicate secure balance verification 1118. The communicating of the secure balance verification information 1118 includes the buyer's computing device 16 sending one or more of the secure EI record 1122 (e.g., blocks 0-3) to the retailer computing device 1102 and the public key of the private/public key pair of the MP servers 18.

Having received the secure EI record 1122, the retailer computing device 1102 verifies that a sufficient balance level is associated with the secure EI record 1122 to facilitate completion of the transaction request 1116. For example, the retailer computing device 1102 decrypts the secure transaction section of the secure EI record 1122 utilizing the public key of the MP servers 18 to reveal the balance level and a public key of the buyer's computing device 16 for verification with a public key received directly from the buyer's computing device 16. The retailer computing device 1102 indicates favorable verification when the revealed balance level is sufficient and the received public key from the buyer's computing device 16 compares favorably (e.g., substantially the same) to the revealed public key from the secure EI record 1122. As another example, the retailer computing device 1102 verifies a signature over the secure transaction portion of the secure EI record 1122 utilizing the public key of the MP servers 18 to verify the balance level and to verify the public key of the buyer's computing device 16. The retailer computing device 1102 indicates favorable verification when the verified balance level is sufficient and the public key from the buyer's computing device 16 is verified from the secure EI record 1122. As yet another verification example, the retail computing device 1102 decrypts the hash of the one or more of the elements of the EI information using the private key of the EI distributor 1100 (e.g., or a brand server(s) 26) and indicates favorable verification when the decrypted hash is substantially the same as a calculated hash over the one or more of the elements of the EI information. As such, the EI can be considered a legitimately issued EI from the brand server(s) 26 (e.g., from the brand owner).

When the verifications are favorable, the retailer computing device 1102 and the buyer's computing device 16 communicate secure transaction completion 1120. For example, the buyer's computing device 16 sends payment instructions to the retailer computing device 1102 (e.g., purchase price, EI information), the buyer's computing device 16 generates a block 4 of the EI transactions chain to indicate that the buyer's computing device 16 is utilizing the EI for the purchase price amount, where the block 4 is chained to the block 3 in accordance with the trusted chaining approach, and where the block 4 is generated utilizing the trust approach (e.g., as utilized when generating the block 3).

The generating of the block 4 includes generating buyer to retailer payment information 4 (e.g., a confirmed purchase price, payment instructions utilizing the EI, a timestamp of this transaction, purchaser identifier, and the transaction portion of the previous block), and establishing trust for the block 4 utilizing the trust approach. For example, the buyer's computing device 16 obtains the public key of the private/public key pair of the retailer computing device 1102, encrypts the buyer to retailer payment information 4 and the public key of the retailer computing device 1102 utilizing the private key of the buyer's computing device 16 to produce the transaction section of the block 4 when utilizing the encryption trust approach. As another example, the buyer's computing device 16 utilizes the private key of the buyer's computing device 16 to generate a digital signature over the buyer to retailer payment information 4 and the public key of the retailer computing device 1102 to produce the transaction section of the block 4.

Having generated the block 4 chained to the block 3, the buyer's computing device 16 issues the secure transaction completion 1120 to the retailer computing device 1102. The issuing includes generating the secure transaction completion 1120 to include the EI transactions chain (e.g., blocks 0-4) and sending the secure transaction completion 1120 to the retailer computing device 1102, where the mobile app 198 may facilitate storage of an updated transactions chain as an updated secure EI record 1122 in the flash memory 92. Alternatively, or in addition to, each of the seller's computing device 12, the MP servers 18, and the buyer's computing device 16 may validate information within the EI transactions chain by validating the chaining of each block to a next block utilizing the trusted chaining approach and may further validate information with the EI transactions chain by validating integrity of the transaction section of one or more of the blocks utilizing the trust approach (e.g., verifying a signature, decrypting an encrypted transaction to reveal a public key for verification).

In another example of operation of the generating of the transactions block chain, at least one of the EI distributor 1100, the seller's computing device 12, and the MP server(s) 18, authenticates value of an exchange item to produce an authenticated value of the exchange item. The exchange item includes one of a closed loop financial instrument and a digital good. The authenticating of the value includes a variety of authenticating approaches.

A first authenticating approach includes the seller's computing device 12 authenticating the value of the exchange item via a communication with a brand server (e.g., issue an authentication request, interpret a received verification response to identify an available balance of the exchange item associated with the brand server), generating a secure exchange item package, and securely passing, by the seller's computing device 12 to the marketplace servers 18, control over the secure exchange item package such that the marketplace server 18 obtains the control over the secure exchange item package. The securely passing includes updating a transaction section of the secure exchange item package by including a public key of a recipient device (e.g., the marketplace servers 18) of the secure exchange item package and signing the secure exchange item package by a transferring device (e.g., the seller's computing device 12) of the secure exchange item package. The secure exchange item package includes a header section and a transaction section. The secure exchange item package is discussed in greater detail with reference to FIG. 22C. A second authenticating approach includes the MP server(s) 18 authenticating the value of the exchange item via the communication with the brand server, generating the secure exchange item package, and obtaining control over the secure exchange item package as a result of being an originator of the secure exchange item package.

With the authenticated value of the exchange item produced, the marketplace servers 18 obtains control over the secure exchange item package, where the secure exchange item package includes identity of the exchange item, identity of an authenticated owner of the exchange item, identity of the marketplace server, and the authenticated value (e.g., face value of the exchange item or remaining balance of the exchange item) of the exchange item and where only a device possessing control over the secure exchange item package may modify the secure exchange item package.

As an example of the obtaining of the control, the marketplace servers 18 receives from the seller's computing device 12, a request to sell the exchange item (e.g., receives the secure EI information 1106). In response to valid processing of the request to sell (e.g., communicating pricing information 1108), the seller's computing device 12 securely passes, to the marketplace servers 18, control over the secure exchange item package (e.g., communicates secure sale information 1110). Having obtained control, the marketplace servers 18 lists a representation of the exchange item for sale by storing associated inventory information 808 in the database 20 to update the virtual marketplace of exchange items 22.

With the exchange item represented within the virtual marketplace of exchange items 22, the marketplace server 18 receives, from the buyer's computing device 16, a request to purchase the exchange item (e.g., the EI purchase request 1112). Having received the request to purchase the exchange item, the marketplace servers 18, in response to valid processing of the request to purchase the exchange item (e.g., exchanging secure buyer wallet information 1114), securely passes to the buyer computing device 16, control over the secure exchange item package (e.g., via the secure buyer wallet information 1114). Having received the secure buyer wallet information 1114, the mobile app 198 stores the secure buyer wallet information 1114 as the secure EI record 1122 in the flash memory 92.

For use of the exchange item (e.g., as initiated with the transaction request 1116), the buyer computing device 16 securely passes, to the retailer computing device 1102 (e.g., the merchant server), control over the secure exchange item package. The use may further include the retailer computing device 1102 verifying that the balance of the exchange item is sufficient for a purchase transaction by communicating secure balance verification 1118 with the buyer's computing device 16.

With control over the secure exchange item package, the merchant server (e.g., the retailer computing device 1102) executes use of the exchange item by updating the value of the exchange item to produce an updated value of the exchange item. For example, the retailer computing device 1102 subtracts an amount of the purchase transaction (e.g., for goods provided by a retailer to a user of the buyer's computing device 16) from the value of the exchange item to produce the updated value of the exchange item.

Having generated the updated value of the exchange item, the retailer computing device 1102 generates an updated secure exchange item package, where the updated secure exchange item package includes identity of the exchange item, identity of the merchant server, identity of the buyer computing device, and the updated value of the exchange item. Having generated the updated secure exchange item package, the merchant server (e.g., the retailer computing device 1102) securely passes control over the updated secure exchange item package to the buyer's computing device 16 (e.g., by communicating the secure transaction completion 1120).

Alternatively or in addition to, for a second use of the exchange item, the buyer's computing device 16 securely passes, to a second merchant server, control over the updated secure exchange item package. The second merchant server executes the second use of the exchange item by updating the updated value of the exchange item to produce a second updated value of the exchange item, generating a second updated secure exchange item package, where the second updated secure exchange item package includes identity of the exchange item, identity of the second merchant server, identity of the buyer's computing device 16, and the second updated value of the exchange item, and securely passes, to the buyer's computing device 16, control over the second updated secure exchange item package.

Figure 22B:
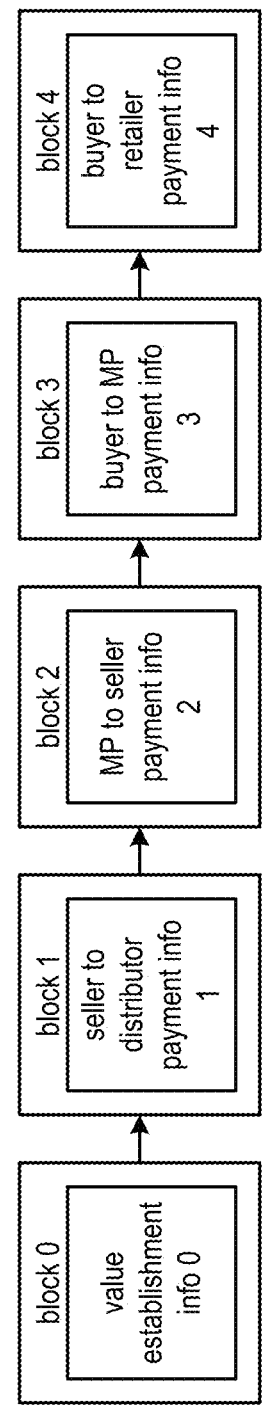
FIG. 22B is a schematic block diagram of a transactions block chain in accordance with the present invention.

FIG. 22B is a schematic block diagram of a transactions block chain where the transactions block chain includes a plurality of blocks. The transactions block chain represents an exchange item (EI) transaction chain when the plurality of blocks include exchange item transaction sections. Each block includes a header section and a transaction section. Each other portion links one block to other block in a sequential fashion. The linking is discussed in greater detail with reference to FIG. 22C. The transaction section includes EI transaction information associated with an EI transaction between two or more entities of an exchange item marketplace. For example, the block 0 includes valuable establishment 0 transaction information with regards to a genesis of a particular exchange item to be available to entities of the exchange item marketplace, the block 1 includes seller to distributor payment information 1 transaction information with regards to the seller's computing device 12 purchasing the EI from the EI distributor 1100, the block 2 includes marketplace servers 18 to seller representation/payment information 2 transaction information with regards to the seller's computing device 12 offering the EI for sale utilizing the MP servers 18, the block 3 includes buyer to marketplace payment information 3 transaction information with regards to the buyer's computing device 16 purchasing the EI via the MP servers 18 from the seller's computing device 12, and the block 4 includes buyer to retailer payment information 4 transaction information with regards to the buyer's computing device 16 utilizing the EI to complete a desired purchase transaction with the retailer computing device 1102.

Figure 22C:
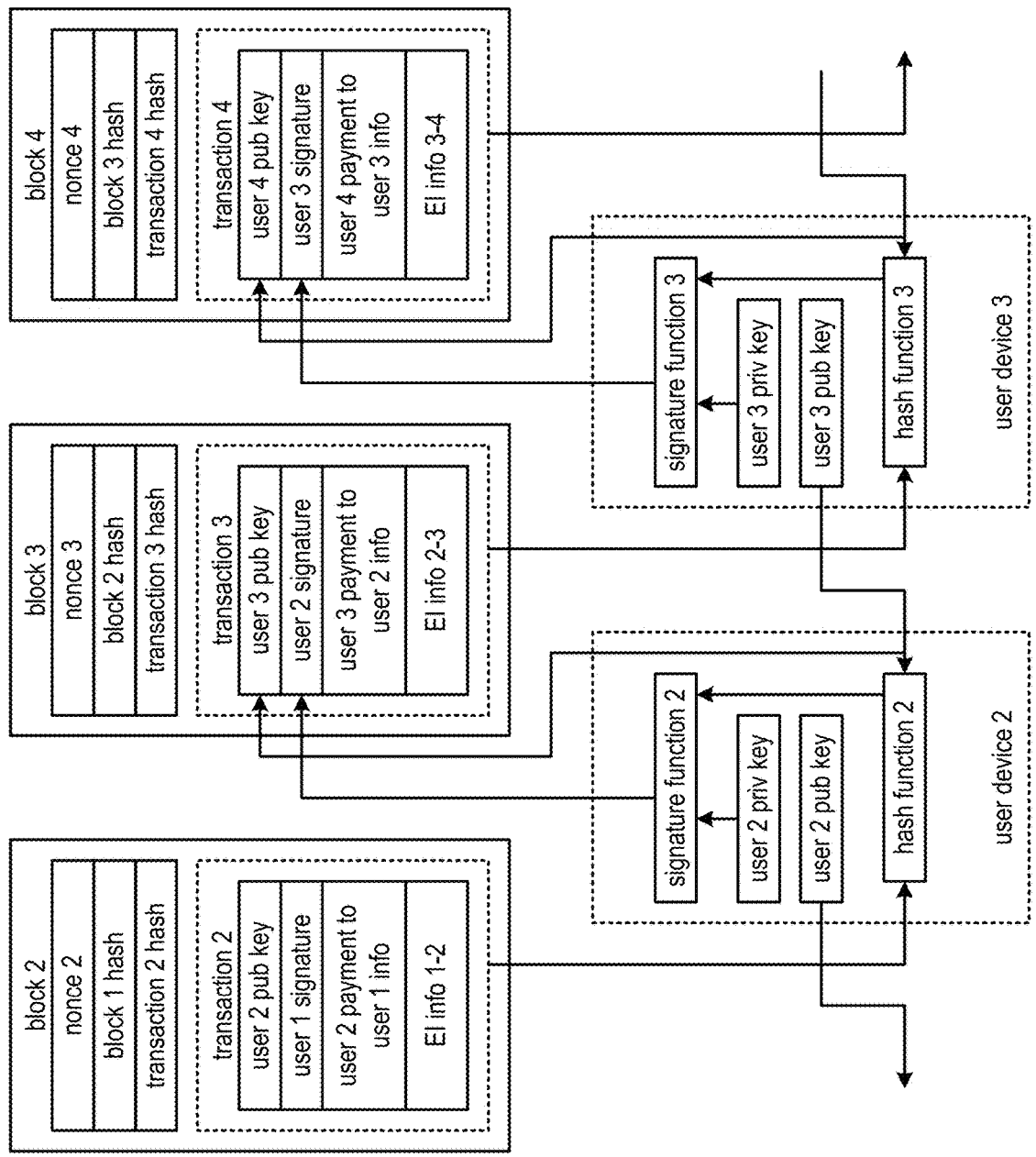
FIG. 22C is another schematic block diagram of a transactions block chain in accordance with the present invention.

FIG. 22C is another schematic block diagram of a transactions block chain. The transactions block chain includes a plurality of blocks, where each block includes a secure exchange item package. Each secure exchange item package includes a header section and a transaction section. The header section includes one or more of a nonce, a hash of a preceding block of the secure exchange item package, where the preceding block was under control of a preceding device in a chain of control of the secure exchange item package, and a hash of a current block (e.g., a current transaction section) of the secure exchange item package, where the current block is under control of a current device in the chain of control of the secure exchange item package. The transaction section includes one or more of a public key of the current device, a signature of the preceding device, payment information regarding a change of control from the preceding device to the current device, and exchange item information that includes at least some of the identity of the exchange item, a brand of the exchange item, time restrictions of the exchange item, a digital image of the exchange item, the authenticated value, and use restrictions of the exchange item.

FIG. 22C further includes user devices 2-3 (e.g., the seller's computing device 12, the MP servers 18, the buyer's computing device 16, the retailer computing device 1102) to facilitate illustration of generation of the secure exchange item package. Each user device includes a hash function, a signature function, and storage for a public/private key pair generated by the user device.

An example of operation of the generating of the secure exchange item package, when the user device 2 has control of the secure exchange item package and is passing control of the secure exchange item package to the user device 3 (e.g., the user device 3 is transacting an exchange with the user device 2), the user device 2 obtains the user 3 public key from the user device 3, performs a hash function 2 over the user 3 public key and the transaction 2 to produce a hashing resultant (e.g., preceding transaction to user device 2) and performs a signature function 2 over the hashing resultant utilizing a user 2 private key to produce a user 2 signature. Having produced the user 2 signature, the user device 2 generates the transaction 3 to include the user 3 public key, the user 2 signature, user 3 payment to the user 2 information, and EI information 2-3. The user 3 payment to the user 2 information includes payment instructions from user 3 to user 2. The EI information 2-3 includes an updated balance of the exchange item (e.g., after the transaction between the user device 3 and the user device 2), a serial number of the exchange item, an expiration date of the exchange item, a type of the exchange item, a brand identifier, an image, a personal identification number, and utilization rules for the exchange item.

Having produced the transaction 3 section of the block 3 (e.g., a secure exchange item package 3), a processing module (e.g., of the user device 2, of the user device 3, of a transaction mining server, of the marketplace server 18) generates the header section by performing a hashing function over the transaction section 3 to produce a transaction 3 hash, performing the hashing function over the preceding secure exchange item package (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the secure exchange item package 3, the user device 2 sends the secure exchange item package 3 to the user device 3. Having received the secure exchange item package 3, the user device 3 validates the received secure exchange item package 3. The validating includes one or more of verifying the user 2 signature over the preceding transaction section (e.g., transaction 2) and the actual user 3 public key utilizing the user 2 public key (e.g., a re-created signature function result compares favorably to user 2 signature) and verifying that an extracted user 3 public key of the transaction 3 compares favorably to the user 3 public key held by the user device 3. The user device 3 considers the received secure exchange item package 3 validated when the verifications are favorable (e.g., the available balance of the exchange item is trusted).

Figure 22D:
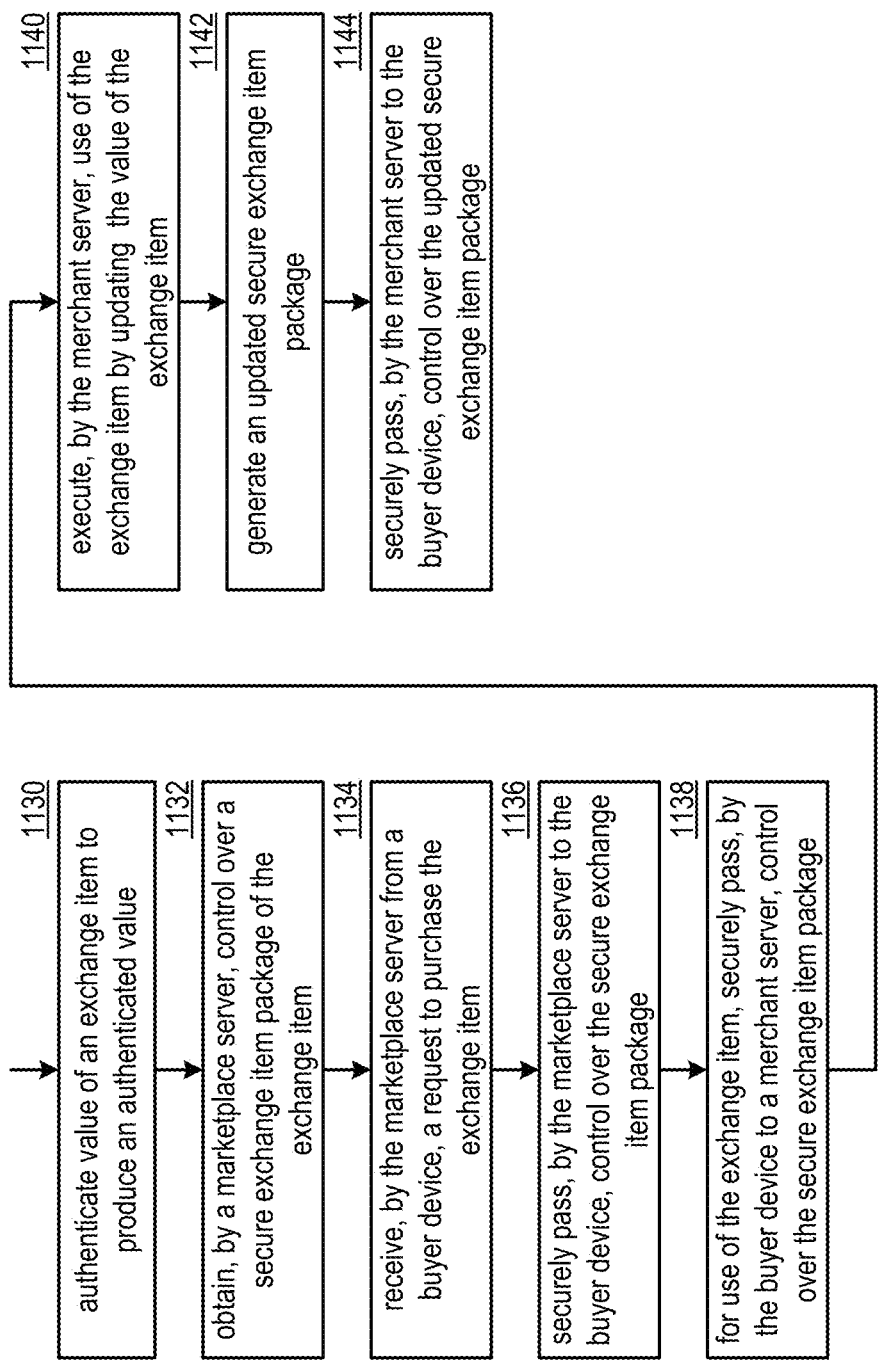
FIG. 22D is a logic diagram of an embodiment of a method for generating a transactions block chain in accordance with the present invention.

FIG. 22D is a logic diagram of an embodiment of a method for generating a transactions block chain. In particular, a method is presented for use in conjunction with one or more functions and features described in conjunction with FIGS. 1-21B, 22A-C, and also FIG. 22D. The method includes step 1130 where a processing module of a computing device of one or more computing devices of an exchange item marketplace network authenticates value of an exchange item to produce an authenticated value of the exchange item, where the exchange item includes one of a closed loop financial instrument and a digital good.

As an example of the authenticating the value of the exchange item, a seller device authenticates the value of the exchange item via a communication with a brand server, generates a secure exchange item package, and securely passes, to the marketplace server, control over the secure exchange item package such that the marketplace server obtains the control over the secure exchange item package. The securely passing includes updating a transaction section of the secure exchange item package by including a public key of a recipient device of the secure exchange item package and signing the secure exchange item package by a transferring device of the secure exchange item package. The secure exchange item package includes a header section and a transaction section. As another example of the authenticating the value of the exchange item, the marketplace server authenticates the value of the exchange item via a communication with the brand server, generates the secure exchange item package, and obtains control over the secure exchange item package as a result of being an originator of the secure exchange item package.

The method continues at step 1132 where the marketplace server obtains control over the secure exchange item package, where the secure exchange item package includes identity of the exchange item, identity of an authenticated owner of the exchange item, identity of the marketplace server, and the authenticated value (e.g., face value of the exchange item and/or a remaining balance of the exchange item) of the exchange item and where only a device possessing control over the secure exchange item package may modify the secure exchange item package. As an example of the obtaining of the control, the marketplace server receives, from the seller device, a request to sell the exchange item and in response to valid processing of the request to sell, the seller device securely passes, to the marketplace server, control over the secure exchange item package.

The method continues at step 1134 where the marketplace server receives, from a buyer device, a request to purchase the exchange item. In response to valid processing of the request to purchase the exchange item, the method continues at step 1136 where the marketplace server securely passes, to the buyer device, control over the secure exchange item package. For use of the exchange item, the method continues at step 1138 where the buyer device securely passes, to a merchant server, control over the secure exchange item package.

The method continues at step 1140 where the margin server executes use of the exchange item by updating the value of the exchange item to produce an updated value of the exchange item (e.g., deducting a purchase price of a purchase transaction from the value of the exchange item to produce the updated value the exchange item). The method continues at step 1142 where the merchant server generates an updated secure exchange item package, where the updated secure exchange item package includes identity of the exchange item, identity of the merchant server, identity of the buyer device, and the updated value of the exchange item. The method continues at step 1144 where the merchant server securely passes, to the buyer device, control over the updated secure exchange item package.

Alternatively or in addition to, for a second use of the exchange item, the buyer device securely passes, to a second merchant server, control over the updated secure exchange item package. The second merchant server executes the second use of the exchange item by updating the updated value of the exchange item to produce a second updated value of the exchange item, generates a second updated secure exchange item package, where the second updated secure exchange item package includes identity of the exchange item, identity of the second merchant server, identity of the buyer device, and the second updated value of the exchange item, and securely passing, to the buyer device, control over the second updated secure exchange item package.

The method described above in conjunction with one or more of the processing module, the seller device, the marketplace server, the buyer device, the merchant server, the second merchant server, can alternatively be performed by other modules of the exchange item marketplace network or by other devices. In addition, at least one memory section (e.g., a non-transitory computer readable storage medium) that stores operational instructions can, when executed by one or more processing modules of one or more computing devices of the exchange item marketplace network, cause the one or more computing devices to perform any or all of the method steps described above.

Figure 22E:
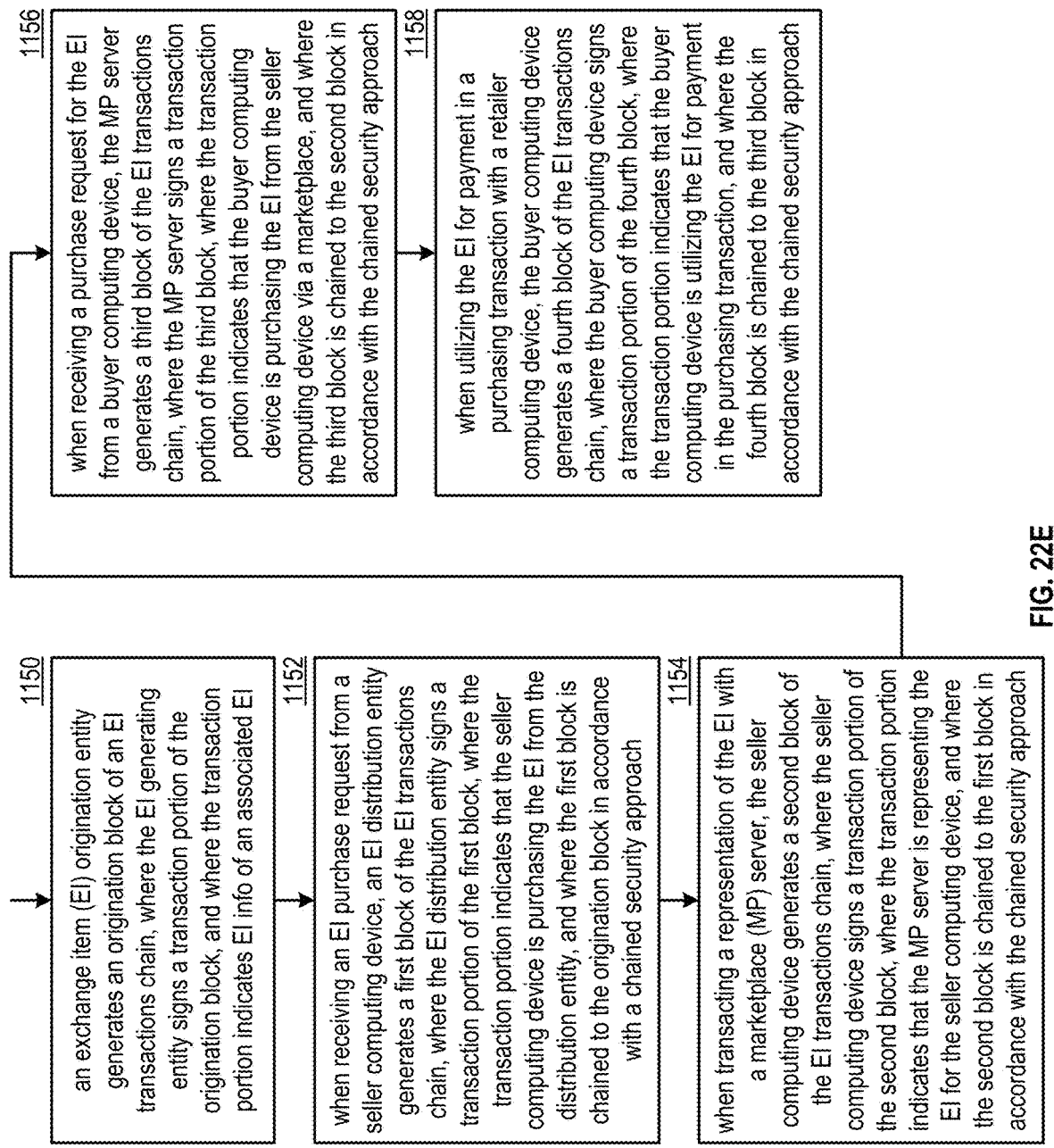
FIG. 22E is a logic diagram of another embodiment of a method for generating a transactions block chain in accordance with the present invention.

FIG. 22E is a logic diagram of another embodiment of a method for generating a transactions block chain. In particular, a method is presented for use in conjunction with one or more functions and features described in conjunction with FIGS. 1-21B, 22A-D, and also FIG. 22E. The method includes step 1150 where a processing module of a computing device (e.g., of an exchange item origination entity) of one or more computing devices of an exchange item marketplace network generates an origination block of an EI transaction chain, where the EI origination entity signs a transaction portion of the origination block, and where the transaction portion indicates EI information of an associated EI. For example, the origination entity generates value establishment information in accordance with a trust approach (e.g., self-signing over the value establishment information to produce the transaction portion, signing the value establishment information, that includes a public key of a private/public key pair of the EI origination entity, utilizing the private key to produce the transaction portion).

When receiving an EI purchase request from a seller computing device, the method continues at step 1152 where a processing module of an EI distribution entity generates a first block of the EI transactions chain, where the EI distribution entity signs the transaction portion of the first block, where the transaction portion indicates that the seller computing device is purchasing the EI from the distribution entity, and where the first block is chained to the origination block in accordance with a chained security approach (e.g., hash of transaction portion, hash of a previous block). The EI distribution entity may be implemented utilizing the EI origination entity. For example, the EI distribution entity signs the transaction portion utilizing a private key of a private/public key pair of the seller computing device to produce the transaction portion of the first block.

When transacting a representation of the EI with a marketplace server, the method continues at step 1154 where the seller computing device generates a second block of the EI transactions chain, where the seller computing device signs a transaction portion of the second block, where the transaction portion indicates that the MP server is representing the EI for the seller computing device, and where the second block is chained to the first block in accordance with the chained security approach. For example, the MP server receives secured EI information from the seller computing device (e.g., an offer for sale), provides pricing information to the seller computing device, receives a confirmed price from the seller computing device, issues secure sale information to the seller computing device, and updates inventory information within a virtual exchange item marketplace, where the secure sale information includes the second block of the EI transactions chain and a public key of the MP server.

When receiving a purchase request for the EI from a buyer computing device, the method continues at step 1156 where the MP server generates a third block of the EI transactions chain, where the MP server signs a transaction portion of the third block, where the transaction portion indicates that the buyer computing device is purchasing the EI from the seller computing device via the marketplace, and where the third block is chained to the second block in accordance with the chained security approach. For example, the buyer computing device issues an EI purchase request to the MP server based on received inventory information from the MP server, the MP server generates secure buyer wallet information, the buyer computing device stores a security EI record, where the secure buyer wallet information includes the third block of the EI transactions chain and the secure EI record includes the EI transactions chain. For instance, the MP server signs a public key of the buyer computing device and the transaction portion utilizing a private key of a private/public key pair of the MP server to produce the transaction portion of the third block.

When utilizing the EI for payment in a purchasing transaction with a retailer computing device, the method continues at step 1158 where the buyer computing device generates a fourth block of the EI transactions chain, where the buyer computing device signs a transaction portion of the fourth block, where the transaction portion indicates that the buyer computing device is utilizing the EI for payment in the purchasing transaction, and where the fourth block is chained to the third block in accordance with the chained security approach. For example, the buyer computing device issues a transaction request to the retailer computing device, the retailer computing device exchanges secure balance information with the buyer computing device (e.g., verifies the trust of the EI transactions chain, where the EI transactions chain indicates an available balance of the EI verifying that an available balance is sufficient), the retailer computing device issues secure transaction completion information to the buyer computing device, where the secure transaction completion information includes the fourth block of the EI transactions chain. The buyer computing device signs the public key of the retailer computing device and the transaction portion to produce a transaction portion of the fourth block. Alternatively, or in addition to, each entity of the plurality of transactions may verify the EI transactions chain by verifying a stored public key matches to recovered public keys when validating signatures over associated blocks.

The method described above in conjunction with the exchange item origination entity, the seller computing device, the buyer computing device, and the retailer computing device can alternatively be performed by other modules of the exchange item marketplace network or by other devices. In addition, at least one memory section (e.g., a non-transitory computer readable storage medium) that stores operational instructions can, when executed by one or more processing modules of one or more computing devices of the exchange item marketplace network, cause the one or more computing devices to perform any or all of the method steps described above.

Figure 23A:
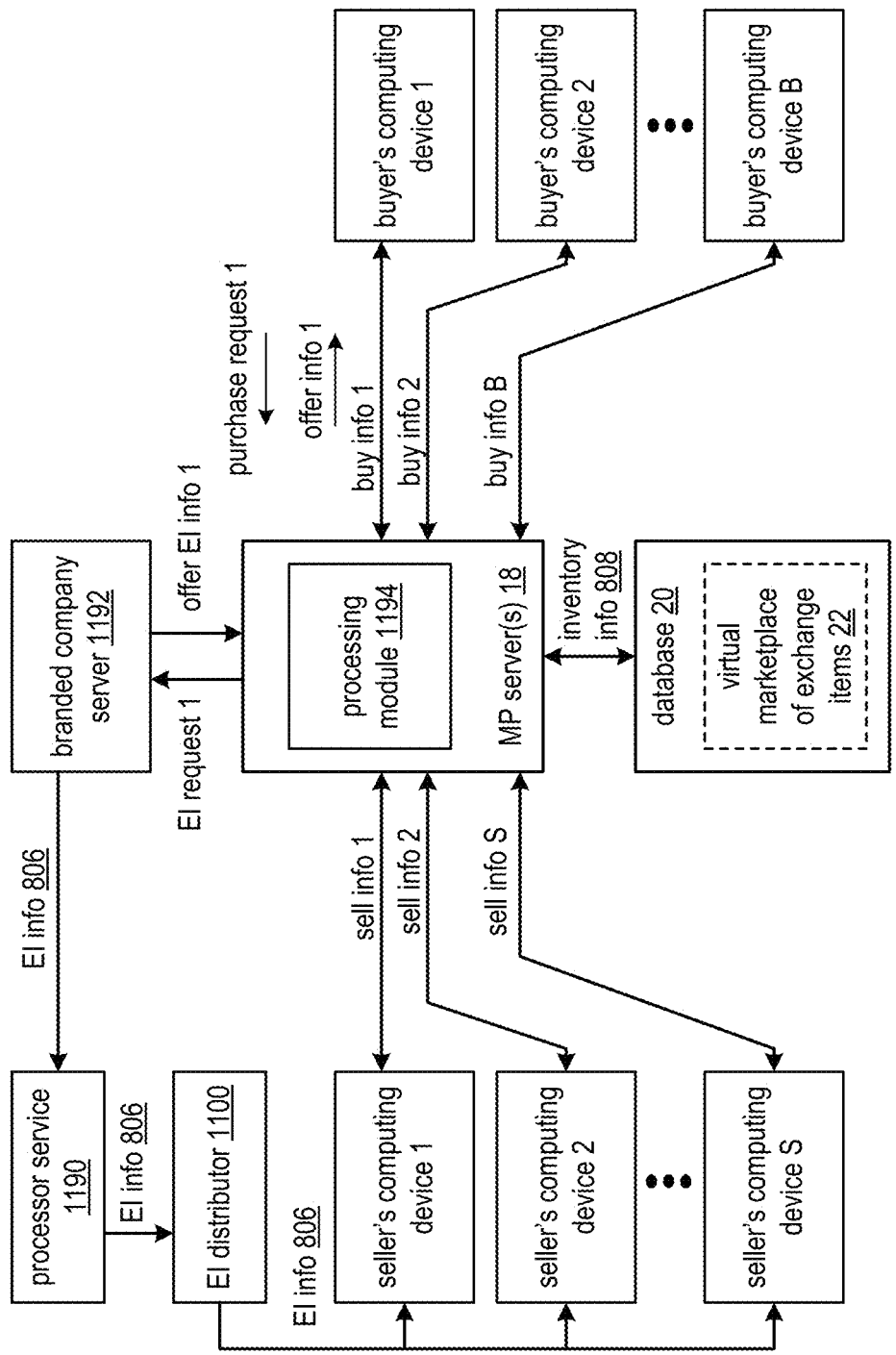
FIG. 23A is a schematic block diagram of another embodiment of an exchange item marketplace network in accordance with the present invention.

FIG. 23A is a schematic block diagram of another embodiment of an exchange item marketplace network that includes the MP server(s) 18, the exchange item (EI) distributor 1100, the database 20, a processor service 1190, a branded company server 1192, a plurality of seller's computing devices 1-S, and a plurality of buyer's computing devices 1-B. The MP server(s) 18 includes a processing module 1194. The branded company server 1192 may be implemented utilizing a computing server associated with a market brand. The processor service 1190 may be implemented utilizing one or more of a computing server, the MP server(s) 18, and the branded company server 1192. The EI distributor 1100 may be implemented utilizing one or more of a computing server, the MP server(s) 18, and the branded company server 1192. Each seller's computing device may be implemented utilizing the seller's computing device 12 of FIG. 6A. Each buyer's computing device may be implemented utilizing the buyer's computing device 16 of FIG. 6A. The exchange item marketplace network functions to inject exchange items into the exchange item marketplace.

In an example of operation of the injecting of the exchange items, the processing module 1194 interprets a plurality of sell information 1-S communicated between the plurality of seller's computing devices 1-S and the MP servers 18 and interprets a plurality of buy information 1-B communicated between the plurality of buyer's computing devices 1-B and the MP servers 18, where the plurality of seller's computing devices sells a plurality of exchange items to the plurality of buyer's computing devices, and where the selling includes utilizing the MP servers 18 and temporary storage of representations of the plurality of exchange items as inventory information 808 within the virtual marketplace of exchange items 22 that are stored in the database 20. Each sell information includes one or more of seller information, EI information, pricing guidance, pricing confirmation, and sales information. Each buy information includes one or more of buyer information, an inventory query, inventory information, an EI purchase request, and buyer wallet information. The interpreting includes monitoring of selling and buying activity and calculating market trend information to summarize the selling and buying activity (e.g., who buys what how often, etc.).

Having interpreted the information, the processing module 1194 determines a targeted marketing program based on the market trend information. Attributes of the targeted marketing programs includes one or more of a brand, an offering time frame, a discount level, and a value level. The determining may be based on one or more of selling trends, buying trends, an opportunity season, an opportunity timeframe, a brand request, and interpreting a schedule. For example, the processing module 1194 determines the targeted marketing program to include a 10% discount level for the next 24 hours of brand X when the exchange items associated with the brand X have fallen by 5% within the last 48 hours.

Having determined the targeted marketing program, the processing module 1194 selects a subset of buyers based on the targeted marketing program. For example, the processing module 1194 identifies one or more buyers likely to purchase an EI associated with the targeted marketing program based on previous purchasing history and one or more attributes of the targeted marketing program. Having selected the subset of buyers, the processing module 1194 issues offer information to the subset of buyers. The offer information includes one or more of the updated inventory information (e.g., special EI sale), type, brand, offer details, expiration time, purchase restrictions, etc. For example, the processing module 1194 generates offer information 1 based on the targeted marketing program and sends the offer information 1 to the buyer's computing device 1 when the buyer's computing device 1 is included in the selected subset of buyers.

When receiving a purchase offer from one of the subset of buyers, the processing module 1194 issues an EI request to a corresponding branded company server. The issuing includes generating the EI request in accordance with the targeted marketing program and the purchase offer. For example, the processing module 1194 receives a purchase request 1 from the buyer's computing device 1 in response to the offer information 1, generates an EI request 1 based on the purchase request 1 and the targeted marketing program (e.g., at a discount level that aligns with the targeted marketing program), identifies the branded company server 1192 as associated with the type of EI, and sends the EI request 1 to the branded company server 1192. The EI request 1 includes one or more of the EI type, a value level, and a discount level.

When receiving offer EI information from the branded company server, the processing module 1194 facilitates further processing of purchasing of the corresponding EI. The offer EI information includes one or more of the brand, balance, a personal identification number (PIN), a serial number, an expiration date, a seller identifier, a buyer identifier, a pricing approach, purchase restrictions, discount level, etc. The facilitating of the further processing includes one or more of sending at least a portion of the offer EI information to the corresponding buyer's computing device, receiving purchase confirmation from the buyer's computing device, and facilitating payment by the buyer's computing device for the EI. For example, the processing module 1194 issues a portion of the offer information 1 to the buyer's computing device 1.

Figure 23B:
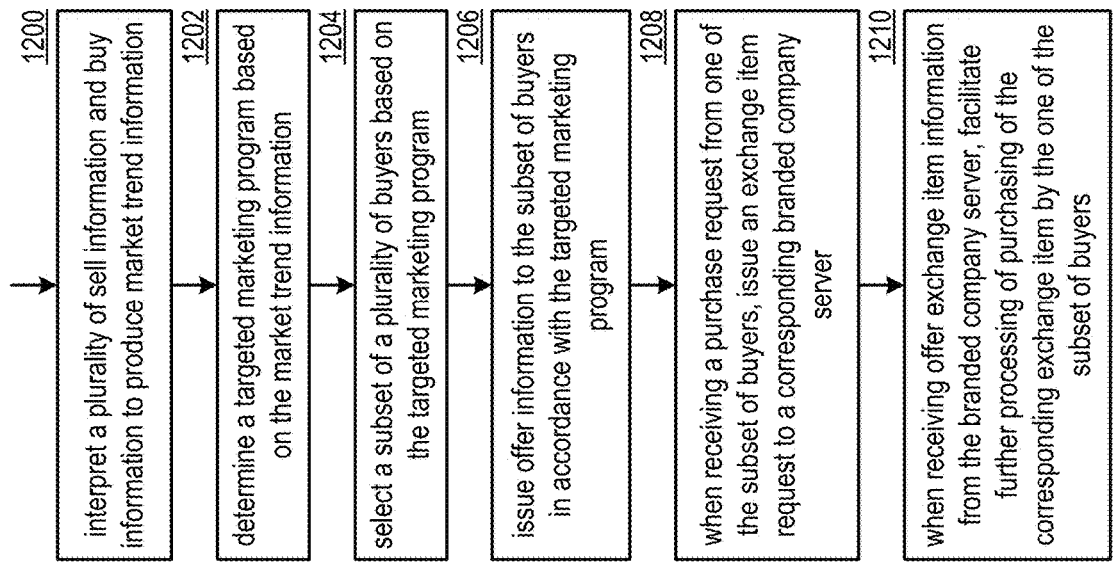
FIG. 23B is a logic diagram of an embodiment of a method for injecting exchange items into an exchange item marketplace in accordance with the present invention.

FIG. 23B is a logic diagram of an embodiment of a method for injecting exchange items into an exchange item marketplace that is performed by one or more servers and/or one or more computing devices. The method includes step 1200 where a processing module of the one or more servers and/or the one or more computing devices interprets a plurality of sell information and buy information to produce market trend information. The producing includes monitoring selling and buying activity and calculating trend information based on the selling and buying activity to produce the market trend information.

The method continues at step 1202 where the processing module determines a targeted marketing program based on the market trend information. The processing module determines the targeted marketing program based on one or more of selling trends, buying trends, a season, a brand request, and interpreting a schedule. The method continues at step 1204 where the processing module selects a subset of a plurality of buyers based on the targeted marketing program. For example, the processing module identifies one or more buyers more likely than not to purchase an exchange item (EI) associated with the targeted marketing program based on previous purchasing and the targeted marketing program.

The method continues at step 1206 where the processing module issues offer information to the subset of buyers in accordance with the targeted marketing program. For example, the processing module generates the offer information based on the targeted marketing program and sends the offer information to the selected subset of buyers. When receiving a purchase request from one of the subset of buyers, the method continues at step 1208 where the processing module issues an exchange item request to a corresponding branded company server. For example, the processing module generates the exchange item request in accordance with the targeted marketing program and the purchase offer, identifies a branded company server associated with a type of the exchange item as the corresponding branded company server, and sends the exchange item request to the identified branded company server.

When receiving offer exchange item information from the branded company server, the method continues at step 1210 where the processing module facilitates further processing of purchasing of the corresponding exchange item by the one of a subset of buyers. For example, the processing module sends the offer exchange item information to the one of the subset of buyers and receives purchase confirmation from the one of the subset of buyers.

Figure 24A:
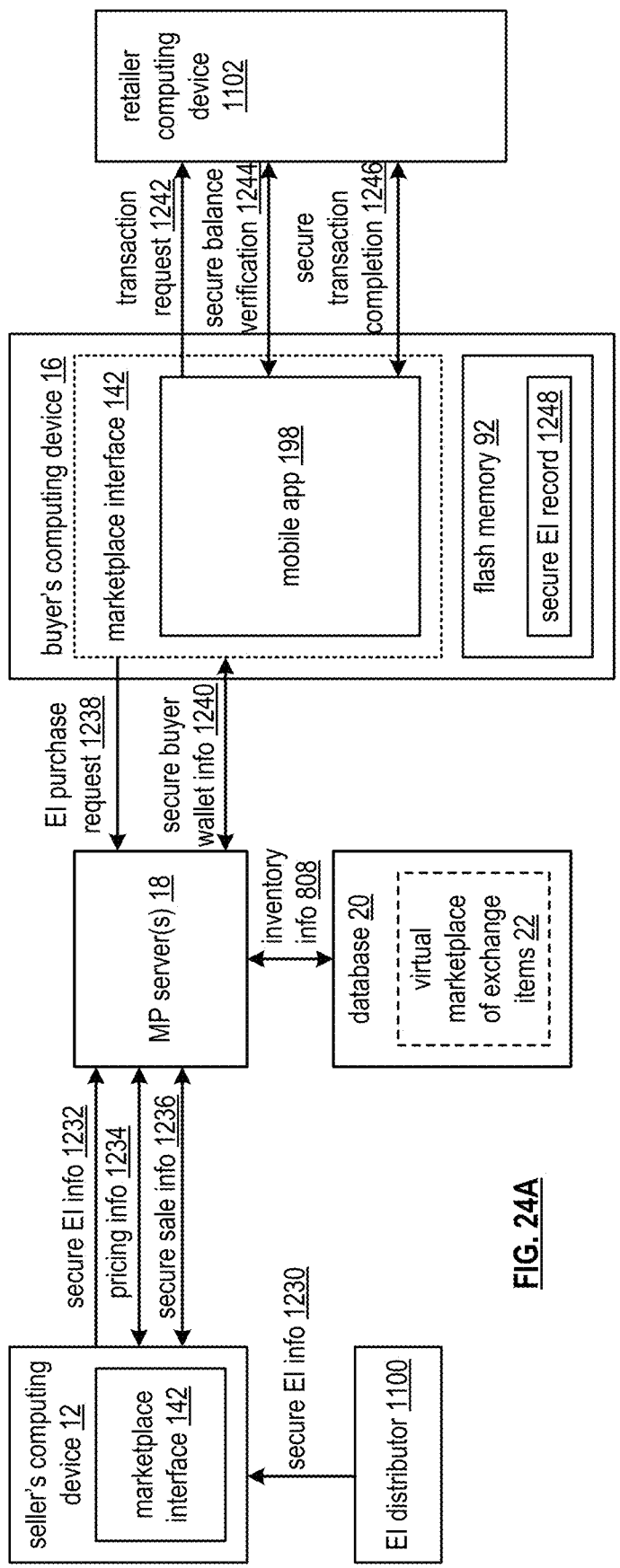
FIG. 24A is a schematic block diagram of another embodiment of an exchange item marketplace network in accordance with the present invention.

FIG. 24A is a schematic block diagram of another embodiment of an exchange item marketplace network that includes the EI distributor 1100, the seller's computing device 12, the MP server(s) 18, the database 20, the buyer's computing device 16, and the retailer computing device 1102. The seller's computing device 12 includes the marketplace interface 142. The buyer's computing device 16 includes the marketplace interface 142 and the flash memory 92 of FIG. 3. The marketplace interface 142 includes the mobile app 198. The exchange item marketplace network functions to generate a transactions block chain while facilitating a plurality of exchange item transactions. The transactions block chain includes a block associated with each transaction of the plurality of exchange item transactions. Each block includes a header portion and a transaction portion. A structure of the transactions block chain is discussed in greater detail with reference to FIGS. 24B-C.

In an example of operation of the generating of the transactions block chain, the EI distributor 1100 generates a block 0 of the transactions block chain to establish exchange item (EI) information when determining to offer an exchange item for sale. The determining may be based on one or more of receiving a purchase request from the seller's computing device 12, receiving a bulk EI creation request, receiving the EI information from one or more of a branded company server and a processor service, and interpreting a schedule. For example, the EI distributor 1100 determines to establish the EI information when receiving, via the processor service, EI information for a plurality of exchange items from the branded company server. As another example, the EI distributor 1100 determines to establish the EI information when receiving, via a retail point-of-sale device, a purchase request for the EI from the seller's computing device 12.

Having determined to offer the EI for sale, the EI distributor 1100 obtains the EI information. The obtaining includes receiving the EI information from the processor service and generating the EI information. The generating the EI information includes obtaining one or more of available balance, serial number, personal identification number (PIN), brand, EI type, expiration date, pricing approach, and purchase restrictions. Having obtained the EI information, the EI distributor 1100 generates the block 0 utilizing the EI information.

The generating of the block 0 includes populating the block zero with a representation of the EI information and establishing trust for the block 0 utilizing a trust approach. The trust approach includes at least one of a digital signature approach utilizing a private key of a private/public key pair of the EI distributor 1100 and encrypting the EI information utilizing the private key of the private/public key pair of the EI distributor 1100 to produce the representation of the EI information. For example, the EI distributor 1100 encrypts the EI information and the public key of the EI distributor 1100 utilizing the private key of the EI distributor 1100 to produce the transaction portion of the block 0 when utilizing the encryption trust approach. As another example, the EI distributor 1100 utilizes the private key of the EI distributor 1100 to generate a digital signature over the EI information and the public key of the EI distributor 1100 to produce the transaction portion of the block 0.

When receiving the EI purchase request from the seller's computing device 12, the EI distributor 1100 generates a block 1 of the EI transactions chain to indicate that the seller's computing device 12 is purchasing the EI from the EI distributor 1100, where the block 1 is chained to the block 0 in accordance with a trusted chaining approach, and where the block 1 is generated utilizing the trust approach (e.g., as utilized when generating the block 0). The trusted chaining approach is discussed in greater detail with reference to FIG. 24C.

The generating of the block 1 includes generating seller to distributor payment information 1 (e.g., purchase price of this transaction, a timestamp of this transaction, purchaser identifier, and the transaction portion of the previous block), and establishing trust for the block 1 utilizing the trust approach. For example, the EI distributor 1100 obtains a public key of a private/public key pair of the seller's computing device 12, encrypts the seller to distributor payment information 1 and the public key of the seller's computing device 12 utilizing the private key of the EI distributor 1100 to produce the transaction portion of the block 1 when utilizing the encryption trust approach. As another example, the EI distributor 1100 utilizes the private key of the EI distributor 1100 to generate a digital signature over the seller to distributor payment information 1 and the public key of the seller's computing device 12 to produce the transaction portion of the block 1.

Having generated the block 1 chained to the block 0, the EI distributor 1100 issues secure EI information 1230 to the seller's computing device 12. The issuing includes generating the secure EI information 1230 to include the EI transactions chain (e.g., blocks 0-1) and sending the secure EI information 1230 to the seller's computing device 12.

When determining to offer the EI for sale via the virtual marketplace of exchange items 22, the seller's computing device 12 issues secure EI information 1232 to the MP servers 18, where the secure EI information 1232 includes one or more of the secure EI information 1230 and a request to sell the EI via the virtual marketplace of exchange items 22. Having received the secure EI information 1232, MP servers 18 exchanges pricing information 1234 with the seller's computing device 12, where the pricing information 1234 includes one or more of a desired price, a desired price range, a recommended price range, a recommended price, and a confirmed price. Having exchanged the confirmed price, the seller's computing device 12 and the MP servers 18 exchange secure sale information 1236. For example, the MP servers 18 updates inventory information 808 to provide a representation of the EI for storage in the database 20 based on the transaction portion of the block 1, the MP servers 18 provides a public key of a private/public key pair of the MP servers 18 to the seller's computing device 12, and the seller's computing device 12 generates a block 2 of the EI transactions chain to indicate that the MP servers 18 is representing the EI for purchase by a buyer's computing device 16, where the block 2 is chained to the block 1 in accordance with the trusted chaining approach, and where the block 2 is generated utilizing the trust approach (e.g., as utilized when generating the block 1).

The generating of the block 2 includes generating a marketplace to seller representation and/or payment information 2 (e.g., desired price, a timestamp of this transaction, purchaser identifier, and the transaction portion of the previous block), and establishing trust for the block 2 utilizing the trust approach. For example, the seller's computing device 12 obtains the public key of a private/public key pair of the MP servers 18, encrypts the seller representation and/or payment information 2 and the public key of the MP servers 18 utilizing the private key of the seller's computing device 12 to produce the transaction portion of the block 2 when utilizing the encryption trust approach. As another example, the seller's computing device 12 utilizes the private key of the seller's computer device 12 to generate a digital signature over the seller representation and/or payment information 2 and the public key of the MP servers 18 to produce the transaction portion of the block 2.

Having generated the block 2 chained to the block 1, the seller's computing device 12 issues secure sale information 1236 to the MP servers 18. The issuing includes generating the secure sale information 1236 to include the EI transactions chain (e.g., blocks 0-2) and sending the secure sale information 1236 to the MP servers 18.

When determining to purchase the EI for sale via the virtual marketplace of exchange items 22, the buyer's computing device 12 issues an EI purchase request 1238 to the MP servers 18, where the EI purchase request 1238 includes a request to purchase the EI (e.g., buyer's computing device 16 identifier, public key of a private/public key pair of the buyer's computing device 16, a purchase price, etc.). Having received the EI purchase request 1238, the MP servers 18 exchanges secure buyer wallet information 1240 with the buyer's computing device 16. For example, the buyer's computing device 12 sends payment instructions to the MP servers 18 (e.g., purchase price, payment account information), the MP servers 18 generates a block 3 of the EI transactions chain to indicate that the buyer's computing device 16 is purchasing the EI for the purchase price amount, where the block 3 is chained to the block 2 in accordance with the trusted chaining approach, and where the block 3 is generated utilizing the trust approach (e.g., as utilized when generating the block 2).

The generating of the block 3 includes generating buyer to marketplace payment information 3 (e.g., a confirmed purchase price, payment instructions, a timestamp of this transaction, purchaser identifier, and the transaction portion of the previous block), and establishing trust for the block 3 utilizing the trust approach. For example, the MP servers 18 obtains the public key of the private/public key pair of the buyer's computing device 16, encrypts the buyer to marketplace payment information 3 and the public key of the buyer's computing device 16 utilizing the private key of the MP servers 18 to produce the transaction portion of the block 3 when utilizing the encryption trust approach. As another example, the MP servers 18 utilizes the private key of the MP servers 18 to generate a digital signature over the buyer to marketplace payment information 3 and the public key of the buyer's computing device 16 to produce the transaction portion of the block 3.

Having generated the block 3 chained to the block 2, the MP servers 18 issues secure buyer wallet information 1240 to the buyers computing device 16. The issuing includes generating the secure buyer wallet information 1240 to include the EI transactions chain (e.g., blocks 0-3) and sending the secure buyer wallet information 1240 to buyer's computing device 16, where the mobile app 198 facilitates storage of the transactions chain as a secure EI record 1248 in the flash memory 92.

When the buyer's computing device 16 determines to utilize the EI for payment of a transaction with the retailer computing device 1102, the buyer's computing device sends a transaction request 1242 to the retailer computing device 1102, where the transaction request 1242 includes one or more of a retail transaction identifier of the transaction with the retailer computing device 1102, and payment instructions that identifies the EI.

Having received the transaction request 1242 the retailer computing device 1102 and the buyer's computing device 16 exchange secure balance verification 1244. The exchanging of the secure balance verification information 1244 includes the buyer's computing device 16 sending one or more of the secure EI record 1248 (e.g., blocks 0-3) to the retailer computing device 1102 and the public key of the private/public key pair of the MP servers 18.

Having received the secure EI record 1248, the retailer computing device 1102 verifies that a sufficient balance level is associated with the secure EI record 1248 to facilitate completion of the transaction request 1242. For example, the retailer computing device 1102 decrypts the secure transaction portion of the secure EI record 1248 utilizing the public key of the MP servers 18 to reveal the balance level and a public key of the buyer's computing device 16 for verification with a public key received directly from the buyer's computing device 16. The retailer computing device 1102 indicates favorable verification when the revealed balance level is sufficient and the received public key from the buyer's computing device 16 compares favorably to the revealed public key from the secure EI record 1248. As another example, the retailer computing device 1102 verifies a signature over the secure transaction portion of the secure EI record 1248 utilizing the public key of the MP servers 18 to verify the balance level and to verify the public key of the buyer's computing device 16. The retailer computing device 1102 indicates favorable verification when the verified balance level is sufficient and the public key from the buyer's computing device 16 is verified from the secure EI record 1248.

When the verifications are favorable, the retailer computing device 1102 and the buyer's computing device 16 exchanges secure transaction completion 1246. For example, the buyer's computing device 16 sends payment instructions to the retailer computing device 1102 (e.g., purchase price, EI information), the buyer's computing device 16 generates a block 4 of the EI transactions chain to indicate that the buyer's computing device 16 is utilizing the EI for the purchase price amount, where the block 4 is chained to the block 3 in accordance with the trusted chaining approach, and where the block 4 is generated utilizing the trust approach (e.g., as utilized when generating the block 3).

The generating of the block 4 includes generating buyer to retailer payment information 4 (e.g., a confirmed purchase price, payment instructions utilizing the EI, a timestamp of this transaction, purchaser identifier, and the transaction portion of the previous block), and establishing trust for the block 4 utilizing the trust approach. For example, the buyer's computing device 16 obtains the public key of the private/public key pair of the retailer computing device 1102, encrypts the buyer to retailer payment information 4 and the public key of the retailer computing device 1102 utilizing the private key of the buyer's computing device 16 to produce the transaction portion of the block 4 when utilizing the encryption trust approach. As another example, the buyer's computing device 16 utilizes the private key of the buyer's computing device 16 to generate a digital signature over the buyer to retailer payment information 4 and the public key of the retailer computing device 1102 to produce the transaction portion of the block 4.

Having generated the block 4 chained to the block 3, the buyer's computing device 16 issues the secure transaction completion 1246 to the retailer computing device 1102. The issuing includes generating the secure transaction completion 1246 to include the EI transactions chain (e.g., blocks 0-4) and sending the secure transaction completion 1246 to retailer computing device 1102, where the mobile app 198 may facilitate storage of an updated transactions chain as an updated secure EI record 1248 in the flash memory 92. Alternatively, or in addition to, each of the seller's computing device 12, the MP servers 18, and the buyer's computing device 16 may validate information within the EI transactions chain by validating the chaining of each block to a next block utilizing the trusted chaining approach and may further validate information with the EI transactions chain by validating integrity of the transaction portion of one or more of the blocks utilizing the trust approach (e.g., verifying a signature, decrypting an encrypted transaction to reveal a public key for verification).

Figure 24B:
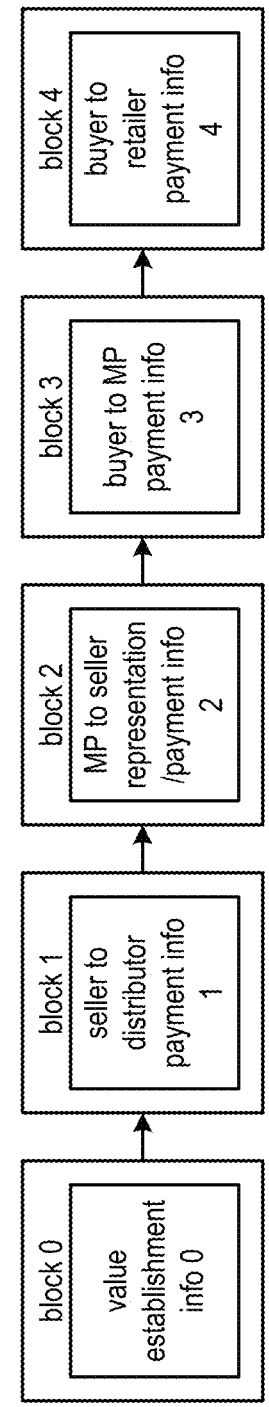
FIG. 24B is a schematic block diagram of another transactions block chain in accordance with the present invention.

FIG. 24B is a schematic block diagram of another transactions block chain where the transactions block chain includes a plurality of blocks. The transactions block chain represents an exchange item (EI) transaction chain when the plurality of blocks include exchange item transaction portions. Each block includes a header portion and a transaction portion. Each other portion links one block to other block in a sequential fashion. The linking is discussed in greater detail with reference to FIG. 24C. The transaction portion includes EI transaction information associated with an EI transaction between two or more entities of an exchange item marketplace. For example, the block 0 includes valuable establishment 0 transaction information with regards to a genesis of a particular exchange item to be available to entities of the exchange item marketplace, the block 1 includes seller to distributor payment information 1 transaction information with regards to the seller's computing device 12 purchasing the EI from the EI distributor 1100, the block 2 includes marketplace server to seller representation/payment information 2 transaction information with regards to the seller's computing device 12 offering the EI for sale utilizing the MP servers 18, the block 3 includes buyer to marketplace payment information 3 transaction information with regards to the buyer's computing device 16 purchasing the EI via the MP servers 18 from the seller's computing device 12, and the block 4 includes buyer to retailer payment information 4 transaction information with regards to the buyer's computing device 16 utilizing the EI to complete a desired purchase transaction with the retailer computing device 1102.

Figure 24C:
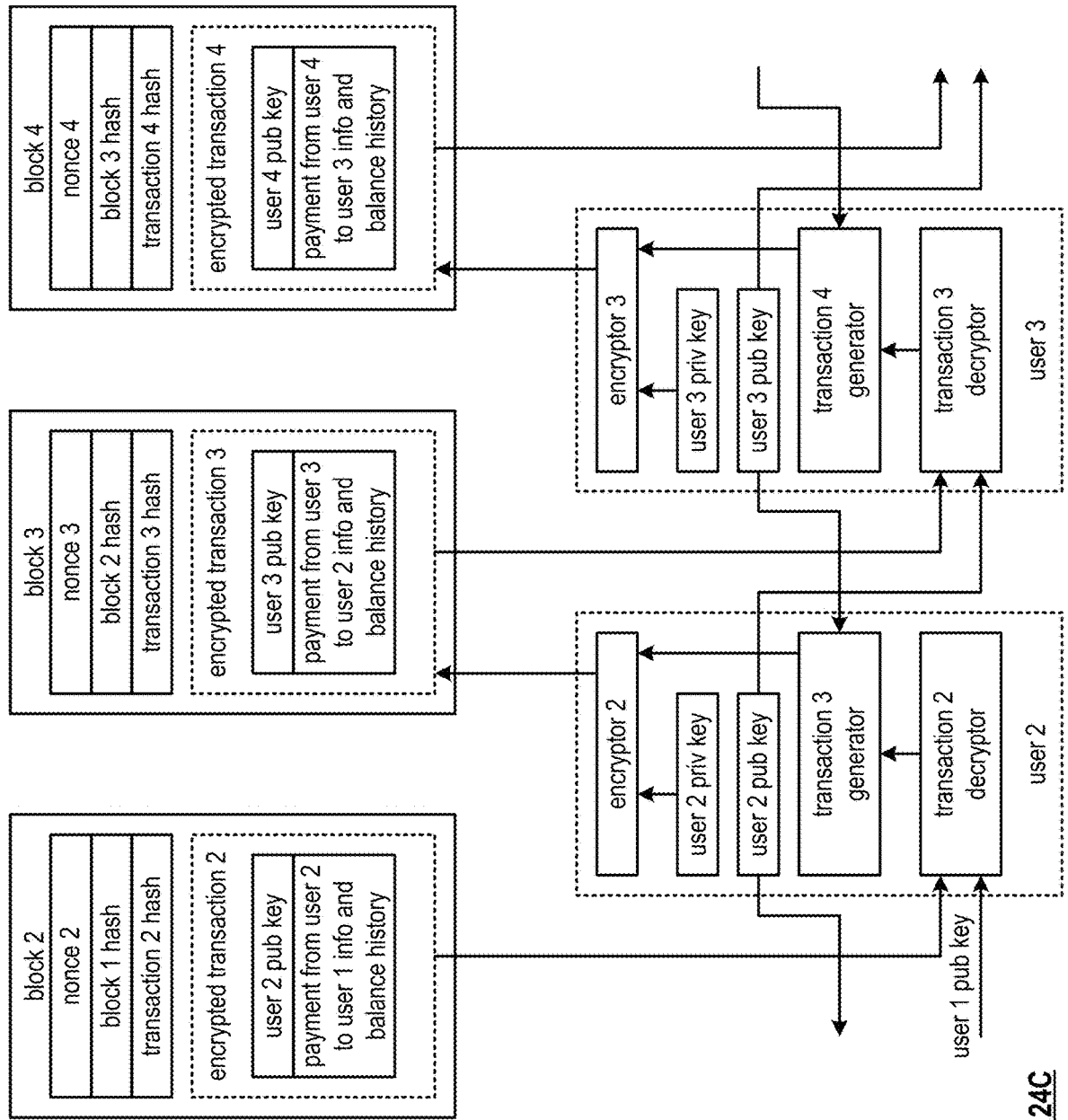
FIG. 24C is another schematic block diagram of a transactions block chain in accordance with the present invention.

FIG. 24C is another schematic block diagram of a transactions block chain that includes blocks 2-4 and users 2-3, where each block includes the header portion and the transaction portion, and where each transaction portion has been encrypted when utilizing the encryption trust approach. The users 2-3 represent entities of an exchange item marketplace participating in EI transactions of the transactions block chain (e.g., the seller's computing device, the MP servers, the buyer's computing device, the retailer computing device, etc.). Each user entity includes one or more of a decryptor, a transaction generator, storage for a public/private key pair, and an encryptor.

In an example of operation of generating the transactions block chain representing EI transactions, the transaction 2 decryptor decrypts the encrypted transaction 2 utilizing a user 1 public key to produce a transaction 2, where the transaction 2 includes a decrypted user 2 public key and payment from user 2 the user 1 information and balance history (e.g., a current balance, a previous balance and EI serial number, an EI type, etc.). Having reproduced the transaction 2 that includes the encrypted user 2 public key, the transaction 2 decryptor indicates favorable verification of the encrypted transaction 2 when the decrypted user 2 public key compares favorably to a stored user 2 public key. When the favorable verification of the transaction 2 is indicated, the transaction 3 generator generates a transaction 3 based on the transaction 2 to include a user 3 public key and payment from user 3 to user 2 information and balance history, where the balance history has been updated as a result of the transaction 3 performed after the transaction 2.

Having generated the transaction 3, the encryptor 2 encrypts the transaction 3 utilizing a user 2 private key to produce the encrypted transaction 3. Having produced the encrypted transaction 3, the user 2 generates the block 3 to include the encrypted transaction 3 and the header portion of the block 3, where the header portion includes one or more of a nonce 3, a transaction 3 hash (e.g., a hash over the encrypted transaction 3, a hash over the transaction 3), and a block 2 hash (e.g., a hash over the block 2), and where the nonce 3 is generated to produce a desired characteristic of one or more of the block 2 hash and the transaction 3 hash (e.g., meet a specified number of preceding zeros, meet a specified number of preceding ones, etc.). Alternatively, or in addition to, another entity (e.g., a transaction mining entity, the MP servers) may generate the header portion of one or more of the blocks of the transactions chain.

FIG. 24D is a logic diagram of another embodiment of a method for generating a transactions block chain that is performed by one or more processing modules of one or more servers and/or one or more computing devices. The method includes step 1280 where a processing module of an exchange item (EI) origination entity generates an origination block of an EI transactions chain, where the EI origination entity encrypts a transaction portion of the origination block, and where the transaction portion indicates EI information of an associated EI. For example, the origination entity generates value establishment information in accordance with a trust approach (e.g., self-signing over the value establishment information to produce the transaction portion, encrypting the value establishment information, that includes a public key of a private/public key pair of the EI origination entity, utilizing the private key to produce the transaction portion).

When receiving an EI purchase request from a seller computing device, the method continues at step 1282 where a processing module of an EI distribution entity generates a first block of the EI transactions chain, where the EI distribution entity encrypts the transaction portion of the first block, where the transaction portion indicates that the seller computing device is purchasing the EI from the distribution entity, and where the first block is chained to the origination block in accordance with a chained security approach (e.g., hash of transaction portion, hash of a previous block). The EI distribution entity may be implemented utilizing the EI origination entity. For example, the EI distribution entity encrypts the transaction portion utilizing a private key of a private/public key pair of the seller computing device to produce the transaction portion of the first block.

When transacting a representation of the EI with a marketplace server, the method continues at step 1284 where the seller computing device generates a second block of the EI transactions chain, where the seller computing device encrypts a transaction portion of the second block, where the transaction portion indicates that the MP server is representing the EI for the seller computing device, and where the second block is chained to the first block in accordance with the chained security approach. For example, the MP server receives secured EI information from the seller computing device (e.g., an offer for sale), provides pricing information to the seller computing device, receives a confirmed price from the seller computing device, issues secure sale information to the seller computing device, and updates inventory information within a virtual exchange item marketplace, where the secure sale information includes the second block of the EI transactions chain and a public key of the MP server.

When receiving a purchase request for the EI from a buyer computing device, the method continues at step 1286 where the MP server generates a third block of the EI transactions chain, where the MP server encrypts a transaction portion of the third block, where the transaction portion indicates that the buyer computing device is purchasing the EI from the seller computing device via the marketplace, and where the third block is chained to the second block in accordance with the chained security approach. For example, the buyer computing device issues an EI purchase request to the MP server based on received inventory information from the MP server, the MP server generates secure buyer wallet information, the buyer computing device stores a security EI record, where the secure buyer wallet information includes the third block of the EI transactions chain and the secure EI record includes the EI transactions chain. For instance, the MP server encrypts a public key of the buyer computing device and the transaction portion utilizing a private key of a private/public key pair of the MP server to produce the transaction portion of the third block.

When utilizing the EI for payment in a purchasing transaction with a retailer computing device, the method continues at step 1288 where the buyer computing device generates a fourth block of the EI transactions chain, where the buyer computing device encrypts a transaction portion of the fourth block, where the transaction portion indicates that the buyer computing device is utilizing the EI for payment in the purchasing transaction, and where the fourth block is chained to the third block in accordance with the chained security approach. For example, the buyer computing device issues a transaction request of the retailer computing device, the retailer computing device exchanges secure balance information with the buyer computing device (e.g., verifies the trust of the EI transactions chain, where the EI transactions chain indicates an available balance of the EI verifying that an available balance is sufficient), the retailer computing device issues secure transaction completion information to the buyer computing device, where the secure transaction completion information includes the fourth block of the EI transactions chain. The buyer computing device encrypts the public key of the retailer computing device and the transaction portion to produce an encrypted transaction portion of the fourth block. Alternatively, or in addition to, each entity of the plurality of transactions may verify the EI transactions chain by verifying stored public key matches to decrypted public keys when decrypting associated blocks.

Figure 25A:
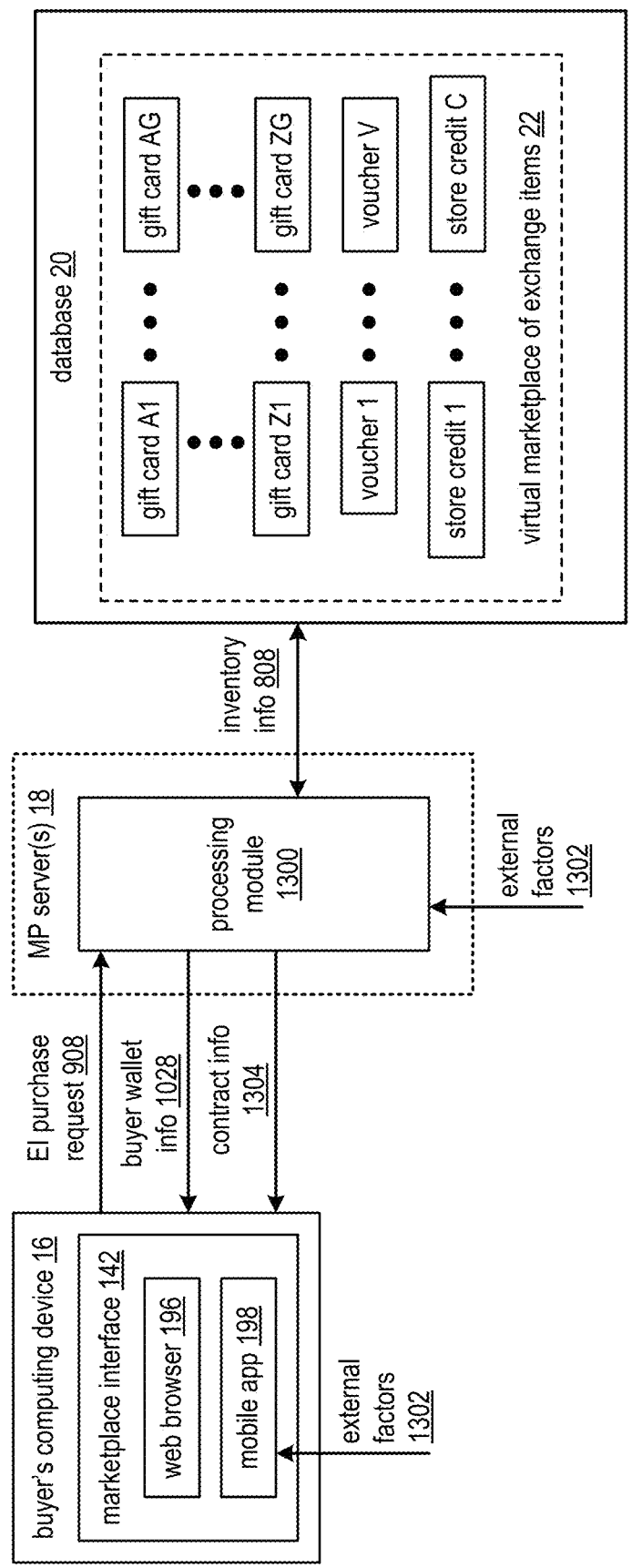
FIG. 25A is a schematic block diagram of another embodiment of an exchange item marketplace network in accordance with the present invention.

FIG. 25A is a schematic block diagram of another embodiment of an exchange item marketplace network that includes the buyer's computing device 16, the MP servers 18, and the database 20. The buyer's computing device 16 includes the marketplace interface 142. The MP servers 18 includes a processing module 1300. The marketplace interface 142 includes the web browser 196 and the mobile application 198. The database 20 includes the virtual marketplace of exchange items 22. The exchange item marketplace network functions to generate variable exchange item information.

In an example of operation of the generating of the variable exchange item information, when completing an exchange item purchase transaction via the virtual marketplace to the buyer's computing device (e.g., receive an EI purchase request 908, for trade exchange items to the buyers computing device 16, receive a purchase request, send buyer wallet information 1028), the processing module 1300 obtains external factors 1302. The obtaining includes one or more of interpreting a query response and receiving the external factors 1302. The external factors includes one or more of time, a date, weather information, location information, geopolitical information, general purchasing trends, and retail location information.

Having obtained the external factors 1302, the processing module 1300 determines contract information with regards to the buyer wallet information 1028 based on the external factors 1302 in accordance with a smart contract approach. The smart contract approach includes one or more of varying EI value based on a timestamp, varying EI value based on a location, varying EI value based on a combination of the external factors 1302, etc. The determining includes selecting the smart contract approach based on one or more of a buyer identifier, a buyer purchasing history, buyer location information, a brand, a lookup, etc. For example, the processing module identifies attributes of the wallet information to apply a value change function based on the smart contract approach and generates the contract information to indicate one or more wallet attribute change functions based on the identified attributes in the smart contract approach.

Having produced the contract information, the processing module 1300 sends the contract information 1304 to the buyer's computing device 16. When accessing the buyer wallet information 1028, the mobile app 198 obtains the external factors 1302 (e.g., current factors). The obtaining includes one or more of receiving from the processing module 1300, interpreting a query response, receiving from another server, and identifying directly. Having obtained the external factors 1302, the mobile app 198 generates updated wallet information from the buyer wallet information 1028 based on the buyer's computing device 16 having obtained external factors 1302 and the contract information. For example, the mobile app 198 modifies one or more attributes of the wallet information based on the contract information to produce the updated wallet information for potential utilization. For instance, the mobile app 198 ads 10% to a balance of an exchange item of the buyer wallet information 1028 associated with a movie theater when the outside temperature is above 90° F. to encourage utilization of the exchange item with the movie theater.

Figure 25B:
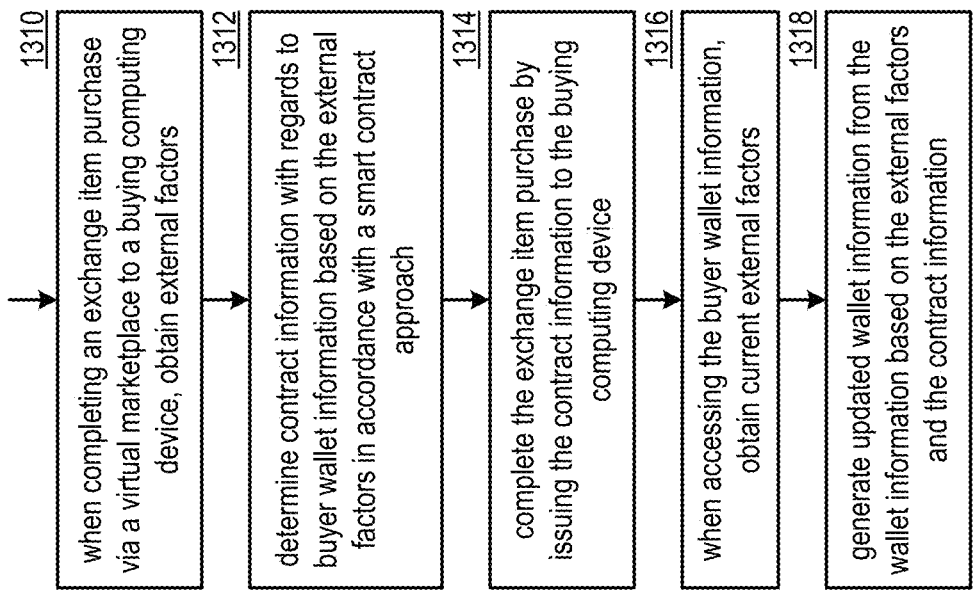
FIG. 25B is a logic diagram of an embodiment of a method for generating a variable exchange item function in accordance with the present invention.

FIG. 25B is a logic diagram of an embodiment of a method for generating a variable exchange item function that is performed by one or more servers and/or one or more computing devices. The method includes step 1310 where a processing module of the one or more servers and/or the one or more computing devices, when completing an exchange item purchase via a virtual marketplace to a buying computing device, obtains external factors. The obtaining includes at least one of interpreting a query response to produce the external factors, detecting the external factors, and receiving external factors.

The method continues at step 1312 where the processing module determines contract information with regards to a buyer wallet information based on the external factors in accordance with a smart contract approach. The determining includes selecting the smart contract approach based on one or more of a buyer identifier, a buyer purchasing history, buyer location information, a brand, a lookup, etc.; identifying attributes of the wallet information to apply a value change function based on the smart contract approach; and generating the contract information to indicate one or more wallet attribute change functions based on the identified attributes and the smart contract approach.

The method continues at step 1314 where the processing module completes the exchange item purchase by issuing the contract information to the buying computing device. When accessing the buyer wallet information, the method continues at step 1316 where the processing module obtains current external factors. The obtaining includes one or more of receiving the current external factors, interpreting a query response, and receiving from another server. The method continues at step 1318 where the processing module generates updated wallet information from the wallet information based on the external factors and the contract information. For example, the processing module modifies one or more attributes of the wallet information based on the contract information to produce the updated wallet information for potential utilization (e.g., for a retail purchase).

Figure 26A:
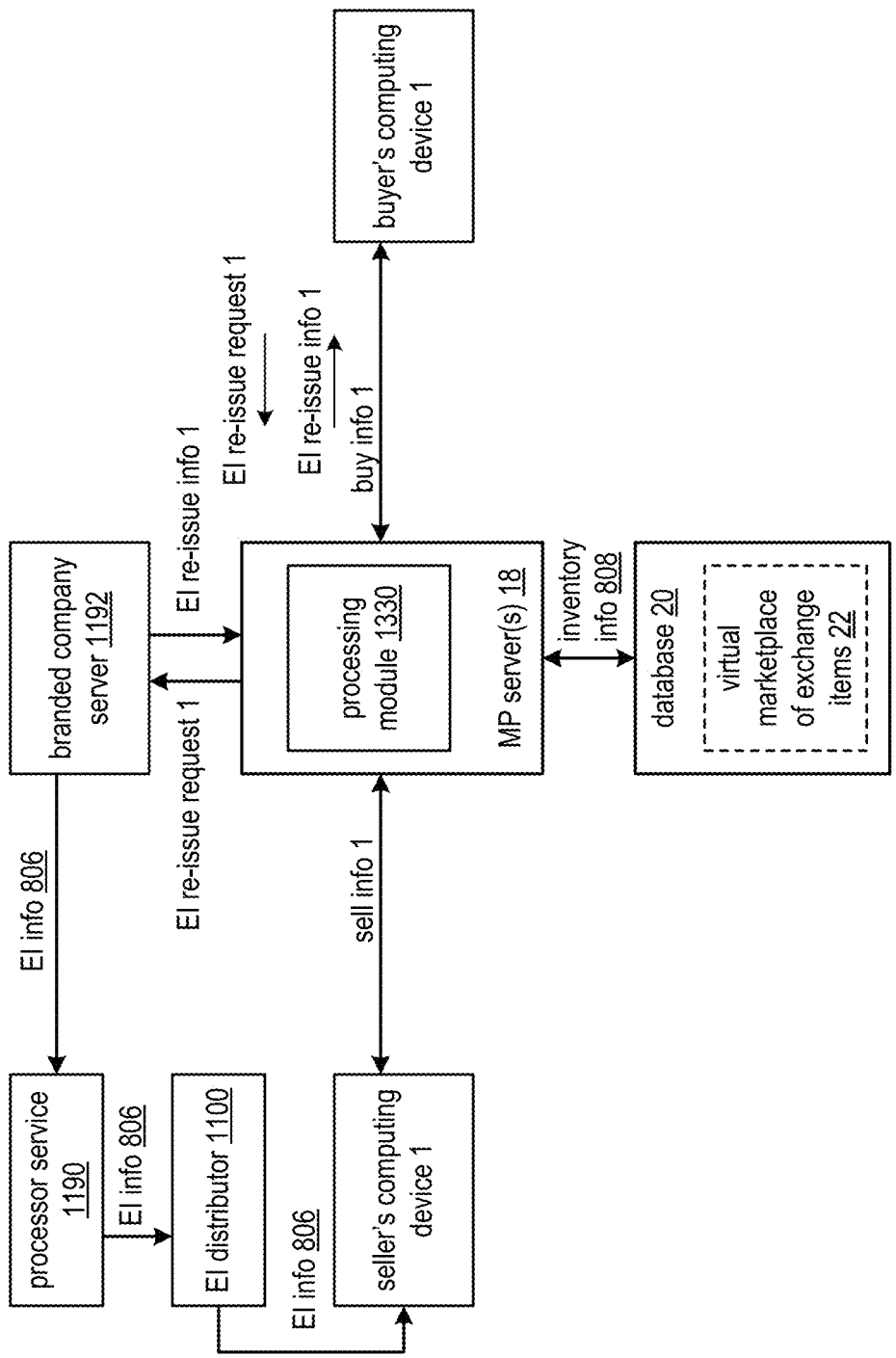
FIG. 26A is a schematic block diagram of another embodiment of an exchange item marketplace network in accordance with the present invention.

FIG. 26A is a schematic block diagram of another embodiment of an exchange item marketplace network that includes the branded company server 1192, the processor service 1190, the exchange item (EI) distributor 1100, the MP servers 18, the database 20, a seller's computing device 1 of a plurality of seller's computing devices 12, and a buyer's computing device 1 of a plurality of buyer's computing devices 16. The MP servers 18 includes a processing module 1330. The database 20 includes the virtual marketplace of exchange items 22. The exchange item marketplace network functions to inject exchange items into an exchange item marketplace.

In an example of operation of the injecting of the exchange items, the processing module 1330 detects a need to re-issue an exchange item to the buyer computing device 1, where the branded company server 1192 provides the EI information 806 to the processor service 1190, the processor service 1190 provides the EI information 806 to the EI distributor 1100, the EI distributor 1100 provides the EI information 806 to the seller's computing device 1 when the seller's computing device 1 purchases the corresponding EI from the branded company server 1192 via the processor service 1190 and the EI distributor 1100, where the seller's computing device 1 exchanges sell information 1 with the MP servers 18 to represent the EI utilizing inventory information 808 as a portion of the virtual marketplace of exchange items 22 within the database 20, and where the buyer's computing device 1 exchanges by information 1 with the MP servers 18 when the buyer's computing device 1 desires to purchase the EI from the seller's computing device via the MP servers 18. The detecting the need to re-issue exchange item includes one or more of receiving and EI re-issue request 1 from the buyer's computing device, where the buyer sends the re-issue request 1 when detecting that the EI has no value (e.g., spent down, denied due to fraud) and detecting fraud (e.g., interpret a received fraud message, identify fraud directly, etc.). For example, the processing module 1330 determines to re-issue the EI when receiving an EI re-issue request 1 from the buyer's computing device 1, where the EI reissue request 1 includes one or more of an EI type, an expected value, discount level, a serial number, and a re-issue indicator.

Having detected the need to re-issue the EI, the processing module 1330 issues the EI re-issue request 1 to the branded company server 1192. The issuing includes one or more of generating the EI re-issue request 1, receiving the EI re-issue request the one from the buyer's computing device 1, identifying the branded company server 1192 based on an EI type (e.g., a brand identifier), and sending the generated EI re-issue request 1 to the identified branded company server 1192.

Having sent the EI re-issue request 1, the processing module 1330 receives EI re-issue information 1 from the branded company server 1192 in response to the EI re-issue request 1, where the EI re-issue information 1 includes one or more of the EI type (e.g., the brand), a new balance, a new personal identification number (PIN), a new serial number, a new expiration date, and new purchase restrictions. Having received the EI re-issue information 1, the processing module 1330 updates a buyer wallet by sending the EI re-issue information 1 to the buyer's computing device 1.

Figure 26B:
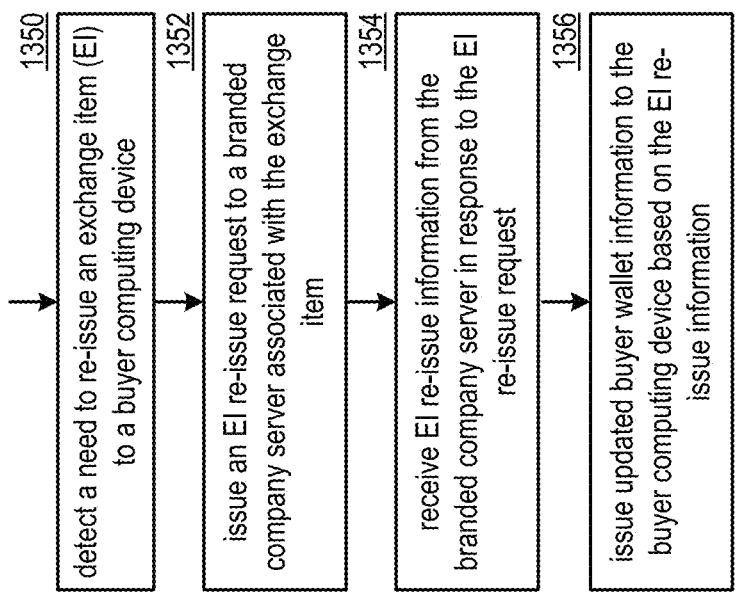
FIG. 26B is a logic diagram of an embodiment of a method for injecting exchange items into an exchange item marketplace in accordance with the present invention.

FIG. 26B is a logic diagram of an embodiment of a method for injecting exchange items into an exchange item marketplace that is performed by one or more servers and/or one or more computing devices. The method includes step 1350 where a processing module of the one or more servers and/or the one or more computing devices detects a need to re-issue an exchange item (EI) to a buyer computing device. The detecting includes one or more of receiving an EI re-issue request 1 and detecting fraud (e.g., interpreting a received fraud message, identifying fraud directly).

The method continues at step 1352 where the processing module issues an EI re-issue request to a branded company server associated with the exchange item. The issuing includes one or more of generating the EI re-issue request 1, identifying the branded company server, and sending the generated EI re-issue request 1 to the identified branded company server. Alternatively, or in addition to, the processing module includes payment information when payment is required for re-issuing.

The method continues at step 1354 where the processing module receives EI re-issue information from the branded company server in response to the EI re-issue request. The method continues at step 1356 where the processing module issues updated buyer wallet information to the buyer computing device based on the EI re-issue information. For example, the processing module generates the updated buyer wallet information to include a portion of the EI re-issue information (e.g., a new serial number for a same type and brand EI with value restored to an expected balance level when fraud was indicated).

Figure 27A:
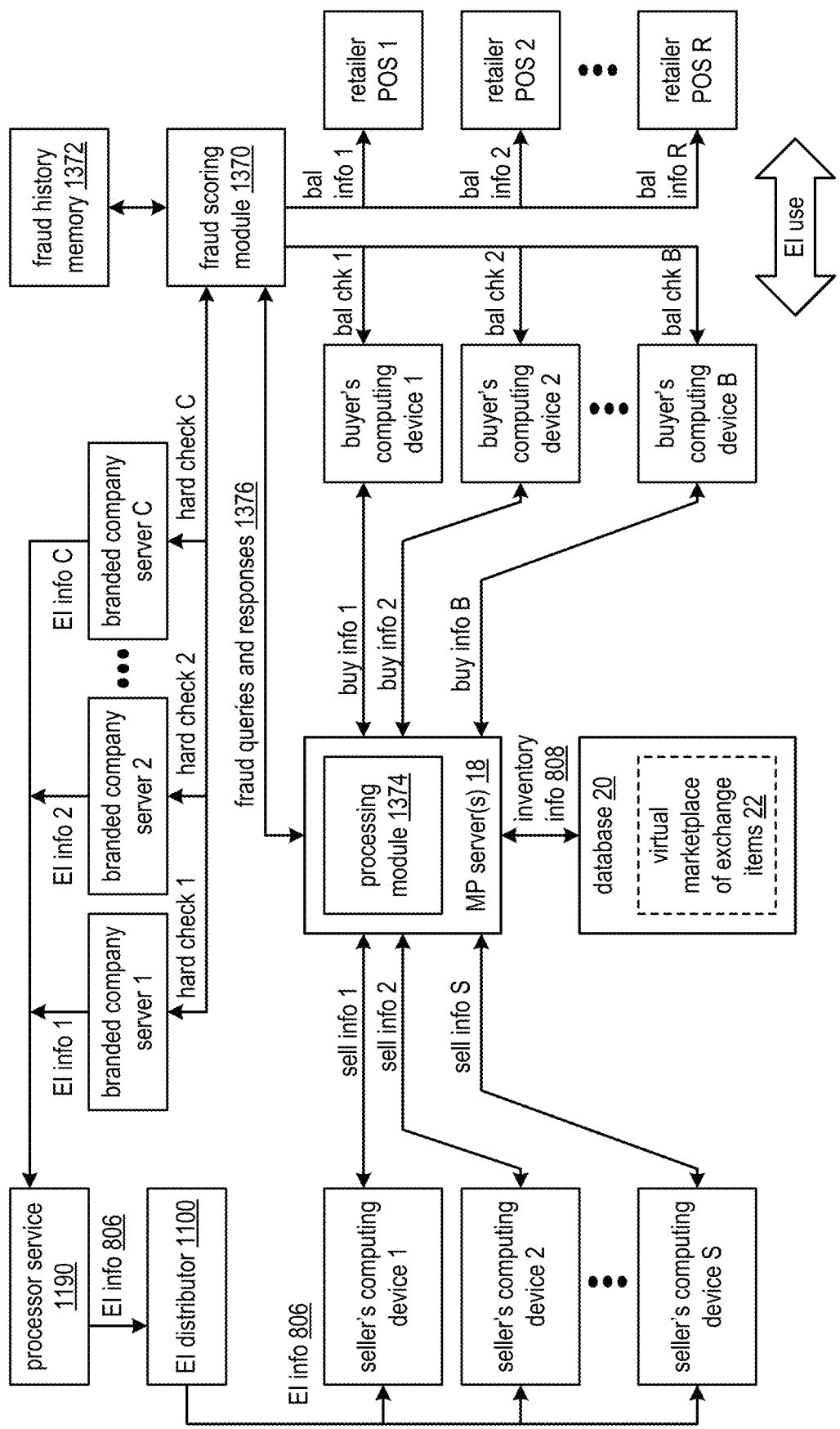
FIG. 27A is a schematic block diagram of another embodiment of an exchange item marketplace network in accordance with the present invention.

FIG. 27A is a schematic block diagram of another embodiment of an exchange item marketplace network that includes a plurality of branded company servers 1-C, the processor service 1190, the exchange item (EI) distributor 1100, a plurality of seller's computing devices 1-S, the MP servers 18, the database 20, a plurality of buyers computing devices 1-B, a plurality of retailer point-of-sales 1-R, a fraud scoring module 1370, and a fraud history memory 1372. Each of the seller's computing devices may be implemented utilizing the seller's computing device 12 of FIG. 2. Each of the buyer's computing devices may be implemented utilizing the buyer's computing device 16 of FIG. 2. Each of the branded company servers may be implemented utilizing the branded company server 1192. Each retailer point of sale may be implemented utilizing one or more of a retail point-of-sale terminal, a web-based retail application, and a retailing app. The fraud scoring module 1370 may be implemented utilizing a processing module on one or more computing devices. For the example, the fraud scoring module 1370 may be implemented utilizing the MP servers 18. The fraud history memory 1372 may be implemented utilizing the database 20 and/or any variety of memories associated with the server 18 of FIG. 4. The MP servers 18 includes a processing module 1374. The database 20 includes the virtual marketplace of exchange items 22. The exchange item marketplace network functions to detect fraud.

As an example of operation of the detecting of the fraud, the fraud scoring module 1370, when receiving a fraud score request (e.g., a fraud query 1376, a balance check, a balance information request) from a requesting entity (e.g., the processing module 1374, a buyer computing device, a retailer point of sale), where the requesting entity receives sell information from a seller computing device desiring to sell an exchange item (e.g., described with EI information 806) utilizing the virtual marketplace of exchange items 22 (e.g., represented by inventory information 808), or completes processing of buy information where a buyer computing device purchases the exchange item from the virtual marketplace of exchange items 22, or receives exchange item utilization information from the buyer computing device (e.g., by the retailer POS), determines whether to obtain balance information from a corresponding branded company server.

The determining may be based on one or more of a previous fraud score associated with the fraud query (e.g., a score of the buyer computing device, a score of the seller computing device), an estimated fraud score, a cost associated with accessing the corresponding branded company server, and the fraud score request. For example, the fraud scoring module 1370 determines to obtain the balance information from the corresponding branded company server when the cost associated with accessing the corresponding branded company server is less than a cost threshold level. As another example, the fraud scoring module 1370 determines to not obtain the balance information from the corresponding branded company server when estimated fraud score is associated with a favorable accuracy indicator.

When obtaining the balance information from the corresponding branded company server, the fraud scoring module 1370 obtains the balance information from the corresponding branded company server by communicating hard check information with the corresponding branded company server to acquire the balance information. For example, the fraud scoring module 1370 issues a hard check request 2 to the branded company server 2 when the fraud may be associated with an EI type of the branded company server 2, and receives a hard check response 2 indicating the balance information. The hard checks includes one or more of a brand, a balance check request, a balance check response, a personal identification number, a serial number, and expiration date, an owner identifier, a pricing approach, and purchase restrictions.

Having obtained the balance information, the fraud scoring module 1370 issues a fraud score (e.g., a fraud query response 1376 to the processing module 1374, a balance check to the buyer computing device, the balance information to the retailer POS) to the requesting entity based on one or more of the fraud score request, the obtained balance information from the corresponding branded company server, and the fraud history. The fraud queries and responses 1376, the balance check, and the balance information includes one or more of the brand, the balance check request, the balance check response, the personification number, serial number, the expiration date, the owner identifier, an owner address, an owner credit card account number, a pricing approach, an EI use restriction, and the fraud score.

The issuing of the fraud score includes generating the fraud score and sending the fraud score. As an example of the generating of the fraud score, the fraud scoring module 1370 generates an unfavorable fraud score when a number of fraud score requests for a common element (e.g., the requesting entity, the buyer, the seller, the retailer POS) exceeds a high request threshold level for a request time frame. As another example, the fraud scoring module 1370 generates an unfavorable fraud score when the fraud history includes an unfavorable fraud score and recent variables are not commensurate with improving the fraud score, etc. The fraud history includes trend records associated with one or more of sellers, buyers, and entity requesting a balance check, and a retailer point-of-sale. Alternatively, or in addition to, the retailer point-of-sale may also communicate use of the EI to a corresponding branded company server.

Figure 27B:
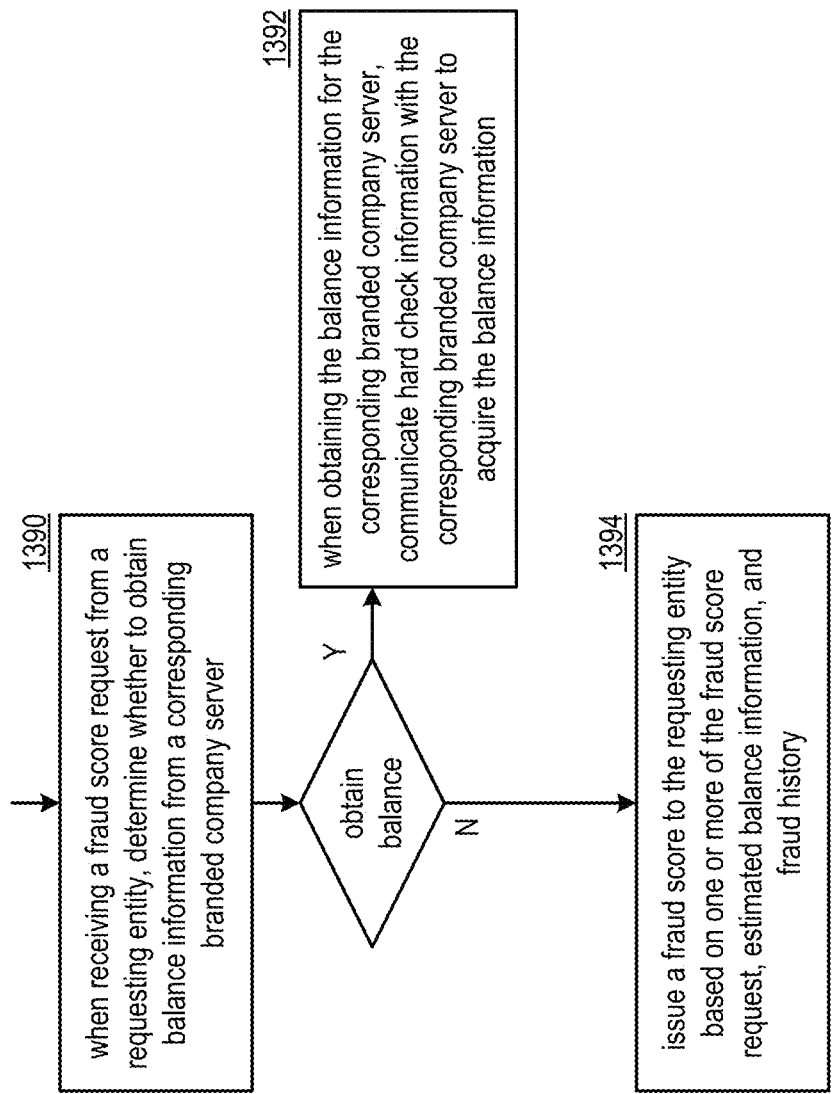
FIG. 27B is a logic diagram of an embodiment of a method for detecting fraud in an exchange item marketplace network in accordance with the present invention.

FIG. 27B is a logic diagram of an embodiment of a method for detecting fraud in an exchange item marketplace network that is performed by one or more servers and/or one or more computing devices. The method includes step 1390 where a processing module of the one or more servers and/or the one or more computing devices, when receiving a fraud score request from a requesting entity, determines whether to obtain balance information from a corresponding branded company server. The determining may be based on one or more of a previous fraud score associated with the fraud query (e.g., a score of a buyer, a score of a seller), an estimated fraud score, a cost associated with accessing the corresponding branded company server, the fraud score request, a predetermination, and fraud score accuracy feedback. The method branches to step 1394 when the processing module determines not to obtain the balance. The method continues to step 1392 when determining to obtain the balance.

When obtaining the balance information for the corresponding branded company server, the method continues at step 1392 where the processing module communicates hard check information with the corresponding branded company server to acquire the balance information. For example, the processing module identifies the corresponding branded company server based on the fraud score request (e.g., a type indicator), issues a hard check request to the identified branded company server with regards to the fraud score request, and receives a hard check response from the branded company server in response to the hard check request.

When not obtaining the balance information, the method continues at step 1394 where the processing module issues a fraud score to the requesting entity based on one or more of the fraud score request, estimated balance information, and fraud history. For example, the processing module generates an unfavorable fraud score when a number of fraud score requests for a common element (e.g., the requesting entity, a buyer, a seller, a retailer point-of-sale) exceeds a high request threshold level for a request time frame. As another example, the processing module indicates an unfavorable fraud score when the fraud history includes an unfavorable fraud score and recent variables are not commensurate with improving the fraud score.

Figure 28A:
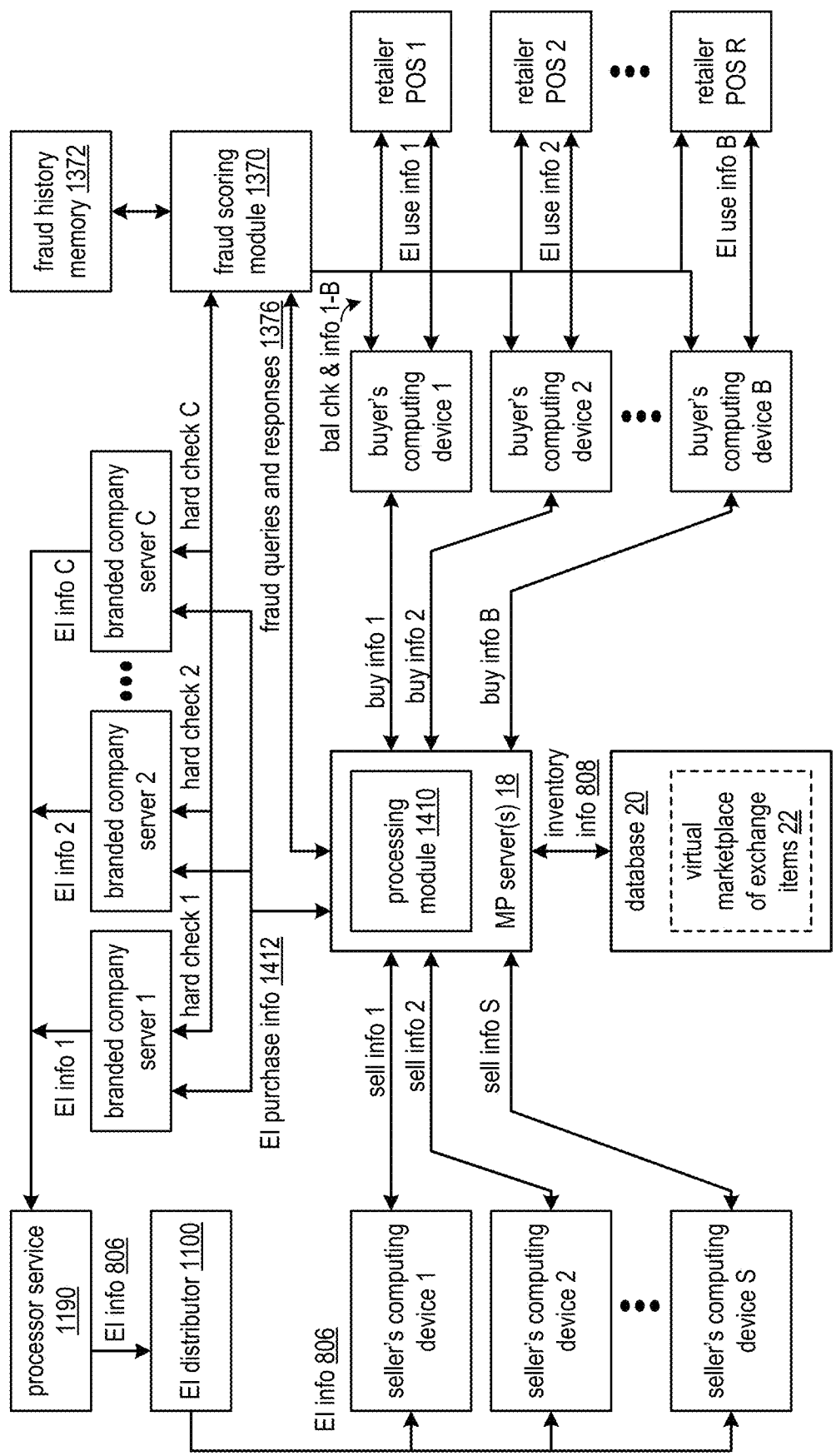
FIG. 28A is a schematic block diagram of another embodiment of an exchange item marketplace network in accordance with the present invention.

FIG. 28A is a schematic block diagram of another embodiment of an exchange item marketplace network that includes the plurality of branded company servers 1-C, the processor service 1190, the exchange item (EI) distributor 1100, the plurality of seller's computing devices 1-S, the MP servers 18, the database 20, a plurality of buyers computing devices 1-B, the plurality of retailer point-of-sales 1-R, the fraud scoring module 1370, and the fraud history memory 1372. Each of the seller's computing devices may be implemented utilizing the seller's computing device 12 of FIG. 2. Each of the buyer's computing devices 1-B may be implemented utilizing the buyer's computing device 16 of FIG. 2. The MP servers 18 includes a processing module 1410. The database 20 includes the virtual marketplace of exchange items 22. The exchange item marketplace network functions to obtain an exchange item in response to an immediate need.

As an example of operation of the obtaining of the exchange item in response to the immediate need, when the processing module 1410 receives buy information that includes a purchase request from a buyer's computing device, where the request indicates that the buyer's computing device is initiating a purchase transaction with a retailer point-of-sale entity, where the buyer's computing device determines that an available balance of an associated EI within a buyer wallet of the buyer's computing device is insufficient to complete the purchase transaction (e.g., purchase price greater than available balance), and where the virtual marketplace of exchange items 22 includes representations of a plurality of exchange items offered for sale by the plurality of seller's computing devices utilizing a secondary purchase path, where each seller's computing device obtains a corresponding EI from a corresponding branded company server via the processor service 1190 and/or the EI distributor 1100 utilizing a primary purchase path (e.g., receiving the EI information 806), the processing module 1410 determines whether to utilize a transactional approach to the purchase transaction.

The determining may be based on one or more of a fraud score (i.e., issue a fraud query 1376 to the fraud scoring module 1370 and receive a fraud response 1376 from the fraud scoring module 1370, where the fraud scoring module 1370 may utilize a hard check with the corresponding branded company server and obtain history records from the fraud history memory 1372), EI availability within the virtual marketplace of exchange items 22, an active marketing campaign, a buyer purchasing pattern, and a buyer loyalty association level. For instance, the processing module 1410 indicates to utilize the transactional approach when the EI availability indicates that a desired EI is unavailable from the virtual marketplace of exchange items 22 and the fraud score is favorable.

When utilizing the transactional approach, the processing module 1410 exchanges EI purchase information 1412 with the corresponding branded company server to obtain a new EI to satisfy a purchase transaction in accordance with the transactional approach. For example, the processing module 1410 issues an EI purchase request to the branded company server in accordance with the marketing campaign (e.g., a special discount for this buyer at this time), and receives an EI purchase response that includes new EI information. The EI purchase request includes one or more of a request indicator, a brand identifier, a desired balance level, a personal identification number, a desired expiration date, and a point-of-sale entity identifier. The EI purchase response includes one or more of a response indicator, the brand identifier, an actual balance level, the personal identification number, an expiration date, the point-of-sale entity identifier, a new serial number, a new expiration date, and new purchase restrictions. Alternatively, the processing module 1410 facilitates sale of an available EI from the virtual marketplace of exchange items 22 to the buyer's computing device for utilization with the retailer point-of-sale entity when the EI is available within the virtual marketplace of exchange items 22.

Having obtained the EI information to satisfy the purchase transaction with the retailer point-of-sale entity, the processing module 1410 issues the EI information to the buyer's computing device for utilization in completing the purchase transaction with the retailer point-of-sale entity. For example, the processing module 1410 generates buy information that includes the EI information, sends the buy information to the buyer's computing device, where the buyer's computing device exchanges EI use information with the retailer point-of-sale entity.

Figure 28B:
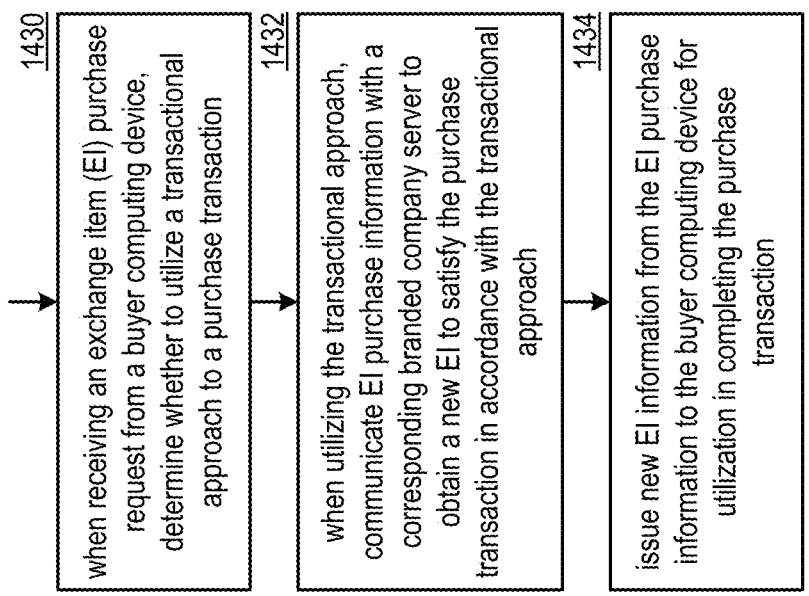
FIG. 28B is a logic diagram of an embodiment of a method for obtaining an exchange item in response to an immediate need in accordance with the present invention.

FIG. 28B is a logic diagram of an embodiment of a method for obtaining an exchange item in response to an immediate need that is performed by one or more servers and/or one or more computing devices. The method includes step 1430 where a processing module of the one or more servers and/or the one or more computing devices, when receiving an exchange item (EI) purchase request from a buyer computing device, determines whether to utilize a transactional approach to a purchase transaction, where the request indicates that the buyer computing devices initiating a purchase transaction with a retailer point-of-sale entity, where the buyer computing device determines that an available balance of an associated EI of a buyer wallet of the buyer computing devices is sufficient to complete the purchase transaction, where a virtual marketplace of exchange items includes representations of a plurality of exchange items offered for sale by a plurality of seller's computing devices utilizing a secondary purchase path, and where each seller's computing device obtains a corresponding exchange item from a corresponding branded company server utilizing a primary purchase path.

When utilizing the transactional approach, the method continues at step 1432 where the processing module communicates EI purchase information with a corresponding branded company server to obtain a new EI to satisfy the purchase transaction in accordance with the transactional approach. For example, the processing module issues an EI purchase request of the branded company server in accordance with a marketing campaign, and receives new EI information in response.

The method continues at step 1434 where the processing module issues new EI information from the EI purchase information to the buyer computing device for utilization in completing the purchase transaction. For example, the processing module generates buy information that includes the new EI information, sends the buy information to the buyer computing device, where the buyer computing device exchanges EI use information with the retailer point-of-sale entity to complete the purchase transaction.

Figure 29A:
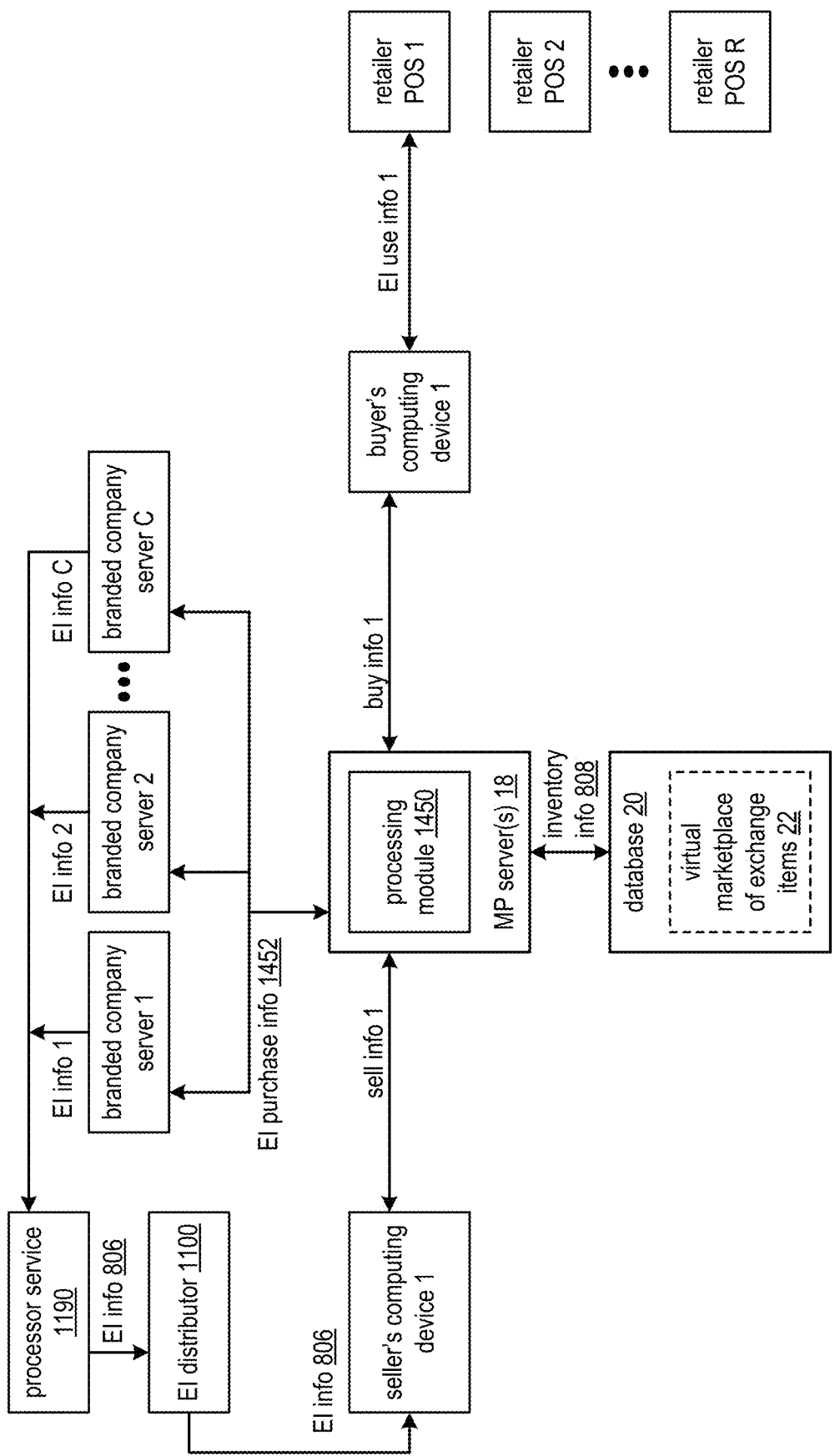
FIG. 29A is a schematic block diagram of another embodiment of an exchange item marketplace network in accordance with the present invention.

FIG. 29A is a schematic block diagram of another embodiment of an exchange item marketplace network that includes the plurality of branded company servers 1-C, the processor service 1190, the exchange item (EI) distributor 1100, a seller's computing device 1, the MP servers 18, the database 20, a buyers computing device 1, and the plurality of retailer point-of-sales 1-R. The seller's computing device 1 may be implemented utilizing the seller's computing device 12 of FIG. 2. The buyer's computing device 1 may be implemented utilizing the buyer's computing device 16 of FIG. 2. The MP servers 18 includes a processing module 1450. The database 20 includes the virtual marketplace of exchange items 22. The exchange item marketplace network functions to obtain an exchange item to satisfy a purchase.

As an example of operation of the obtaining of the exchange item, As an example of operation of the obtaining of the exchange item in response to the immediate need, when the processing module 1450 receives buy information that includes a purchase request from the buyer's computing device 1, where the request indicates that the buyer's computing device 1 is requesting to raise an available balance of an existing EI associated with a buyer wallet of the buyer's computing device 1, where the buyer's computing device 1 determines to raise the value based on one or more of initiating a purchase transaction with a retailer point-of-sale entity and detecting that the available balance is less than a minimum balance threshold level (e.g., not enough funds to complete the purchase transaction), where the virtual marketplace of exchange items 22 includes representations of a plurality of exchange items offered for sale by at least the seller's computing device 1, and where the seller's computing device 1 obtains a corresponding exchange item from a corresponding branded company server via one or more of the processor service 1190 and the EI distributor 1100 communicating EI information 806, the processing module 1450 determines whether to fulfill the EI purchase request utilizing a new EI from the corresponding branded company server approach or to utilize an EI represented by the virtual marketplace of exchange items 22 approach.

The determining how to fulfill the EI purchase request may be based on one or more of a fraud score, EI availability within the virtual marketplace of exchange items 22, an active marketing campaign, a buyer purchasing pattern, a buyer loyalty association level. For example, the processing module 1450 indicates to utilize the new EI approach when the EI availability indicates that the desired EI is unavailable from the virtual marketplace of exchange items 22.

When utilizing the new EI approach, the processing module 1450 exchanges EI purchase information 1452 with the corresponding branded company server to obtain new EI information to satisfy the EI purchase request. For example, the processing module 1450 issues an EI purchase request of the EI purchase information 1452 to the branded company server 2 in accordance with the marketing campaign (e.g., requesting a desired discount level for this buyer at this time), receives an EI purchase response of the EI purchase information 1452 from the branded company server 2 that includes the new EI information, issues buy information 1 that includes the new EI information to the buyer's computing device 1, where the buyer's computing device 1 exchanges EI use information 1 with the retailer point-of-sale 1 to complete the purchase transaction.

When utilizing a representation of one of the exchange items of the plurality of exchange items in the virtual marketplace of exchange items 22, the processing module 1450 generates the new EI information based on the inventory information 808 from the virtual marketplace of exchange items 22 associated with the EI to fulfill the purchase transaction. Having obtained the new EI information, the processing module 1450 issues the buy information 1 that includes the new EI information to the buyer's computing device 1, where the buyer's computing device 1 exchanges the EI use information 1 with the retailer point-of-sale 1 to complete the purchase transaction.

Figure 29B:
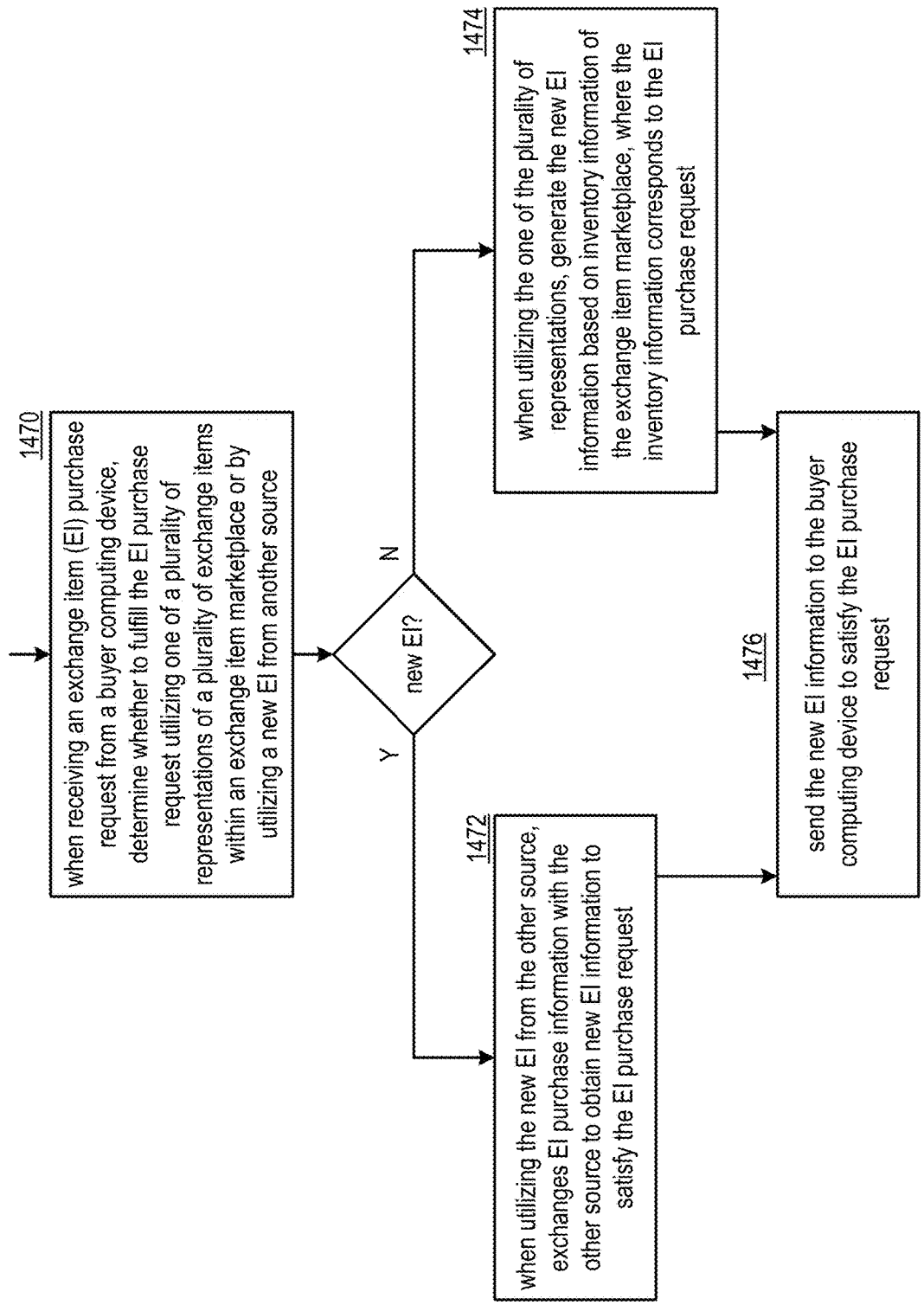
FIG. 29B is a logic diagram of an embodiment of a method for obtaining an exchange item to satisfy a purchase in accordance with the present invention.

FIG. 29B is a logic diagram of an embodiment of a method for obtaining an exchange item to satisfy a purchase that is performed by one or more servers and/or one or more computing devices. The method includes step 1470 where a processing module of the one or more servers and/or the one or more computing devices, when receiving an exchange item (EI) purchase request from a buyer computing device, determines whether to fulfill the EI purchase request utilizing one of a plurality of representations of a plurality of exchange items within an exchange item marketplace or by utilizing a new EI from another source (e.g., from a branded company server, from an EI distributor). The purchase request indicates that the buyer computing device is requesting to raise an available balance of an existing EI associated with a buyer wallet of the buyer computing device, where the buyer computing device determines to raise the value based on one or more of initiating a purchase transaction with a retailer point-of-sale entity, detecting that the available balance is less than a minimum balance threshold level, where the virtual marketplace of exchange items includes representations of the plurality of exchange items offered for sale by at least one seller computing device, and where each seller computing device obtains a corresponding EI from a corresponding branded company server via one or more of a processor service and the EI distributor.

The determining whether to fulfill the EI purchase request utilizing the one of a plurality of representations of a plurality of exchange items within the exchange item marketplace or by utilizing the new EI from the other source may be based on one or more of a fraud score, EI availability within the virtual marketplace of exchange items, an active marketing campaign, a buyer purchasing pattern, and a buyer loyalty association level. For example, the processing module indicates to utilize the new EI when the EI availability indicates that a desired EI is unavailable within the virtual marketplace of exchange items and the fraud score compares favorably to a minimum fraud score threshold level.

The method branches to step 1474 when the new EI is not utilized. The method continues to step 1472 when the new EI is utilized. When utilizing the new EI from the other source, the method continues at step 1472 where the processing module exchanges EI purchase information with the other source to obtain new EI information to satisfy the EI purchase request. For example, the processing module identifies the branded company server associated with the purchase transaction, issues an EI purchase request to the identified branded company server in accordance with the marketing campaign (e.g., a desired discount level for this buyer at this time), receives the new EI information, and facilitates the payment to a corresponding retailer by the buyer computing device (e.g., sends the new EI information to the buyer computing device for utilization to complete the purchase transaction). The method branches to step 1476.

When utilizing the one of the plurality of representations, the method continues at step 1474 where the processing module generates the new EI information based on inventory information of the exchange item marketplace, where the inventory information corresponds to the EI purchase request (e.g., for a desired brand type and balance). The generating includes one or more of obtaining the inventory information from the exchange item marketplace, updating the inventory information to indicate purchase of incremental value, and facilitating the payment to the corresponding retailer by the buyer computing device.

The method continues at step 1476 where the processing module sends the new EI information to the buyer computing device to satisfy the EI purchase request. For example, the processing module generates by information, sends the buy information to the buyer computing device, where the buyer computing device updates the buyer wallet to indicate the raised available balance of the exchange item.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a data communication network, the method comprising:
    generating wallet information for an exchange item associated with a computing device of the data communication network, wherein the wallet information includes a set of attributes that includes a serial number, a quantifiable value, and a set of use rules that govern utilization of the exchange item within the data communication network;
    generating variable wallet information functions for a subset of attributes for the set of attributes based on dynamic external factors in accordance with a smart contract approach, wherein the smart contract approach indicates one or more of the dynamic external factors that modify an attribute of the subset of attributes; and
    sending the variable wallet information functions and the wallet information to the computing device, wherein the variable wallet information functions enable the computing device to update the wallet information for the exchange item based on current dynamic external factors to produce updated wallet information, and wherein the updated wallet information enables the computing device to utilize the exchange item in accordance with the set of use rules.

2. The method of claim 1, wherein the dynamic external factors comprise one or more of:
    a time value;
    a date value;
    a weather condition value;
    a location value;
    a geopolitical value;
    a purchasing trend value; and
    retail location value.

3. The method of claim 2, wherein the smart contract approach comprises:
    varying a quantifiable value of the exchange item based on a combination of two or more of the external factors.

4. The method of claim 1, wherein the smart contract approach comprises one or more of:
    varying a quantifiable value of the exchange item based on a timestamp; and
    varying a quantifiable value of the exchange item based on a location.

5. The method of claim 1 further comprises selecting the smart contract approach based on one or more of:
    a user identifier;
    a user exchange item transaction history;
    a user location information;
    a brand identifier; and
    a lookup.

6. The method of claim 1, wherein the current dynamic external factors are obtained by one or more of:
    receiving, by the computing device, the current dynamic external factors from a marketplace server of the data communication network;
    receiving the current dynamic external factors from another server of the data communication network;
    interpreting a query response; and
    identifying the current dynamic external factors.

7. The method of claim 1, wherein the smart contract approach comprises:

modifying a use rule of the set of use rules based on a value of a first dynamic external factor of the dynamic external factors.

8. The method of claim 7, wherein a first attribute of the subset of attributes is the quantifiable value of the exchange item, and a second attribute of the subset of attributes is a use rule of the set of use rules limiting use of the exchange item for a particular brand.

9. The method of claim 1, wherein the computing device further comprises:
a digital wallet for storing the exchange item information and the variable wallet information functions.

10. The method of claim 1 further comprises:
obtaining the dynamic external factors by one or more of:
interpreting a query response to produce the dynamic external factors;
detecting the dynamic external factors; and
receiving the dynamic external factors.

11. A non-transitory computer readable storage device comprises:
at least one memory section for storing operational instructions that, when executed by one or more processing modules of a data communication network, causes the one or more processing modules to:
generate wallet information for an exchange item associated with a computing device of the data communication network, wherein the wallet information includes a set of attributes that includes a serial number, a quantifiable value, and a set of use rules that govern utilization of the exchange item within the data communication network;
generate variable wallet information functions for a subset of attributes for the set of attributes based on dynamic external factors in accordance with a smart contract approach, wherein the smart contract approach indicates one or more of the dynamic external factors that modify an attribute of the subset of attributes; and
send, via an interface, the variable wallet information functions and the wallet information to the computing device, wherein the variable wallet information functions enable the computing device to update the wallet information for the exchange item based on current dynamic external factors to produce updated wallet information, and wherein the updated wallet information enables the computing device to utilize the exchange item in accordance with the set of use rules.

12. The non-transitory computer readable storage device of claim 11, wherein the at least one memory section stores further operational instructions that, when executed by the one or more processing modules, cause the one or more processing modules to determine the dynamic external factors include one or more of:
a time value;
a date value;
a weather condition value;
a location value;
a geopolitical value;
a purchasing trend value; and
retail location value.

13. The non-transitory computer readable storage device of claim 12, wherein the smart contract approach comprises:
varying a quantifiable value of the exchange item based on a combination of two or more of the external factors.

14. The non-transitory computer readable storage device of claim 11, wherein the smart contract approach comprises one or more of:
varying a quantifiable value of the exchange item based on a timestamp; and
varying a quantifiable value of the exchange item based on a location.

15. The non-transitory computer readable storage device of claim 11, wherein the at least one memory section stores further operational instructions that, when executed by the one or more processing modules, cause the one or more processing modules to select the smart contract approach based on one or more of:
a user identifier;
a user exchange item transaction history;
a user location information;
a brand identifier; and
a lookup.

16. The non-transitory computer readable storage device of claim 11, wherein the at least one memory section stores further operational instructions that, when executed by the one or more processing modules, cause the one or more processing modules to obtain the current dynamic external factors by one or more of:
receiving the current dynamic external factors from a marketplace server of the data communication network;
receiving the current dynamic external factors from another server of the data communication network;
interpreting a query response; and
identifying the current dynamic external factors.

17. The non-transitory computer readable storage device of claim 11, wherein the at least one memory section stores further operational instructions that, when executed by the one or more processing modules, cause the one or more processing modules to determine the smart contract approach comprises:
modifying a use rule of the set of use rules based on a value of a first dynamic external factor of the dynamic external factors.

18. The non-transitory computer readable storage device of claim 17, wherein the at least one memory section stores further operational instructions that, when executed by the one or more processing modules cause the one or more processing modules to:
modifying a value of an attribute of the subset of attributes based on a value of a second dynamic external factor of the dynamic external factors.

19. The non-transitory computer readable storage device of claim 17, wherein a first attribute of the subset of attributes is the quantifiable value of the exchange item, and a second attribute of the subset of attributes is a use rule of the set of use rules limiting use of the exchange item for a particular brand.

20. The non-transitory computer readable storage device of claim 11, wherein the at least one memory section stores further operational instructions that, when executed by the one or more processing modules, cause the one or more processing modules to obtain the dynamic external factors by one or more of:
interpreting a query response to produce the dynamic external factors;
detecting the dynamic external factors; and
receiving the dynamic external factors.

\* \* \* \* \*